US009897185B2

(12) United States Patent
Kato et al.

(10) Patent No.: US 9,897,185 B2
(45) Date of Patent: Feb. 20, 2018

(54) SHIFT POWER TRANSMISSION APPARATUS AND TRAVEL POWER TRANSMISSION DEVICE

(71) Applicant: Kubota Corporation, Osaka-shi (JP)

(72) Inventors: Yuji Kato, Sakai (JP); Seiji Ohkubo, Sakai (JP); Go Takaki, Sakai (JP); Seiji Norita, Sakai (JP); Takashi Okuyama, Sakai (JP); Kozo Nishikawa, Sakai (JP); Fumitake Okunishi, Sakai (JP); Yukifumi Yamanaka, Sakai (JP); Takahiro Uchi, Sakai (JP)

(73) Assignee: Kubota Corporation, Osaka (JP)

(*) Notice: Subject to any disclaimer, the term of this patent is extended or adjusted under 35 U.S.C. 154(b) by 89 days.

(21) Appl. No.: 15/001,713

(22) Filed: Jan. 20, 2016

(65) Prior Publication Data

US 2016/0138693 A1    May 19, 2016

Related U.S. Application Data

(62) Division of application No. 14/007,775, filed as application No. PCT/JP2012/057983 on Mar. 27, 2012, now Pat. No. 9,261,182.

(30) Foreign Application Priority Data

Mar. 31, 2011  (JP) ................. 2011-078544
Mar. 31, 2011  (JP) ................. 2011-078545
(Continued)

(51) Int. Cl.
F16H 47/04    (2006.01)
F16H 47/08    (2006.01)
F16H 37/08    (2006.01)

(52) U.S. Cl.
CPC ............ *F16H 47/04* (2013.01); *F16H 47/08* (2013.01); *F16H 2037/0886* (2013.01); *F16H 2200/2005* (2013.01)

(58) Field of Classification Search
None
See application file for complete search history.

(56) References Cited

U.S. PATENT DOCUMENTS 5,624,339 A    4/1997  Coutant et al.
5,667,452 A    9/1997  Coutant
(Continued)

FOREIGN PATENT DOCUMENTS

CN    1457410 A    11/2003
CN    1457411 A    11/2003
(Continued)

*Primary Examiner* — Jacob S Scott
(74) *Attorney, Agent, or Firm* — The Webb Law Firm

(57) ABSTRACT

Disclosed is a shift power transmission apparatus for readily suppressing or avoiding size increase thereof. The apparatus includes an input shaft (22) receiving engine drive force, a hydraulic continuously variable transmission (30) driven by the input shaft (22), a planetary power transmission section (40) combining drive force from the input shaft (22) and output from the hydraulic continuously variable transmission (30) for outputting the combined drive force, and an output rotary member (24) outputting power to a travel apparatus. The planetary power transmission section (40) and the output rotary member (24) are arranged on a side of the hydraulic continuously variable transmission (30) associated with an engine-coupled side of the input shaft (22). The drive force is inputted to the planetary power transmission section (40) from a portion between the engine-coupled side and the hydraulic continuously variable transmission-coupled side of the input shaft (22).

4 Claims, 51 Drawing Sheets

(30) Foreign Application Priority Data

Aug. 11, 2011 (JP) .................................. 2011-176198
Aug. 11, 2011 (JP) .................................. 2011-176200

(56) References Cited

U.S. PATENT DOCUMENTS

| | | |
|---|---|---|
| 6,616,559 B1 | 9/2003 | Hori et al. |
| 6,997,838 B2 | 2/2006 | Folsom et al. |
| 8,172,714 B2 | 5/2012 | Ishimori et al. |
| 8,303,448 B2 | 11/2012 | Hiraoka et al. |
| 2002/0119856 A1 | 8/2002 | Pollman et al. |
| 2003/0089107 A1 | 5/2003 | Tani |
| 2003/0150662 A1 | 8/2003 | Tani |
| 2004/0209718 A1 | 10/2004 | Ishibashi et al. |
| 2009/0055061 A1 | 2/2009 | Zhu |
| 2012/0058854 A1 | 3/2012 | Shiozaki et al. |
| 2015/0133251 A1 | 5/2015 | Shiozaki et al. |

FOREIGN PATENT DOCUMENTS

| | | |
|---|---|---|
| JP | 5126233 A | 5/1993 |
| JP | 650410 A | 2/1994 |
| JP | 8282311 JP | 10/1996 |
| JP | 8338507 A | 12/1996 |
| JP | 10122336 A | 5/1998 |
| JP | 2000130558 A | 5/2000 |
| JP | 2000335265 A | 12/2000 |
| JP | 2001108061 A | 4/2001 |
| JP | 2003130177 A | 5/2003 |
| JP | 2003202067 A | 7/2003 |
| JP | 200516562 A | 1/2005 |
| JP | 2008195334 A | 8/2008 |
| JP | 2008215499 A | 9/2008 |
| JP | 2009280040 A | 12/2009 |
| JP | 201043675 A | 2/2010 |
| JP | 201091090 A | 4/2010 |
| JP | 2010159883 A | 7/2010 |
| JP | 2010265939 A | 11/2010 |
| WO | 2010131576 A1 | 11/2010 |

Fig.5

| Power transmission switching clutch mechanism (70) (power transmission mode) | Single power transmission state $\begin{pmatrix} \text{HST mode} \\ \text{(power transmission)} \end{pmatrix}$ | Combined power transmission state $\begin{pmatrix} \text{HMT mode} \\ \text{(power transmission)} \end{pmatrix}$ |
|---|---|---|
| Input-side clutch mechanism (55) | Off | On |
| Output-side clutch mechanism (60) | On | Off |

Fig.9

| | Forward output | | | Reverse output | | |
|---|---|---|---|---|---|---|
| | Low speed (FL) | Mid speed (FM) | High speed (FH) | Low speed (RL) | Mid speed (RM) | High speed (RH) |
| | HST mode transmission | HMT mode transmission | HMT mode transmission | HST mode transmission | HMT mode transmission | HMT mode transmission |
| Hydraulic continuously variable transmission (30) | Forward | Forward | Reverse | Reverse | Reverse | Forward |
| Forward clutch (82) | Off | On | On | Off | Off | Off |
| Reverse clutch (86) | Off | Off | Off | Off | On | On |
| Output-side clutch mechanism (60) | On | Off | Off | On | Off | Off |

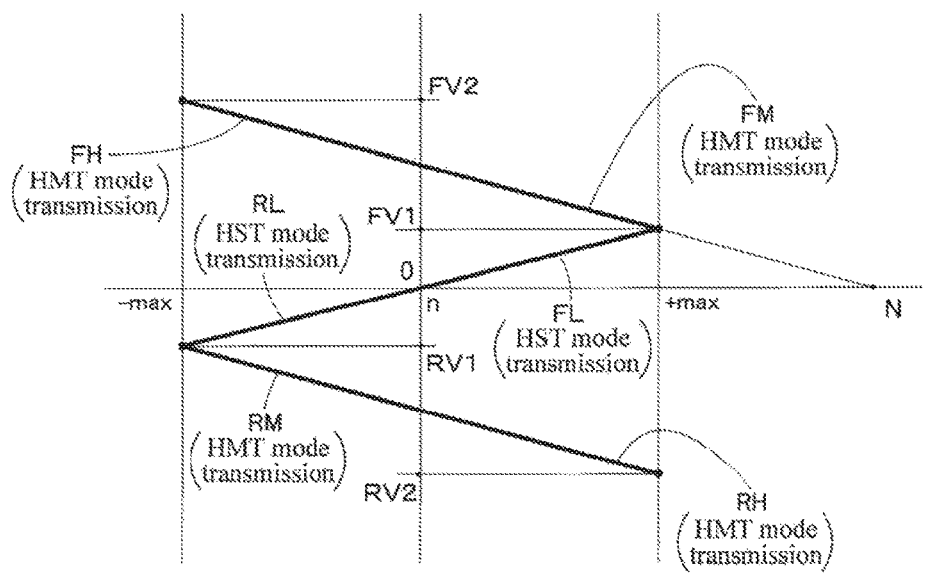

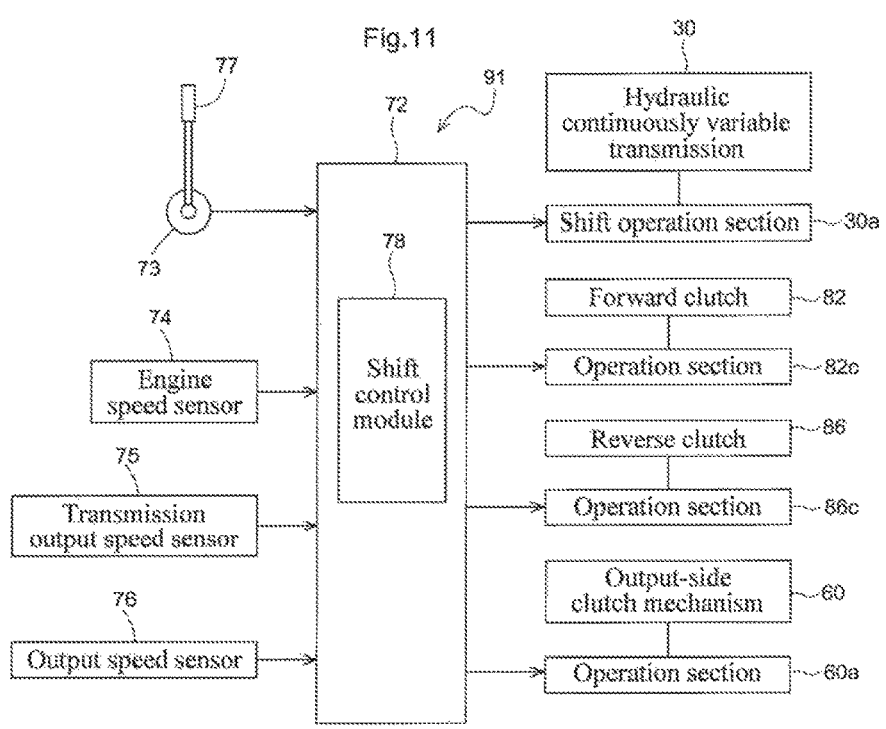

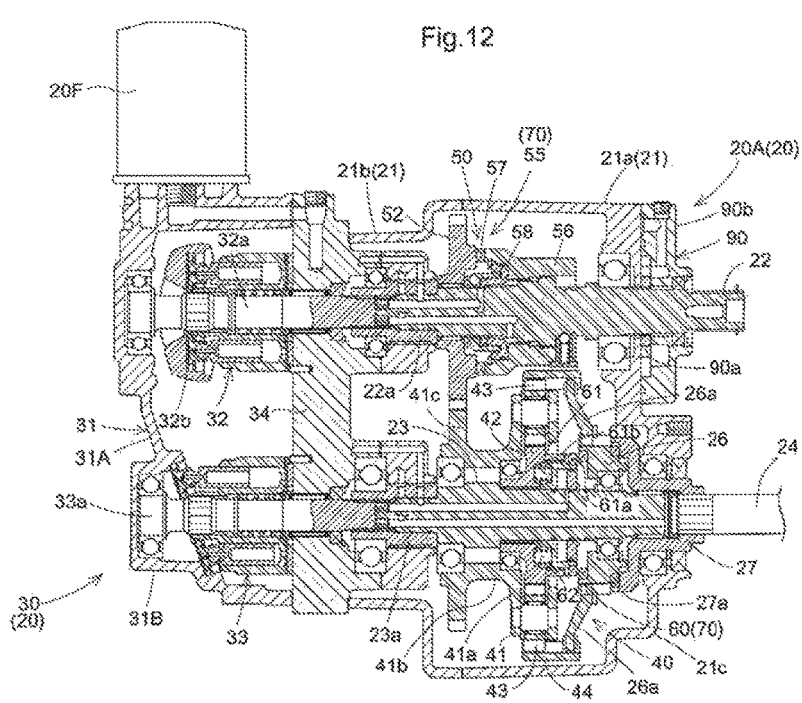

Fig.22

| | Forward output | | | Reverse output | | |
|---|---|---|---|---|---|---|
| | Low speed (FL) | Mid speed (FM) | High speed (FH) | Low speed (RL) | Mid speed (RM) | High speed (RH) |
| | HST mode transmission | HMT mode transmission | HMT mode transmission | HST mode transmission | HMT mode transmission | HMT mode transmission |
| Hydraulic continuously variable transmission (130) | Forward | Forward | Reverse | Reverse | Reverse | Forward |
| Forward clutch (152) | Off | On | On | Off | Off | Off |
| Reverse clutch (156) | Off | Off | Off | Off | On | On |
| Output-side clutch mechanism (180) | On | Off | Off | On | Off | Off |

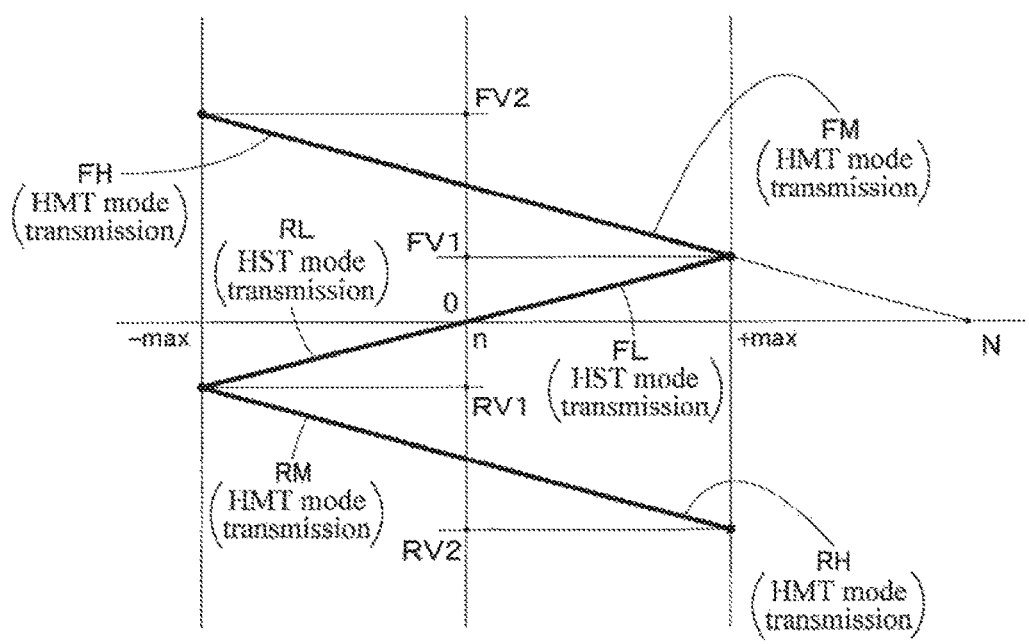

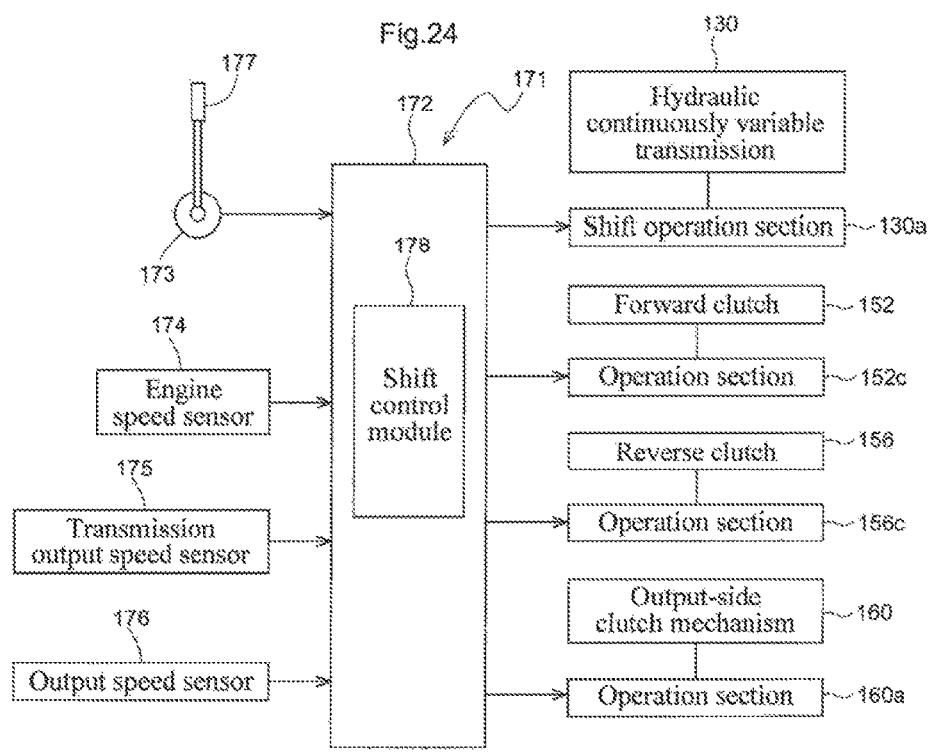

Fig.32

| Power transmission state<br>Power transmission setting clutch mechanism(270) | HST power transmission | HMT power transmission |
|---|---|---|
| HMT clutch(255) | Off | On |
| HST clutch(260) | On | Off |

Fig.49

| Power transmission state<br>Power transmission<br>setting clutch mechanism(370) | HST<br>power transmission | HMT<br>power transmission |
|---|---|---|
| HMT clutch(355) | Off | On |
| HST clutch(360) | On | Off |

SHIFT POWER TRANSMISSION APPARATUS AND TRAVEL POWER TRANSMISSION DEVICE

CROSS-REFERENCE TO RELATED APPLICATIONS

This application is a division of U.S. application Ser. No. 14/007,775 filed Mar. 27, 2012, which is the United States national phase of International Application No. PCT/JP2012/057983 filed Mar. 27, 2012 and claims priority to Japanese Patent Application Nos. 2011-078544 and 2011-078545, both filed Mar. 31, 2011 and 2011-176198 and 2011-176200, both filed Aug. 11, 2011, the disclosures of which are each hereby incorporated in their entirety by reference

TECHNICAL FIELD

The present invention relates to a shift power transmission apparatus and a travel power transmission apparatus. More specifically, the present invention relates to, but is not limited to, a shift power transmission apparatus and a travel power transmission apparatus in an agricultural apparatus.

BACKGROUND ART

[1] A shift power transmission apparatus is provided with an input shaft that receives engine drive force, a hydraulic continuously variable transmission that is driven by the input shaft, a planetary power transmission section that combines drive force from the input shaft and output from the hydraulic continuously variable transmission and outputs the combined drive force, and an output rotary member that outputs power to a travel apparatus.

Patent Document 1 describes a conventional example of a shift power transmission apparatus. The shift power transmission apparatus described in Patent Document 1 includes a pump shaft that passes through a hydraulic pump in a continuously variable shift section (hydraulic continuously variable transmission), and is configured such that drive force from the engine is inputted to the pump shaft on one side protruding from the continuously variable transmission, drive force from the pump shaft is transmitted from the other side of the pump shaft protruding from the continuously variable shift section to a compound planetary power transmission section, the continuously variable shift section is driven by the engine drive force, and the engine drive force and the output from the continuously variable shift section are combined by the compound planetary power transmission section.

[2] On the other hand, in a shift power transmission apparatus described in Patent Document 2, a power transmission system for transmitting output from the engine to front/rear wheels is provided with a hydraulic continuously variable shift apparatus (hydraulic continuously variable transmission), a planetary gear mechanism (planetary power transmission section), and two hydraulic clutches. When an HST (Hydraulic Static Transmission) mode drive train (HST mode power transmission s configured by one of the two hydraulic clutches being connected, output from the engine is transmitted to front/back wheels after being subjected to speed change by the hydraulic continuously variable shift apparatus. When an HMT (Hydraulic Mechanical Transmission) mode drive train (HMT mode power transmission) is configured the other one of the two hydraulic clutches being connected, output from the hydraulic continuously variable shift apparatus is inputted to the planetary gear apparatus, the planetary gear apparatus combines output from the engine with output from the hydraulic continuously variable shift apparatus and outputs the combined drive force, and the combined drive force is transmitted to front/rear wheels.

Also, in the shift power transmission apparatus described in aforementioned Patent Document 1, a power transmission system that transmits output from the engine to a front wheel differential mechanism and a rear wheel differential mechanism is provided with a continuously variable shift section (hydraulic continuously variable transmission), a planetary power transmission section, and a forward/reverse switching apparatus. Output from the engine is inputted to the continuously variable shift section and the planetary power transmission section, and a planetary gear apparatus combines the output from the engine with output from the hydraulic continuously variable shift apparatus. The combined drive force outputted by the planetary gear apparatus is inputted to the forward/reverse switching apparatus and converted into forward drive force and reverse drive force, which is then transmitted to the front wheel differential mechanism and the rear wheel differential mechanism.

[3] There is a travel power transmission apparatus that includes a shift power transmission device. The shift power transmission device has a hydrostatic continuously variable shift section that operates on as to receive drive force from an engine and subject it to speed change, the speed-changed drive force to be output being subjected to speed change along an HST shift line, and a planetary power transmission section that operates so as to receive and combine the drive force from the engine and the speed-changed drive force from the continuously variable shift section, the combined drive force to be output being subjected to speed change along an HMT shift line by the speed change performed by the continuously variable shift section. The shift power transmission device is provided with a clutch mechanism that can be switched between an HST setting state, which is for setting HST power transmission in which the speed-changed drive force output from the continuously variable shift section is outputted to a travel apparatus, and an HMT setting state, which is for setting HMT power transmission in which the combined drive force output from the planetary power transmission section is outputted to the travel apparatus. The travel power transmission apparatus also includes a shift control module for, based on a shift instruction from a shift operation device, controlling shifting of a hydraulic pump included in the continuously variable shift section, and also controlling switching of the clutch mechanism.

In an agricultural apparatus for example, there are cases where there are repeated switches between forward and reverse, such as the case of changing direction at the end of a work line. The above-described travel power transmission apparatus has output characteristics such as those shown in FIG. 33, and is configured such that when operations for shifting forward and reverse via the neutral state of the continuously variable shift section are performed, the output speed changes to the forward side and the reverse side along the HST shift line, and thus it is possible to switch the apparatus between forward and reverse by merely performing a simple shift operation that does not require a special operation for forward/reverse switching.

In this type of travel power transmission apparatus described in aforementioned Patent Document 2, the power transmission system for transmitting output from the engine to the front/rear wheels is provided with a hydraulic continuously variable shift apparatus, a planetary gear mechanism, and two hydraulic clutches. An HST mode drive train is configured by performing connection switching with respect to the two hydraulic clutches, and in this mode, drive force output from a motor output shaft in the hydraulic continuously variable shift apparatus is transmitted to the front/rear wheels without being transmitted to the planetary gear mechanism. Also, an HMT mode drive train is configured by performing connection switching with respect to the two hydraulic clutches, and in this mode, drive force output from the motor output shaft in the hydraulic continuously variable shift apparatus is transmitted to the planetary gear mechanism, the planetary gear mechanism combines drive force from the hydraulic continuously variable shift apparatus with drive force from the engine, and the combined drive force output from the planetary gear mechanism is transmitted to the front/rear wheels.

[4] There is a travel power transmission apparatus that includes a shift power transmission device. The shift power transmission device has a hydrostatic continuously variable shift section that operates so as to receive drive force from an engine and subject it to speed change, the speed-changed drive force to be output being subjected to speed change along an HST shift line, and a planetary power transmission section that operates on as to receive and combine the drive force from the engine and the speed-changed drive force from the continuously variable shift section, the combined drive force to be output being subjected to speed change along an HMT shift line by the speed change performed by the continuously variable shift section. The shift power transmission device is provided with a clutch mechanism that can be switched between an HST setting state, which is for setting HST power transmission in which the speed-changed drive force output from the continuously variable shift section is outputted to a travel apparatus, and an HMT setting state, which is for setting HMT power transmission in which the combined drive force output from the planetary power transmission section is outputted to the travel apparatus. The travel power transmission apparatus also includes a shift control module for, based on a shift instruction from a shift operation device, controlling shifting of a hydraulic pump included in the continuously variable shift section, and also controlling switching of the clutch mechanism.

In an agricultural apparatus for example, there are cases where there are repeated switches between forward and reverse, such as the case of changing direction at the end of a work line. The above-described travel power transmission apparatus has output characteristics such as those shown in FIG. 50, and is configured such that when operations for shifting forward and reverse via the neutral state of the continuously variable shift section are performed, the output speed changes to the forward side and the reverse side along the HST shift line, and thus it is possible to switch the apparatus between forward and reverse by merely performing a simple shift operation that does not require a special operation for forward/reverse switching.

In this type of conventional travel power transmission apparatus described in aforementioned Patent Document 2, the power transmission system for transmitting output from the engine to the front/rear wheels is provided with a hydraulic continuously variable shift apparatus, a planetary gear mechanism, and two hydraulic clutches. An HST mode drive train is configured by performing connection switching with respect to the two hydraulic clutches, and in this mode, drive force output from a motor output shaft in the hydraulic continuously variable shift apparatus is transmitted to the front/rear wheels without being transmitted to the planetary gear mechanism. Also, an HMT mode drive train is configured by performing connection switching with respect to the two hydraulic clutches, and in this mode, drive force output from the motor output shaft in the hydraulic continuously variable shift apparatus is transmitted to the planetary gear mechanism, the planetary gear mechanism combines drive force from the hydraulic continuously variable shift apparatus with drive force from the engine, and the combined drive force output from the planetary gear mechanism is transmitted to the front/rear wheels.

Also, conventionally there is a apparatus that, as shown in Patent Document 3 for example, includes an actuator that controls the swash plate of a hydraulic motor included in a continuously variable shift apparatus, and is configured such that the actuator operates according to an instruction operation performed by a switching switch, thus switching the hydraulic motor between two stages, namely high-speed and low-speed.

PRIOR ART DOCUMENTS

Patent Documents

Patent Document 1: JP 2008-215499A
Patent Document 2: JP 2001-108061A
Patent Document 3: JP 2003-202067A

DISCLOSURE OF THE INVENTION

Problem to be Solved by the Invention

[1] The following(s) is/are issue(s) corresponding to Background Art [1].

In the case of employing the conventional art described in aforementioned Cited Document 1, the distance from the site where the pump shaft receives the engine drive force to the site where it outputs drive force to the planetary power transmission section increases due to the hydraulic pump positioned between the two sites, thus requiring an increase in the strength of the pump shaft in order to suppress distortion of the pump shaft caused by the drive load of the planetary power transmission section, and increasing the strength of the pump shaft requires the employment of a large-size hydraulic continuously variable transmission that includes a large-diameter pump shaft, for example.

An object of the present invention is to provide a shift power transmission apparatus for readily suppressing or avoiding size increase thereof

[2] The following(s) is/are issue(s) corresponding to Background Art [2].

A shift power transmission apparatus is provided with an input shaft that receives engine drive force, a hydraulic continuously variable transmission that is driven by the input shaft, a planetary power transmission section that combines drive force from the input shaft and output from the hydraulic continuously variable transmission and outputs the combined drive force, and an output rotary member that outputs power to a travel apparatus. When this apparatus is configured to be able to achieve HST mode power transmission, in which engine drive force that is to be transmitted to the output rotary member is subjected to speed change by the hydraulic continuously variable transmission and is not subjected to combining by the planetary power transmission section, and be able to achieve HMT mode power transmission, in which engine drive force that is to be transmitted to the output rotary member is subjected to combining by the planetary power transmission section, it has output characteristics such as those shown in FIG. 26.

FIG. 26 is an illustrative diagram showing the relationship between shift state of the hydraulic continuously variable transmission and the output speed of the output rotary member. In FIG. 26, the horizontal axis indicates the shift state of the hydraulic continuously variable transmission, and the vertical axis indicates the rotation direction and output speed of the output rotary member. Here, "n" on the horizontal axis indicates the neutral position of the hydraulic continuously variable transmission, "−max" on the horizontal axis indicates the maximum speed position in the reverse power transmission state of the hydraulic continuously variable transmission, and "+max" on the horizontal axis indicates the maximum speed position in the forward power transmission state of the hydraulic continuously variable transmission. A solid line RL shown in FIG. 26 indicates the output of reverse drive force in the state where HST mode power transmission is achieved, a solid line FL indicates the output of forward drive force in the state where HST mode power transmission is achieved, and a solid line FH indicates the output of forward drive force in the state where HMT mode power transmission is achieved.

As shown by the solid line RL, in the state where HST mode power transmission is achieved, if the hydraulic continuously variable transmission is operated to the maximum speed position "−max" in the reverse power transmission state, the output speed reaches the reverse maximum speed "RV". Then, while maintaining the HST mode power transmission, as the hydraulic continuously: variable transmission is shifted from the maximum speed position "−max" in the reverse power transmission state toward the neutral position "n", the reverse output speed decreases, and then the output speed reaches "0" when the hydraulic continuously variable transmission reaches the neutral position "n". As shown by the solid line FL, while maintaining HST mode power transmission, if the hydraulic continuously variable transmission is shifted from the neutral position "n" to the forward power transmission state side, the output switches from reverse output to forward output, and as the hydraulic continuously variable transmission is shifted from the neutral position "n" toward the maximum speed position "+max" in the forward power transmission state, the forward output speed increases, and then the forward output speed reaches "FV1" when the hydraulic continuously variable transmission reaches the maximum speed position "+max" in the forward power transmission state. As shown by the solid line FH, when the hydraulic continuously variable transmission reaches the maximum speed position "+max" in the forward power transmission state, HMT mode power transmission is achieved in place of HST mode power transmission, and, while maintaining HMT mode power transmission, as the hydraulic continuously variable transmission is shifted from the maximum speed position "+max" in the forward power transmission state toward the maximum speed position "−max" in the reverse power transmission state, the forward output speed increases, and the forward output reaches the maximum speed "FV2" when the hydraulic continuously variable transmission reaches the maximum speed position "−max" in the reverse power transmission state.

In other words, when HST mode power transmission and HMT mode power transmission can be achieved, by merely performing shift operations on the hydraulic continuously variable transmission, the output can be easily set to zero "0" such that the travel apparatus stops, and the output can be easily switched between forward output and reverse output such that the travel apparatus can be switched between forward and reverse driving. However, transmission efficiency is more favorable in HMT mode power transmission than in HST mode power transmission, and since forward drive force is transmitted to the output rotary member in HMT mode power transmission, the reverse output shift range is set smaller than the forward output shift range.

There is a configuration in which, conventional technology in which the forward/reverse switching apparatus is provided downstream of the planetary power transmission section in the transmission direction is applied, and output from the hydraulic continuously variable transmission and the planetary power transmission section is inputted to the forward/reverse switching mechanism and converted into forward drive force and reverse drive force before being transmitted to the output rotary member, and with this configuration, the reverse output shift range is similar to the forward output shift range.

On the other hand, FIG. 27 is an illustrative diagram showing the relationship between the shift state of the hydraulic continuously variable transmission and the output speed of the output rotary member in the case of a configuration in which the output of the hydraulic continuously variable transmission and the planetary power transmission section is converted into forward drive force and reverse drive force by the forward/reverse switching mechanism before being transmitted to the output rotary member. Solid lines FL and FH shown in FIG. 27 indicate the output of forward drive force, and solid lines RL and RH indicate the output of reverse drive force.

As shown by the solid line FL, in the state where HST mode power transmission is achieved, if the hydraulic continuously variable transmission is operated to the neutral position "n", the output changes to zero "0". While maintaining HST mode power transmission, and also switching the forward/reverse switching mechanism to the forward power transmission state and maintaining the forward power transmission state, as the hydraulic continuously variable transmission changes from the neutral position "n" toward the maximum speed position "+max" in the forward power transmission state, the forward output speed increases, and then the forward output speed reaches "FV1" when the hydraulic continuously variable transmission reaches the maximum speed position "+max" in the forward power transmission state. As shown by the solid line FH, when the hydraulic continuously variable transmission reaches the maximum speed position "+max" in the forward power transmission state, HMT mode power transmission is achieved in place of HST mode power transmission, and, while maintaining HMT mode power transmission and also maintaining the forward/reverse switching mechanism in the forward power transmission state, as the hydraulic continuously variable transmission is shifted from the maximum speed position "+max" in the forward power transmission state toward the maximum speed position "−max" in the reverse power transmission state, the forward output speed increases, and then the forward output reaches the maximum speed "FV2" when the hydraulic continuously variable transmission reaches the maximum speed position "−max" in the reverse power transmission state. As shown by the solid line RL, if the hydraulic continuously variable transmission is operated to the neutral position "n", the forward/reverse switching mechanism is switched to the reverse power transmission state, and, while maintaining HST mode power transmission and also maintaining the forward/reverse switching mechanism in the reverse power transmission state, as the hydraulic continuously variable transmission is shifted from the neutral position "n" toward the maximum speed position "+max" in the forward power transmission state side, the reverse output speed increases, and then the reverse output speed reaches "RV1" when the hydraulic continuously variable transmission reaches the maximum speed position "+max" in the forward power transmission state. As shown by the solid line RH, when the hydraulic continuously variable transmission reaches the maximum speed position "+max" in the forward power transmission state, HMT mode power transmission is achieved in place of HST mode power transmission, and, while maintaining HMT mode power transmission and also maintaining the forward/reverse switching mechanism in the reverse power transmission state, as the hydraulic continuously variable transmission is shifted from the maximum speed position "+max" in the forward power transmission state toward the maximum speed position "−max" in the reverse power transmission state, the reverse output speed increases, and then the reverse output reaches the maximum speed "RV2" when the hydraulic continuously variable transmission reaches the maximum speed position "−max" in the reverse power transmission state.

In other words, in the case of a configuration in which output from the hydraulic continuously variable transmission and the planetary power transmission section is inputted to the forward/reverse switching mechanism and converted into forward drive force and reverse drive force before being transmitted to the output rotary member, when the travel apparatus undergoing forward driving is stopped and then switched to reverse driving, and also when the travel apparatus undergoing reverse driving is stopped and then switched to forward driving, the forward/reverse switching mechanism needs to be switched from either the forward power transmission state or the reverse power transmission state to the other.

An object of the present invention is to provide a shift power transmission apparatus that enables the stopping of the travel apparatus and forward/reverse switching to be performed with an easy operation, and to enable the travel apparatus to undergo reverse driving in a wide shift range, and for this to be accomplished with a simple structure.

[3] The following(s) is/are issue(s) corresponding to Background Art [3].

If the sun gear, carrier, and ring gear of the planetary power transmission section rotate in an integrated manner at the point in time when switching of the clutch mechanism in order to switch the setting from HST power transmission setting to HMT power transmission is completed and drive force from the engine is transmitted to the planetary power transmission section, the switching of the clutch mechanism in order to switch the setting from HST power transmission to HMT power transmission will be performed smoothly due to the relationship between the relative phases of the members on the transmission upstream side and the members on the transmission downstream side that configure the clutch mechanism. However, there is a configuration in which the output speed of the continuously variable shift section is detected, and the switching of the clutch mechanism is controlled based on result of the detection of the output speed of the continuously variable shift section so as to provide an output speed that corresponds to the output speed when in-unison rotation of the sun gear, the carrier, and the ring gear of the planetary power transmission section is achieved (in-unison rotation achievement speed) after the setting of the continuously variable shift section is switched when the setting is switched from HST power transmission to HMT power transmission. In this case, a problem tends to occur in which the traveling speed changes immediately after the setting is switched from HST power transmission to HMT power transmission. This will be described with reference to FIGS. 37 and 44.

FIG. 37 is a graph showing output characteristics of the shift power transmission device in the travel power transmission apparatus. A speed line that indicates the rotational speed of drive force outputted by the shift power transmission device is shown on the vertical axis. An operation position line L that passes through the position at which the rotational speed plotted on the vertical axis is zero "0", and that indicates the position of the swash plate of the hydraulic pump configuring the continuously variable shift section is shown on the horizontal axis. Here, "n" on the operation position line L is the operation position corresponding to the neutral position of the swash plate at which the continuously variable shift section is put into the neutral state. Also, "a" on the operation position line L is the set forward high-speed position, which is set as the maximum speed position on the forward side of the swash plate, which is operated in accordance with shift control. Also, "−max" on the operation position line L is the set reverse high-speed position, which is set as the maximum speed position on the reverse side of the swash plate, which is operated in accordance with shift control.

A shift line S that passes through the position at which the rotational speed is zero "0" is a no-load HST shift line S that indicates change in the output speed of the shift power transmission device when HST power transmission is set and no-load driving is being performed. A shift line range portion SF that corresponds to the range of the no-load HST shift line S between the swash plate positions "n" and "a" is the forward-side no-load HST shift line SF that indicates change in the output speed on the forward side. A shift line section SR that corresponds to the section of the no-load HST shift line S between the swash plate positions "n" and "−max" is the reverse-side no-load HST shift line SF that indicates change in the output speed on the reverse side: A shift line M that is continuous with the no-load HST shift line S is a no-load HMT shift line M that indicates change in the output speed of the shift power transmission device when HMT power transmission is set and no-load driving is being performed.

A shift line SA that passes through the position at which the rotational speed is zero "0" is a load HST shift line SA that indicates change in the output speed of the shift power transmission device when HST power transmission is set and load driving is being performed. An inclined line MA that intersects the load HST shift line SA is a load HMT shift line MA that indicates change in the output speed of the shift power transmission device when HMT power transmission is set and load driving is being performed.

Since the drive load applied to the shift power transmission device acts on the swash plate of the hydraulic pump configuring the continuously variable shift section, the no-load HST shift line SF and HMT shift line M are different from the load HST shift line SA and HMT shift line MA. In other words, the angle of inclination of the load HST shift line SA relative to the operation position line L is lower than the angle of inclination of the no-load HST shift line S relative to the operation position line L. In a simple configuration in which the rotation of the output shaft of the continuously variable shift section is inputted without being increased/decreased by the planetary power transmission section, when a position in front of the actual forward maximum speed position of an actually operable swash plate provided in the hydraulic pump of the continuously variable shift section is set as the set forward high-speed position "a" in order to maintain speed continuity at the point where there is a switch in the setting of HST power transmission and HMT power transmission, the angles of inclination of the no-load HST shift line S and HMT shift line M tend to be largely different from those of the load HST shift line SA and HMI shift line MA.

A horizontal line L1 that passes through the rotational speed "V" position on the vertical axis indicates the aforementioned in-unison rotation achievement speed. The rotational speed "V" is the same as "V1". FIG. 44 is an illustrative diagram showing a switch from HST power transmission to HMT power transmission. As shown in FIGS. 37 and 44, in the case of a configuration in which control is performed such that the setting is switched from HST power transmission to HMT power transmission when the output speed of the continuously variable shift section reaches the in-unison rotation achievement speed "V", during actual traveling in which the continuously variable shift section is performing load driving, the setting is switched from HST power transmission to HMT power transmission when the output speed of the continuously variable shift section, which is the output speed of the shift power transmission device, increases along the load HST shift line SA and reaches the in-unison rotation achievement speed "V", that is to say, reaches the output speed that corresponds to the intersection "X" between the load HST shift line SA and the horizontal line L1. The output speed of the shift power transmission device immediately after this switch is performed is the output speed "V0" that corresponds to the intersection "Y" between the load HMT shift line MA and the vertical line that passes through the intersection "X".

In other words, the output speed "V0" immediately after the setting is switched from HST power transmission to HMT power transmission is lower than "V" immediately before the switch, and there is a relatively large drop in speed. The greater the drive load is, the smaller the angle of inclination of the load HST shift line SA relative to the operation position line L is, and the greater the difference is between the output speed "V" immediately before the switch and the output speed "V0" immediately after the switch.

An object of the present invention is to provide a travel power transmission apparatus that can suppress or eliminate a change in speed that accompanies a switch from HST power transmission to HMT power transmission.

[4] The following(s) is/are issue(s) corresponding to Background Art [4].

The above-described travel power transmission apparatus may be configured such that the hydraulic motor that configures the continuously variable shift section is given a variable displacement configuration, an auxiliary shift actuator that operates so as to change the angle of the swash plate of the hydraulic motor is provided, and the hydraulic motor is shifted to a higher speed by controlling the auxiliary shift actuator through giving an auxiliary shift instruction by operating an auxiliary shift operation device: This is convenient due to being able to perform high-speed traveling when, for example, location change traveling is being performed. However, there are cases where even if an auxiliary shift operation for shifting the hydraulic motor to a higher speed is performed, the traveling speed decreases instead of increases.

Specifically, FIG. 50 is a graph showing output characteristics of a shift power transmission device. A speed line that indicates the rotational speed of drive force outputted by the shift power transmission device is shown on the vertical axis. An operation position line L that passes through the position at which the rotational speed plotted on the vertical axis is zero "0", and that indicates the position of the swash plate of the hydraulic pump configuring the continuously variable shift section is shown on the horizontal axis. Here, "n" on the operation position line L is the operation position corresponding to the neutral position of the swash plate at which the continuously variable shift section is put into the neutral state. Also, "a" on the operation position line L is the set forward high-speed position, which is set as the maximum speed position on the forward side of the swash plate, which is operated in accordance with shift control. Also, "-max" on the operation position line L is the set reverse high-speed position, which is set as the maximum speed position on the reverse side of the swash plate, which is operated in accordance with shift control.

A shift line S that passes through the position at which the rotational speed is zero "0" is an HST shift line S that indicates change in the output speed of the shift power transmission device when HST power transmission is set. A shift line portion SF that corresponds to the portion of the HST shift line S between the swash plate positions "n" and "a" is the forward-side HST shift line SF that indicates change in the output speed on the forward side. A shift line portion SR that corresponds to the portion of the HST shift line S between the swash plate positions "n" and "-max" is the reverse-side HST shift line SF that indicates change in the output speed on the reverse side. A shift line M that is continuous with the HST shift line S is an HMT shift line M that indicates change in the output speed of the shift power transmission device when HMT power transmission is set.

Control is performed such that the setting is switched between HST power transmission and HMT power transmission when the swash plate of the hydraulic pump reaches the set forward high-speed position "a". The shift power transmission device in the power transmission state setting the HMT power transmission increase the output speed, as the output speed of the continuously variable shift section increases due to the continuously variable shift section being shifted to a higher speed in the reverse shift range. On the other hand, the shift power transmission device in the power transmission state setting the HMT power transmission increases the output speed also, as the output speed of the continuously variable shift section decreases due to the continuously variable shift section being shifted to a lower speed in the forward shift range.

In other words, when the shift power transmission device is set to HMT power transmission, and furthermore is in a transmission state in which the combined drive force to be output is increased/decreased by performing a shift operation on the continuously variable shift section in the forward shift range, if the hydraulic motor is shifted to a higher speed, the continuously variable shift section is shifted such that the output speed increases, and the output speed of the shift power transmission device decreases, and thus the traveling speed decreases instead of increases.

An object of the present invention is to provide a travel power transmission apparatus that enables auxiliary shifting to be performed with a hydraulic motor while also avoiding the above-described shift problem.

Means for Solving Problem

[1] The following is means for solving the problem corresponding to Problem [1]:—

A shift power transmission apparatus comprising:
an input shaft receiving engine drive force;
a hydraulic continuously variable transmission driven by the input shaft;

a planetary power transmission section combining the drive force from the input shaft and an output from the hydraulic continuously variable transmission for outputting the combined drive force therefrom; and an output rotary member outputting power to a travel apparatus, wherein the planetary power transmission section and the output rotary member are arranged on a side of the hydraulic continuously variable transmission associated with an engine-coupled side of the input shaft; and wherein the drive force is inputted to the planetary power transmission section from a portion between the engine-coupled side and a hydraulic continuously variable transmission-coupled side of the input shaft.

According to this configuration, the planetary power transmission section and the output rotary member are arranged on the same side of the hydraulic continuously variable transmission as the side on which the engine-coupled side of the input shaft is located, and drive force is inputted to the planetary power transmission section from a site between the engine-coupled side and the hydraulic continuously variable transmission-coupled side of the input shaft, and thus the power transmission structure from the input shaft to the planetary power transmission section can be simple with as short a power transmission distance as possible. Since drive force is inputted to the planetary power transmission section from a site between the engine-coupled side and the hydraulic continuously variable transmission-coupled side of the input shaft, the distance from the site where engine drive force is inputted to the input shaft to the site where it is outputted to the planetary power transmission section can be made as small as possible, it is possible to suppress or avoid an increase in the size of the input shaft in order to suppress distortion of the input shaft caused by the drive load of the planetary power transmission section, it is possible to suppress drive load from being applied from the planetary power transmission section to the pump shaft, and it is possible to suppress or avoid an increase in the size of the pump shaft and suppress or avoid an increase in the size of the hydraulic continuously variable transmission.

Accordingly, in terms of the power transmission structure for power transmission from the input shaft to the planetary power transmission section, and in terms of the input shaft and the hydraulic continuously variable transmission, it is possible to obtain compactness in which an increase in size is suppressed or avoided.

In a preferred embodiment, the input shaft is coupled to a pump shaft of the hydraulic continuously variable transmission be rotatable in unison with each other, the input shaft being coaxially aligned with the pump shaft, and wherein a sun gear of the planetary power transmission section and the output rotary member are supported to be rotatable about a rotation axis extending coaxial with a motor shaft of the hydraulic continuously variable transmission.

According to this configuration, the driving of the hydraulic continuously variable transmission by the input shaft can be achieved with a compact interlocking structure in which the input shaft and the pump shaft are arranged coaxially. Furthermore, power transmission from the hydraulic continuously variable transmission to the planetary power transmission section and power transmission from the planetary power transmission section to the output rotary member can be achieved with a compact interlocking structure in which the sun gear, the output rotary member, and the motor shaft are arranged coaxially.

Accordingly, in terms of the driving of the hydraulic continuously variable transmission by the input shaft, and in terms of power transmission from the hydraulic continuously variable transmission to the planetary power transmission section and power transmission from the planetary power transmission section to the output rotary member, compactness can be achieved.

In a preferred embodiment, the shift power transmission apparatus further comprises:

an input-side clutch mechanism switching the planetary power transmission section between an interlocking-on state and an interlocking-off state with respect to the input shaft; and an output-side clutch mechanism switching the output rotary member between an interlocking-on state and an interlocking-off state with respect to the motor shaft of the hydraulic continuously variable transmission.

According to this configuration, when the planetary power transmission section is switched to the interlocking-off state with respect to the input shaft, and the output rotary member is switched to the interlocking-on state with respect to the motor shaft, shifting by HST mode power transmission can be performed such that engine drive force input by the input shaft is outputted from the output rotary member after being subjected to speed change by the hydraulic continuously variable transmission. When the planetary power transmission section is switched to the interlocking-on state with respect to the input shaft, and the output rotary member is switched to the interlocking-off state with respect to the motor shaft, shifting by HMT mode power transmission can be performed such that engine drive force input by the input shaft is transmitted to the planetary power transmission section, the engine drive force and output from the hydraulic continuously variable transmission are combined by the planetary power transmission section, and the combined drive force is outputted from the output rotary member.

Accordingly, it is possible to perform outputted by HST mode power transmission, and perform travel stop and forward/reverse switching with a simple operation performed by performing a shift operation on the hydraulic continuously variable transmission, and it is possible to perform outputted by HMT mode power transmission and perform travel at various speeds with favorable power transmission efficiency.

In a preferred embodiment, the shift power transmission apparatus further comprises:

a charge pump supplying hydraulic oil to the hydraulic continuously variable transmission, the charge pump being provided between the engine-coupled side and the hydraulic continuously variable transmission-coupled side of the input shaft.

According to this configuration, drive load of the charge pump is applied between the engine-coupled side and the hydraulic continuously variable transmission-coupled side of the input shaft, and is not readily applied to the pump shaft of the hydraulic continuously variable transmission.

Accordingly, the charge pump is driven by drive force from the input shaft, and it is possible to suppress an increase in the size of the pump shaft of the hydraulic continuously variable transmission, and to advantageously achieve the hydraulic continuously variable transmission.

In a preferred embodiment, the shift power transmission apparatus further comprises:

a charge pump supplying hydraulic oil to the hydraulic continuously variable transmission, the charge pump being provided between the engine-coupled side of the input shaft and an input-side clutch mechanism.

The hydraulic continuously variable transmission does not exist between the engine-coupled side of the input shaft and the input-side clutch mechanism, and it is easy to ensure pump arrangement space, and according to this configuration, the charge pump can be compactly provided at a site where it is easy to ensure pump arrangement space.

Accordingly, the charge pump is driven by drive force from the input shaft, and it is possible to achieve a simple apparatus in which the charge pump is provided in a compact manner.

[2] The following is means for solving the problem corresponding to Problem [2]:—

A shift power transmission apparatus comprising:
an input shaft receiving engine drive force;
a hydraulic continuously variable transmission driven by the input shaft;
a planetary power transmission section combining the drive force from the input shaft and an output from the hydraulic continuously variable transmission for outputting the combined drive force therefrom; and
an output rotary member outputting power to a travel apparatus,
wherein a forward/reverse switching mechanism is provided to be switchable between a forward power transmission state for converting the drive force from the input shaft into forward drive force to be transmitted to the planetary power transmission section, and a reverse power transmission state for converting the drive force from the input shaft into reverse drive force to be transmitted to the planetary power transmission section, and
the forward/reverse switching mechanism is further switchable to a neutral state in which power transmission between the input shaft and the planetary power transmission section is cut off; and
wherein a clutch mechanism is provided for switching interlock from the motor shaft of the hydraulic continuously variable transmission to the output rotary member between an on state and an off state.

According to this configuration, when the forward/reverse switching mechanism is switched to the neutral state, and the clutch mechanism is switched so that the motor shaft of the hydraulic continuously variable transmission and the output rotary member are put into the interlocking-on state, it is possible to achieve HST mode power transmission in which the hydraulic continuously variable transmission is driven by engine drive force input by the input shaft, the engine drive force input by the input shaft is not transmitted to the planetary power transmission section, the engine drive force is subjected to speed change by the hydraulic continuously variable transmission, and then transmitted to the output rotary member.

When the forward/reverse switching mechanism is switched to the forward power transmission state, and the clutch mechanism is switched an that the motor shaft of the hydraulic continuously variable transmission and the output rotary member are put into the interlocking-off state, it is possible to achieve forward-side HMT mode power transmission in which the hydraulic continuously variable transmission is driven by engine drive force input by the input shaft, the engine drive force input by the input shaft is converted into forward drive force by the forward/reverse switching mechanism and transmitted to the planetary power transmission section, output from the hydraulic continuously variable transmission and forward drive force from the forward/reverse switching mechanism are combined by the planetary power transmission section, the planetary power transmission section outputs the forward-side combined drive force, and the forward-side combined drive force is transmitted to the output rotary member.

When the forward/reverse switching mechanism is switched to the reverse power transmission state, and the clutch mechanism is switched on that the motor shaft of the hydraulic continuously variable transmission and the output rotary member are put into the interlocking-off state, it is possible to achieve reverse-side HMT mode power transmission in which the hydraulic continuously variable transmission is driven by engine drive force input by the input shaft, the engine drive force input by the input shaft is converted into reverse drive force by the forward/reverse switching mechanism and transmitted to the planetary power transmission section, output from the hydraulic continuously variable transmission and reverse drive force from the forward/reverse switching mechanism are combined by the planetary power transmission section, the planetary power transmission section outputs the reverse-side combined drive force, and the reverse-side combined drive force is transmitted to the output rotary member.

In other words, when the forward/reverse switching mechanism and the clutch mechanism are appropriately operated in accordance with a shift operation performed on the hydraulic continuously variable transmission, the relationship between the shift state of the hydraulic continuously variable transmission and the output speed of the output rotary member is as shown in FIG. 23. Specifically, as shown by a solid line FL in FIG. 23, in the state where HST mode power transmission is achieved, if the hydraulic continuously variable transmission is operated to the neutral position "n", the output changes to zero "0". While maintaining HST mode power transmission, as the hydraulic continuously variable transmission is shifted from the neutral position "n" toward the maximum speed position "+max" in the forward power transmission state, the forward output speed increases, and then the forward output speed reaches "FV1" when the hydraulic continuously variable transmission reaches the maximum speed position "+max" in the forward power transmission state. As shown by solid lines FM and FH, when the hydraulic continuously variable transmission reaches the maximum speed position "+max" in the forward power transmission state, HMT mode power transmission is achieved in place of HST mode power transmission, and, while maintaining forward-side HMT mode power transmission, as the hydraulic continuously variable transmission is shifted from the maximum speed position "+max" in the forward power transmission state toward the maximum speed position "−max" in the reverse power transmission state, the forward output speed increases steplessly, and the forward output reaches the maximum speed "FV2" when the hydraulic continuously variable transmission reaches the maximum speed position "−max" in the reverse power transmission state.

As shown by the solid line RL, in the state in which HST mode power transmission is maintained, if the hydraulic continuously variable transmission is shifted from the neutral position "n" toward the maximum speed position "−max" in the reverse power transmission state, the output changes to reverse output, and as the hydraulic continuously variable transmission is shifted from the neutral position "n" toward the maximum speed position "−max" in the reverse power transmission state, the reverse output speed increases steplessly, and then the reverse output speed reaches "RV1" when the hydraulic continuously variable transmission reaches the maximum speed position "−max" in the reverse power transmission state. As shown by solid lines RM and RH, when the hydraulic continuously variable transmission reaches the maximum speed position "−max" in the reverse power transmission state, reverse-side HMT mode power transmission is achieved in place of HST mode power transmission, and, while maintaining reverse-side HMT mode power transmission, as the hydraulic continuously variable transmission is shifted from the maximum speed position "−max" in the reverse power transmission state to the maximum speed position "+max" in the forward power transmission state, the reverse output speed increases steplessly, and the reverse output reaches the maximum speed "RV2" when the hydraulic continuously variable transmission reaches the maximum speed position "+max" in the forward power transmission state. The maximum reverse output speed "RV2" is higher than the reverse output speed "RV1" when the hydraulic continuously variable transmission is operated to the maximum speed position "−max" in the reverse power transmission state.

By merely performing a shift operation on the hydraulic continuously variable transmission in the shift range from the forward output speed "FV1" to the reverse output speed "RV1", it is possible to perform shifting and forward/reverse switching without switching the forward/reverse switching mechanism.

Accordingly, it is possible to stop the travel apparatus with a simple operation by merely shifting the hydraulic continuously variable transmission to the neutral position, it is possible to switch the travel apparatus between forward driving and reverse driving with a simple operation by merely shifting the hydraulic continuously variable transmission from the neutral position to a forward position or a reverse position, and in the case of driving the travel apparatus in reverse, it is possible to perform driving at various speeds over a wide shift range in reverse-side HMT mode power transmission, and in a combine, dozer vehicle, or the like, forward and reverse can be easily repeated, relatively high-speed reverse travel is possible, and adjustment and position changing and the like can be performing easily, swiftly, and efficiently.

Furthermore, HST mode power transmission can be achieved by cutting off power transmission to the planetary power transmission section with using the forward/reverse switching mechanism as a clutch device, and this can be achieved with a simple structure.

In a preferred embodiment, in the on state of the clutch mechanism, a sun gear, a planet gear and a ring gear of the planetary power transmission section are interlocked with the motor shaft of the hydraulic continuously variable transmission to be rotatable with the motor shaft.

According to this configuration, when HST mode power transmission is achieved, the sun gear, planet gears, and ring gear of the planetary power transmission section rotate in unison with the motor shaft, and there is no relative rotation of the sun gear and the planet gears, and no relative rotation of the planet gears and the ring gear.

This enables performing power transmission by HST mode power transmission while avoiding power loss caused by relative rotation of the sun gear, the planet gears, and the ring gear.

In a preferred embodiment, the forward/reverse switching mechanism includes:

a forward power transmission gear supported on the input shaft to be rotatable relative thereto, the forward power transmission gear being interlocked with the planetary power transmission section;

a forward clutch member supported on the input shaft to be rotatable in unison therewith and slidable relative thereto for switching the forward power transmission gear and the input shaft between an interlocking-on state and an interlocking-off state in association with engagement with and disengagement from the forward power transmission gear;

a reverse power transmission shaft supporting one of the input gear interlocked with the input shaft and the reverse power transmission gear interlocked with the planetary power transmission section to be rotatable relative thereto, and the reverse power transmission shaft supporting thereon the other of the input gear and the reverse power transmission gear to rotatable in unison therewith; and a reverse clutch member supported on the reverse power transmission shaft to be rotatable in unison therewith and slidable relative thereto, wherein when the reverse clutch member is engaged with and disengaged from the one of the input gear and the reverse power transmission gear, which one gear is supported on the reverse power transmission shaft to be rotatable relative thereto to be clutched by the reverse clutch member, the reverse clutch member switches the one gear and the reverse power transmission shaft between an interlocking-on state and an interlocking-off state.

According to this configuration, the forward clutch member can be supported using the input shaft as the support shaft, and this consequently makes it possible for simply the reverse power transmission shaft to be used as the power transmission shaft that is to be added, and for the forward/reverse switching mechanism to be configured with a simple structure.

This makes it possible for the forward/reverse switching mechanism to be configured inexpensively and with a simple structure.

In a preferred embodiment, the input gear, and a power transmission gear supported on the input shaft to be rotatable in unison and mesh therewith, are arranged on a side of the planetary power transmission section opposite from the forward power transmission gear and the reverse power transmission gear, and wherein the forward power transmission gear and the reverse power transmission gear are meshed with a second input gear provided at a portion of the sun gear of the planetary power transmission section opposite from the input gear and the power transmission gear.

According to this configuration, the outer peripheral side portion of the planetary power transmission section is arranged in between the input gear and the reverse power transmission gear or in between the power transmission gear and the forward power transmission gear, thus making it possible for the forward/reverse switching mechanism and the planetary power transmission section to be disposed together compactly.

This makes it possible to obtain a small-sized shift power transmission apparatus in which the forward/reverse switching mechanism and the planetary power transmission section are arranged together compactly.

[3] The following is means for solving the problem corresponding to Problem [3]:—

A travel power transmission apparatus comprising:

a shift power transmission device including a hydrostatic continuously variable shift section and a planetary power transmission section; the hydrostatic continuously variable shift section receiving drive force from an engine and outputting the drive force after changing speed of the drive force along an HST shift line by the continuously variable shift section; and the planetary power transmission section receiving and combining the drive force from the engine and the speed-changed drive force from the continuously variable shift section, and outputting the combined drive force after changing speed of the combined drive force along an HMT shift line by the continuously variable shift section;

the shift power transmission device further including a clutch mechanism switchable between an HST setting state in which HST power transmission is set for outputting the speed-changed drive force from the continuously variable shift section to a travel apparatus, and an HMT setting state in which HMT power transmission is set for outputting the combined drive force from the planetary power transmission section is outputted to the travel apparatus; and a shift control module for performing shift control on a hydraulic pump of the continuously variable shift section and switch control on the clutch mechanism, based on a shift instruction from a shift operation device, wherein the travel power transmission apparatus further comprises:

a swash plate angle sensor detecting a swash plate angle of the hydraulic pump; and a shift swash plate angle setting module for setting, as a set shift swash plate angle of the hydraulic pump, the swash plate angle between a no-load swash plate angle and a load swash plate angle, wherein the no-load swash plate angle is achieved by the hydraulic pump in a shift state for outputting speed-changed drive force at a speed corresponding to an in-unison rotation achievement speed at which the continuously variable shift section achieves in-unison rotation of a sun gear, a carrier and a ring gear of the planetary power transmission section during the HST power transmission and no-load driving, and wherein the load swash plate angle is achieved by the hydraulic pump in a shift state for outputting the speed-changed drive force at a speed corresponding to the in-unison rotation achievement speed of the continuously variable shift section during the HST power transmission and set load driving; and wherein the shift control module is configured to control the clutch mechanism to be switched from the HST setting state to the HMT setting state when the swash plate angle sensor detects the swash plate angle equal to the set shift swash plate angle.

According to this configuration, the setting is switched from HST power transmission to HMT power transmission as shown in FIG. 39.

Specifically, when the setting is switched from HST power transmission to HMT power transmission not at the point in time when the output speed of the continuously variable shift section increasing along the load HST shift line SA reaches the in-unison rotation achievement speed "V", but rather at the point in time when it reaches the output speed "VS" that corresponds to the intersection "S1" between the load HST shift line SA and the vertical line that passes through the set shift swash plate angle "c", and the output speed achieved by the shift power transmission device immediately after the setting is switched from HST power transmission to HMT power transmission is the output speed "VM" that corresponds to the intersection "M1" between the load HMT shift line MA and the vertical line that passes through the set shift swash plate angle "c".

Specifically, the output speed "VS" of the continuously variable shift section when the setting is switched from HST power transmission to HMT power transmission is an output speed that is slower than the in-unison rotation achievement speed "V". Furthermore, the output speed "VM" immediately after the setting is switched from HST power transmission to HMT power transmission is faster than the output speed "V0" of the shift power transmission device immediately after the switch when the setting is switched from HST power transmission to HMT power transmission when the output speed of the continuously variable shift section reaches the in-unison rotation achievement speed "V". Also, the amount of change in the traveling speed that accompanies a switch from HST power transmission to HMT power transmission can correspond to the difference in speed between the output speed "VS" immediately before the switch and the output speed "VM" immediately after the switch, and this difference in speed can be made smaller than the difference in speed between the output speed "V" immediately before the switch and the output speed "V0" immediately after the switch when the switching of the setting from HST power transmission to HMT power transmission is performed based on the output speed.

According to the setting of the set shift swash plate angle "c", the setting is switched from HST power transmission to HMT power transmission as shown in FIG. 41.

Specifically, when the setting is switched from HST power transmission to HMT power transmission when the output speed of the continuously variable shift section increasing along the load HST shift line SA reaches the output speed VS1 that corresponds to the intersection "W" between the load HST shift line SA and the load HMT shift line MA, and the output speed "VS1" of the continuously variable shift section immediately before the setting is switched and the output speed "VM1" of the shift power transmission device immediately after the setting is switched are the output speed that corresponds to the intersection "W".

Specifically, the output speed "VS1" of the continuously variable shift section immediately before the setting is switched from HST power transmission to HMT power transmission is the same as the output speed "VM1" of the shift power transmission device immediately after the setting is switched from HST power transmission to HMT power transmission, and it is possible to eliminate change in the traveling speed that accompanies a switch in the setting from HST power transmission to HMT power transmission.

Accordingly, the setting can be switched from HST power transmission to HMT power transmission, forward/reverse switching can be performed with a simple operation by merely shifting forward or reverse via the neutral position of the continuously variable shift section, and it is possible to shift from an HST power transmission speed range to an HMT power transmission speed range comfortably and with little shift shock and unpleasantness caused by a reduction in speed.

In a preferred embodiment, the shift swash plate angle setting module has an adjustable configuration such that the setting of the set shift swash plate angle can be changed.

According to this configuration, the set shift swash plate angle is changed by the adjustment of the shift swash plate angle setting module, and it is possible to suppress or prevent a large change in traveling speed due to a change in drive load when the swash plate angle for switching the setting from HST power transmission to HMT power transmission is changed and then the setting is switched from HST power transmission to HMT power transmission.

Accordingly, even if the drive load changes due to being in a different work field or the like, shifting from an HST power transmission speed range to an HMT power transmission speed range can be performed comfortably with little or no shift shock or unpleasantness.

In a preferred embodiment, the shift swash plate angle setting module is configured to:

calculate and set a calculated HST shift line for the HST power transmission and the load driving based on detection information from the swash plate angle sensor, calculate and set a calculated HMT shift line corresponding to the calculated HST shift line, determine the swash plate angle achieved by the hydraulic pump in a shift state in which the continuously variable shift section outputs the speed-changed drive force at a speed corresponding to an intersection between the calculated HST shift line and the calculated HMT shift line, and set the determined swash plate angle as the set shift swash plate angle.

According to this configuration, even if the drive load changes during traveling and a load HST shift line with a different angle of inclination appears, a calculated HST shift line and a calculated HMT shift line that correspond to the changing drive load are calculated and set. Based on the calculated HST shift line and the calculated HMT shift line, the swash plate angle that corresponds to the intersection between the calculated HST shift line and the calculated HMT shift line and is the swash plate angle at which the traveling speed immediately before the switch from the HST power transmission to the HMT power transmission is the same as the traveling speed immediately after the switch is determined and set as the set shift swash plate angle, and then the switch from HST power transmission to HMT power transmission is performed. This enables making a change in traveling speed that accompanies a switch from HST power transmission to HMT power transmission slight or non-existent.

Accordingly, even if the drive load changes during traveling, shifting from an HST power transmission speed range to an HMT power transmission speed range can be performed comfortably with little or no shift shock or unpleasantness.

[4] The following is means for solving the problem corresponding to Problem [4]:

A travel power transmission apparatus comprising:

a shift power transmission device including a hydrostatic continuously variable shift section and a planetary power transmission section; the hydrostatic continuously variable shift section receiving drive force from an engine and outputting the drive force after changing speed of the drive force along an HST shift line by the continuously variable shift section; and the planetary power transmission section receiving and combining the drive force from the engine and the speed-changed drive force from the continuously variable shift section, and outputting the combined drive force after changing speed of the combined drive force along an HMT shift line by the continuously variable shift section;

the shift power transmission device further including a clutch mechanism switchable between an HST setting state in which HST power transmission is set for outputting the speed-changed drive force from the continuously variable shift section to a travel apparatus, and an HMT setting state in which HMT power transmission is set for outputting the combined drive force from the planetary power transmission section is outputted to the travel apparatus; and a shift control module for performing shift control on a hydraulic pump of the continuously variable shift section and switch control on the clutch mechanism, based on a main shift instruction from a main shift operation device, wherein a hydraulic motor of the continuously variable shift section is provided in form of a variable displacement motor, the travel power transmission apparatus further comprises an auxiliary shift operation device which is manually operable to issue an auxiliary shift instruction, and an auxiliary shift actuator operable to change a swash plate angle of the hydraulic motor, the shift control module is configured to control the auxiliary shift actuator such that the hydraulic motor is shifted to a higher speed side based on the auxiliary shift instruction, and wherein the travel power transmission apparatus further comprises a restraint control module, the restraint control module being configured such that:

when the shift power transmission device is set to the HMT power transmission, and when a power transmission state is achieved in which the combined drive force to be outputted to the travel apparatus is increased in response to a speed-increase shift operation in a reverse shift range of the continuously variable shift section, and in which the combined drive force to be outputted to the travel apparatus is decreased in response to a speed-decrease shift operation in the reverse shift range of the continuously variable shift section, the restraint control module cancels restraint to permit control on the auxiliary shift actuator by the shift control module; and when the shift power transmission device is set to the HMT power transmission, and when a power transmission state is achieved in which the combined drive force to be outputted to the travel apparatus is increased in response to a speed-decrease shift operation in the forward shift range of the continuously variable shift section, and in which the combined drive force to be outputted to the travel apparatus is decreased in response to a speed-increase shift operation in the forward shift range of the continuously variable shift section, the restraint control module performs restraint to stop control on the auxiliary shift actuator by the shift control module.

According to this configuration, when the shift power transmission device is set to HMT power transmission and is in the power transmission state in which the combined drive force to be outputted to the travel apparatus is increased by shifting the continuously variable shift section to a higher speed in the reverse shift range, the restraint control module cancels restraint with respect to the shift control module, and when an auxiliary shift instruction is issued due to the auxiliary shift operation device being operated, the shift control module controls the auxiliary shift actuator so as to shift the hydraulic motor to a higher speed. Since the hydraulic motor is shifted to a higher speed in the power transmission state in which the output speed of the shift power transmission device increases by increasing the output speed of the continuously variable shift section, the output speed of the shift power transmission device increases in response to an increase in the speed of the hydraulic motor.

According to this configuration, when the shift power transmission device is set to HMT power transmission and is in the power transmission state in which the combined drive force to be outputted to the travel apparatus is increased by shifting the continuously variable shift section to a lower speed in the forward shift range, the restraint control module performs restraint on the shift control module, and even if an auxiliary shift instruction is issued due to the auxiliary shift operation device being operated, the hydraulic motor is not shifted to a higher speed by the shift control module. This enables avoiding the occurrence of a situation in which the output speed of the shift power transmission device decreases when the hydraulic motor is shifted to a higher speed regardless of being in the power transmission state in which the output speed of the shift power transmission device increases due to a decrease in the output speed of the continuously variable shift section.

Accordingly, the setting can be switched between HST power transmission and HMT power transmission, the device can be switched between forward and reverse with a simple operation of merely performing a forward or reverse shift operation via the neutral state of the continuously variable shift section, auxiliary shifting can be performed by shifting of the hydraulic motor, and shifting can be performed comfortably without the problem where the traveling speed decreases regardless of the fact that the auxiliary shift operation device was operated.

In a preferred embodiment, the travel power transmission apparatus further comprises:

a reference swash plate angle setting module configured to set, as a reference swash plate angle, a swash plate angle of the hydraulic pump located on a lower speed side by a set angle relative to the swash plate angle at which the HST power transmission is switched to the HMT power transmission, wherein when the shift power transmission device is set to the HST power transmission, and when the swash plate angle of the hydraulic pump is on the low speed side relative to the reference swash plate angle, the restraint control module cancels the restraint, and wherein when the shift power transmission device is set to the HST power transmission, and when the swash plate angle of the hydraulic pump is on the high speed side relative to the reference swash plate angle, the restraint control module performs the restraint.

When HST power transmission is set and auxiliary shifting for shifting the hydraulic motor to a higher speed is performed, and when the output speed increases along the auxiliary shifting setting HST shift line, which is shifted from the HST shift line where there is no auxiliary shifting setting, an intersection between the HMT shift line and the HST shift line for when auxiliary shifting is not set for switching the setting from HST power transmission to HMT power transmission ceases to appear, and it becomes difficult to smoothly switch the clutch mechanism for switching the setting from HST power transmission to HMT power transmission. In contrast, according to the above configuration, when the swash plate angle of the hydraulic pump exceeds the reference swash plate angle, the restraint control module enters the state of performing restraint on the shift control module, and it is not possible to set auxiliary shifting by shifting the hydraulic motor to a higher speed. This makes it possible to reliably cause the intersection between the HMT shift line and the HST shift line for when auxiliary shifting is not set to appear, and to smoothly switch the clutch mechanism for switching the setting from HST power transmission to HMT power transmission.

Accordingly, it is possible to perform auxiliary shifting by shifting the hydraulic motor, and a shift from an HST power transmission speed range to an HMT power transmission speed range can be performed comfortably and without shift shock by smoothly switching the clutch mechanism.

In a preferred embodiment, when the restraint control module performs the restraint, the shift control module is configured to perform shift control on the hydraulic pump based on the main shift instruction and the auxiliary shift instruction such that the output speed of the shift power transmission device corresponding to the main shift instruction will increase in accordance with the auxiliary shift instruction.

If the restraint control module performs restraint so that auxiliary shifting by the hydraulic motor is not performed even if the auxiliary shift operation device is operated, and the traveling speed does not increase, unpleasantness will be felt, in that the traveling speed will not increase even though an auxiliary shifting operation is being performed. According to this configuration, if the restraint control module is performing restraint so that auxiliary shifting by the hydraulic motor is not performed even if the auxiliary shift operation device is operated, the shift control module performs shift control on the hydraulic pump, and the output speed of the shift power transmission device increases in accordance with the main shift instruction, and the travel speed can be increased.

Accordingly, when the auxiliary shift operation device is operated, even if auxiliary shifting by the hydraulic motor is not performed, auxiliary shifting is performed by the hydraulic pump, thus enabling performing favorable shifting without unpleasantness in that the travel speed does not increase even though an auxiliary shift operation is performed.

Other features and advantageous effects achieved by them will become apparent from reading the following description with reference to the accompanying drawings.

BRIEF DESCRIPTION OF THE DRAWINGS

FIG. 5 is an illustrative diagram showing the relationship that the operation states of an input-side clutch mechanism and an output-side clutch mechanism, the operation state of a power transmission switching clutch mechanism and the power transmission mode of the shift power transmission apparatus have with each other.

FIG. 9 is an illustrative diagram showing the relationship that the operation states of a hydraulic continuously variable transmission, a forward clutch, a reverse clutch and an output-side clutch mechanism have with the power transmission mode of the shift power transmission apparatus.

FIG. 10 is an illustrative diagram showing the output speed of the shift power transmission apparatus having the first alternative embodiment structure.

FIG. 11 is a block diagram showing the shift operation apparatus that performs shift operations on the shift power transmission apparatus having the first alternative embodiment structure.

FIG. 12 is a front view in vertical section of a shift power transmission apparatus having a second alternative embodiment structure.

FIG. 22 is an illustrative diagram showing the relationship that the operation states of a hydraulic continuously variable transmission, a forward clutch, a reverse clutch and an output-side clutch mechanism have with the power transmission mode of the shift power transmission apparatus.

FIG. 23 is an illustrative diagram showing the relationship between shift state of a hydraulic continuously variable transmission and the output speed of the shift power transmission apparatus.

FIG. 24 is a block diagram showing a shift operation apparatus.

FIG. 32 is an illustrative diagram showing the relationship that the operation states of an HMT clutch and an HST clutch, the operation state of a power transmission switching clutch mechanism, and the power transmission mode of the shift power transmission device have with each other.

FIG. 49 is an illustrative diagram showing the relationship that the operation states of an HMT clutch and an HST clutch, the operation state of a power transmission switching clutch mechanism and the power transmission mode of the shift power transmission apparatus have with each other.

EMBODIMENTS OF THE INVENTION

Embodiments of the present invention applied to a combine will be described hereinafter with reference to the drawings.

First Embodiment

Figure 1:
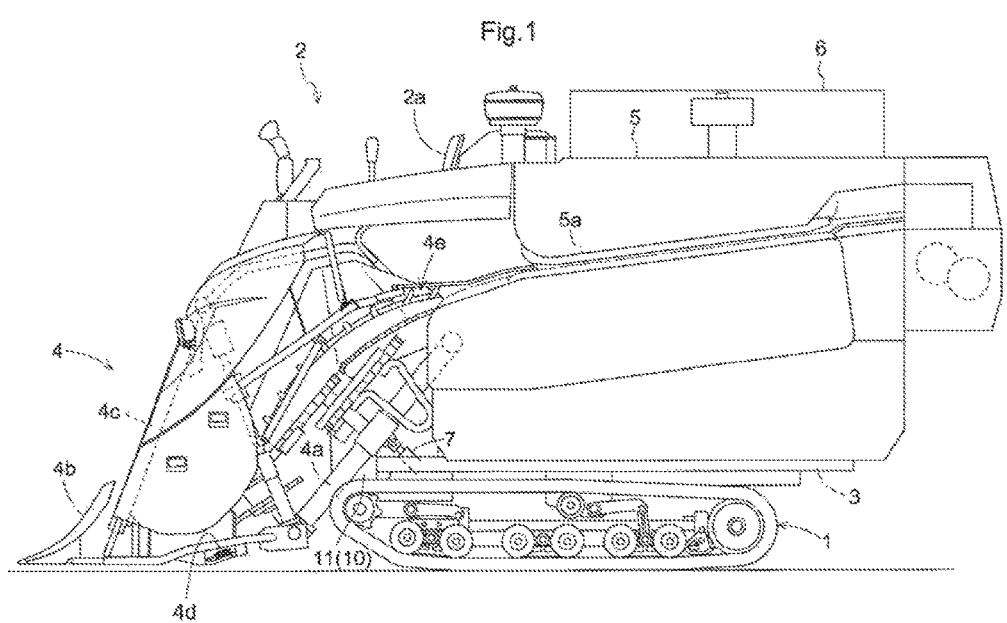
FIG. 1 is a figure pertaining to a first embodiment (the same follows through to FIG. 16), showing a side view of an entire combine.

As shown in FIG. 1, the combine, which performs the task of harvesting rice, barley, and the like, is configured to be self-propelled with a pair of right and left crawling travel apparatuses 1, and is configured to include a traveling body equipped with a riding driving section 2, a reaping section 4 coupled to the front portion of a body frame 3 of the traveling body, a threshing apparatus 5 provided no as to be arranged rearward of the reaping section 4 on the rear side of the body frame 3, and a grain tank 6 provided so as to be arranged to the side of the threshing apparatus 5 on the rear side of the body frame 3.

Specifically, the reaping section 4 includes a reaping section frame 4a that extends forward from the front portion of the body frame 3 in a vertically swingable manner, and when the reaping section frame 4a is swung by an elevating cylinder 7, the reaping section 4 moves up/down between a lowered operating position at which a divider 4b, which is provided at the front edge portion of the reaping section 4, is lowered close to the ground, and a raised non-operating position at which the divider 4b is raised high above the ground. When the traveling body is caused to travel with the reaping section 4 lowered to the lowered operating position, the reaping section 4 operates such that reaping-target planted stalks are guided to a raising path by the divider 4b, the planted stalks that were guided to the raising path are reaped by a clipper-type reaping apparatus 4d while being raised up by a raising apparatus 4c, and the reaped stalks are supplied to the threshing apparatus 5 by a supplying apparatus 4e. In the threshing apparatus 5, the reaped stalks are conveyed from the supplying apparatus 4e toward the rear of the apparatus body with their base sides clamped by a threshing feed chain 5a, the ear tip-sides of the reaped stalks are supplied to a handling compartment (not shown) where they are subjected to reaping processing, and the reaped grain is fed to the grain tank 6.

The combine is configured such that an engine 8 is provided underneath a driver seat 2a provided in the driving section 2, and drive force outputted by the engine 8 is transmitted to the pair of right and left travel apparatuses 1 by a power transmission structure 10 that includes a transmission case 11 provided at the front edge portion of the body frame 3.

Figure 2:
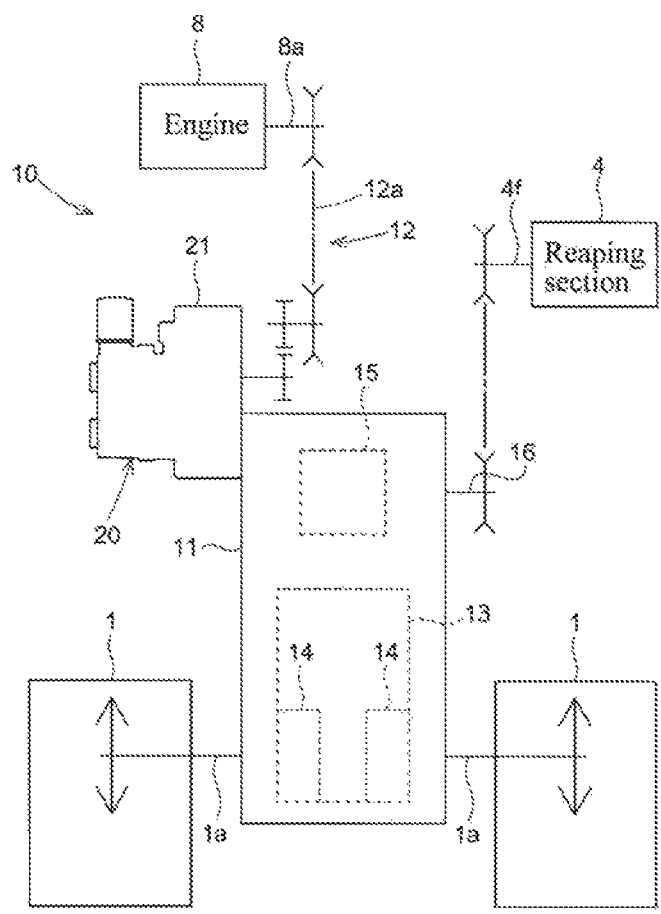
FIG. 2 is a schematic front view of a power transmission structure.

FIG. 2 is a front view of the schematic structure of the power transmission structure 10. As shown in this figure, in the power transmission structure 10, engine drive force from an output shaft 8a of the engine 8 is inputted to a shift power transmission apparatus 20 provided on the side of the upper end portion of the transmission case 11 via a power train 12 provided with a power transmission belt 12a. Output of the shift power transmission apparatus 20 is inputted to a traveling transmission 13 provided inside the transmission case 11, then transmitted from a left-side steering clutch mechanism 14, which is one of a pair of right and left steering clutch mechanisms 14 included in the traveling transmission 13, to a drive shaft 1a of the left-side travel apparatus 1, and also transmitted from the right-side steering clutch mechanism 14 to a drive shaft 1a of the right-side travel apparatus 1.

The power transmission structure 10 includes a reaping transmission 15 that is provided inside the transmission case 11, and output of the shift power transmission apparatus 20 is inputted to the reaping transmission 15 and transmitted from a reaping output shaft 16 to a drive shaft 4f of the reaping section 4.

Next, the shift power transmission apparatus 20 will be described.

Figure 3:
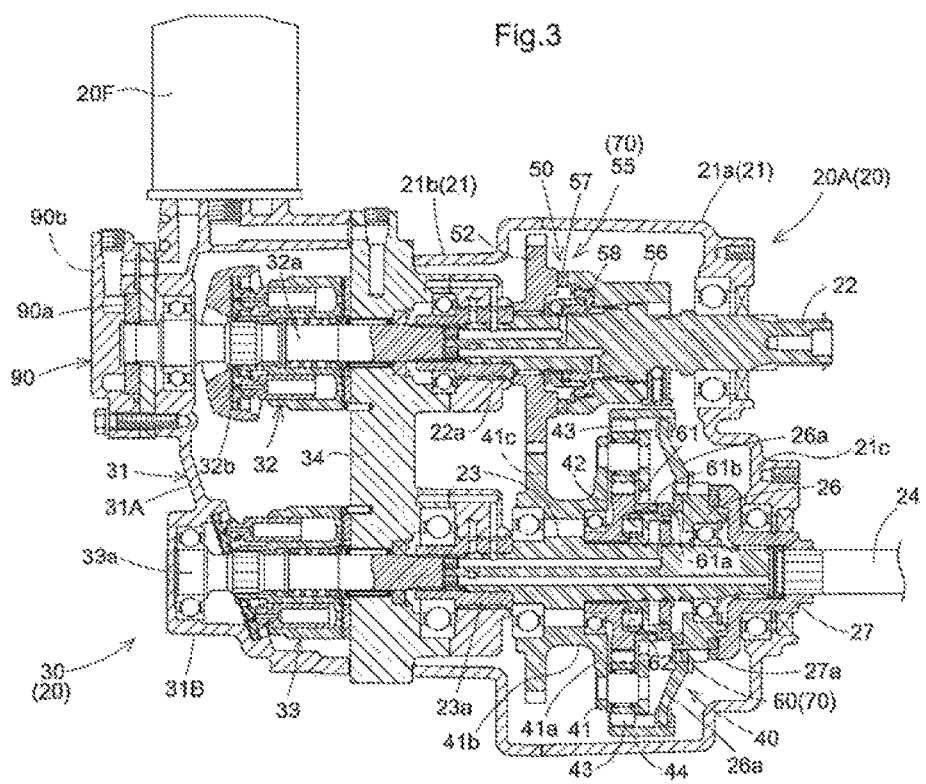
FIG. 3 is a front view in vertical section showing a shift power transmission apparatus during HMT (Hydraulic Mechanical Transmission) mode power transmission.
Figure 4:
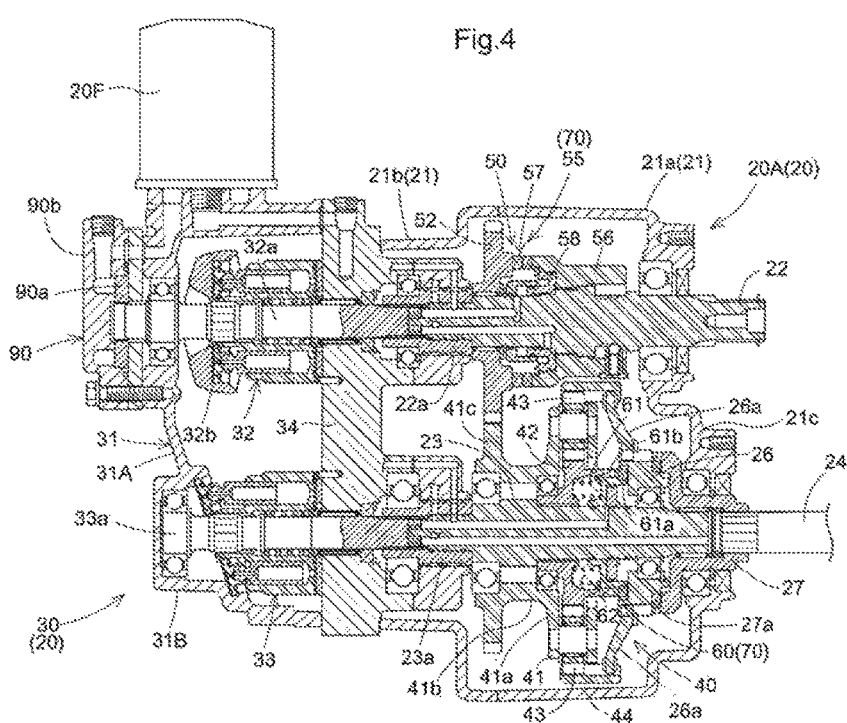
FIG. 4 is a front view in vertical section showing the shift power transmission apparatus during HST (Hydraulic Static Transmission) mode power transmission.

As shown in FIGS. 3 and 4, the shift power transmission apparatus 20 is configured to include a planetary shift section 20A, which is provided with a shift case 21 whose side portion is coupled to the upper end side of the transmission case 11, and a hydraulic continuously variable transmission 30 that has a casing 31 coupled to the side portion on the side opposite to the side on which the shift case 21 is coupled to the transmission case 11.

The shift case 21 is configured to include a main case portion 21a that accommodates a planetary power transmission section 40 and a power train 50, and a coupling case portion 21b that accommodates a connection portion between the hydraulic continuously variable transmission 30 and an input shaft 22 and a power transmission shaft 23, and that couples the shift case 21 with a port block 34 of the casing 31. The shift case 21 is coupled to the transmission case 11 with a bulging portion 21c formed so as to bulge outward horizontally on the side face of the lower portion of the main case portion 21a where the output rotary member 24 is located. The size of the coupling case portion 21b in the up/down direction of the traveling body is smaller than the size of the main case portion 21a in the up/down direction of the traveling body. The main case portion 21a is formed such that the shape in vertical section is vertically elongated when viewed in the front/rear direction of the apparatus body, the casing 31 is formed such that the shape in vertical section is vertically elongated when viewed in the front/rear direction of the apparatus body, the planetary shift section 20A and the hydraulic continuously variable transmission 30 are aligned in the horizontal direction of the apparatus body such that the shift power transmission apparatus 20 has a small width overall in the horizontal direction of the apparatus body, and the shift power transmission apparatus 20 is coupled to the lateral side of the transmission case 11 in a compact state with respect to the left/right direction of the traveling body so as to not protrude outward horizontally. Furthermore, the side face of the lower portion of the casing 31 is formed so as to have an inclined face 31A that is inclined toward the interior of the apparatus in the downward direction. A bulging portion 31B that supports a bearing of a motor shaft 33A is formed on the inclined face 31A, thus making the shift power transmission apparatus 20 even more compact. Also, an oil filter 20F is arranged facing upward on the upper face of the casing 31, and further compactness is achieved by preventing the oil filter 20F from protruding outward horizontally.

The planetary shift section 20A includes the input shaft 22 that is oriented in the horizontal direction of the apparatus body and is rotatably supported to the upper end side of the shift case 21, a power transmission shaft 23 and a rotating shaft-type of output rotary member 24 that are rotatably supported to the lower end side of the shift case 21 parallel or substantially parallel to the input shaft 22, the planetary power transmission section 40 that is supported to the power transmission shaft 23, and the power train 50 provided so as to span from the input shaft 22 to a carrier 41 of the planetary power transmission section 40.

The input shaft 22 is arranged so as to be coaxially aligned with a pump shaft 32a of the hydraulic continuously variable transmission 30. The input shaft 22 is configured such that on the side on which it protrudes laterally outward from the shift case 21, it is coupled with an output shaft 8a of the engine 8 via the power train 12, and on the side opposite to the side coupled to the engine 8, it is coupled to the pump shaft 32a of the hydraulic continuously variable transmission 30 so as to be capable of in-unison rotation therewith via a joint 22a. The input shaft 22 receives engine drive force via the power train 12, and drives the hydraulic pump 32 of the hydraulic continuously variable transmission 30 upon being driven by engine drive force.

The output rotary member 24 is arranged so as to be coaxially aligned with a motor shaft 33a of the hydraulic continuously variable transmission 30 on the same side of the hydraulic continuously variable transmission 30 as the side on which the engine-coupled side of the input shaft 22 is located. The output rotary member 24 is configured such that on the side on which it protrudes laterally outward from the shift case 21, it is interlocked with an input portion of the traveling transmission 13, and outputs drive force from the planetary power transmission section 40 and the hydraulic continuously variable transmission 30 to the pair of right and left travel apparatuses 1 via the traveling transmission 13.

The hydraulic continuously variable transmission 30 is configured to include the hydraulic pump 32 whose pump shaft 32a is rotatably supported to the upper end side of the casing 31, and the hydraulic motor 33 whose motor shaft 33a is rotatably supported to the lower end side of the casing 31. The hydraulic pump 32 is configured by a variable displacement axial plunger pump, and the hydraulic motor 33 is configured by an axial plunger motor. The hydraulic motor 33 is driven by hydraulic oil that is discharged from the hydraulic pump 32 and supplied via an oil path formed inside the port block 34. The hydraulic continuously variable transmission 30 is supplied with replenishing hydraulic oil by a charge pump 90 mounted to an end portion of the pump shaft 32a. The charge pump 90 includes a rotor 90a attached to the pump shaft 32a so as to be capable of in-unison rotation therewith, and a pump casing 90b that is removably coupled to the casing 31.

Accordingly, the hydraulic continuously variable transmission 30 switches between the forward power transmission state, the reverse power transmission state, and the neutral state by an operation for changing the angle of a swash plate 32b that the hydraulic pump 32 is provided with. When the hydraulic continuously variable transmission 30 is switched to the forward power transmission state, engine drive force transmitted from the input shaft 22 to the pump shaft 32a is converted into forward drive force and output from the motor shaft 33a, and when it is switched to the reverse power transmission state, engine drive force transmitted from the input shaft 22 to the pump shaft 32a is converted into reverse drive force and output from the motor shaft 33a, and thus engine drive force is subjected to stepless speed changing and output in both the forward power transmission state and the reverse power transmission state. When the hydraulic continuously variable transmission 30 is switched to the neutral state, output from the motor shaft 33a is stopped.

The planetary power transmission section 40 is arranged so as to be located between the motor shaft 33a and the output rotary member 24 on the same side of the hydraulic continuously variable transmission 30 as the side on which the engine-coupled side of the input shaft 22 is located. The planetary power transmission section 40 includes a sun gear 42 that is supported to the power transmission shaft 23, multiple planet gears 43 that are meshed with the sun gear 42, a ring gear 44 that is meshed with the planet gears 43, and a carrier 41 that rotatably supports the planet gears 43. The carrier 41 includes arm portions 41a that rotatably support the planet gears 43 with an extending end portion, and a tube shaft portion 41b that is coupled to base sides of the arm portions 41a, and the carrier 41 is rotatably supported to the power transmission shaft 23 with the tube shaft portion 41b via a bearing.

The power transmission shaft 23 and the motor shaft 33a are coupled to each other via a joint 23a so as to be capable of in-unison rotation, the power transmission shaft 23 and the sun gear 42 are coupled via a spline structure so as to be capable of in-unison rotation, and the sun gear 42 is interlocked with the motor shaft 33a so as to be capable of in-unison rotation.

The ring gear 44 and the output rotary member 24 are interlocked so as to be capable of in-unison rotation, using an annular planet-side interlocking member 26 and an annular output-side interlocking member 27 that are aligned axially with the power transmission shaft 23 and fit around it so as to be capable of relative rotation. Specifically, the planet-side interlocking member 26 includes multiple engaging arm portions 26a that extend radially from the outer circumferential portion of the planet-side interlocking member 26 so as to be capable of in-unison rotation. The engaging arm portions 26a are engaged with the ring gear 44 at multiple locations, and the planet-side interlocking member 26 is interlocked with the ring gear 44 so as to be capable of in-unison rotation. The output-side interlocking member 27 is engaged with the planet-side interlocking member 26 using an engaging claw 27a so as to be capable of in-unison rotation, is engaged with the output rotary member 24 using a spline structure so as to be capable of in-unison rotation, and is coupled to the planet-side interlocking member 26 and the output rotary member 24 so as to be capable of in-unison rotation. The planet-side interlocking member 26 is supported to the power transmission shaft 23 via a bearing so as to be capable of relative rotation. The output-side interlocking member 27 is rotatably supported to the shift case 21 via a bearing.

The power train 50 is configured to include a power transmission gear 52 that is supported to the input shaft 22 via a needle bearing so as to be capable of relative rotation in a state of being meshed with an input gear 41c of the carrier 41 that is provided so as to be capable of in-unison rotation with the tube shaft portion 41b of the carrier 41, and an input-side clutch mechanism 55 provided so as to span between the power transmission gear 52 and the input shaft 22.

The input-side clutch mechanism 55 is configured to include a clutch member 56 supported to the input shaft 22 so as to be capable of in-unison rotation and sliding, and a clutch mechanism body 57 provided no as to span between one end side of the clutch member 56 and a lateral side of the power transmission gear 52. The clutch member 56 is caused to slide by a hydraulic piston 58 that is fit inside an end portion of the clutch member 56. The clutch mechanism body 57 is configured as a meshing clutch that switches between an on state and an off state when a meshing claw provided on the clutch member 56 and a meshing claw provided on the power transmission gear 52 engage/disengage with each other.

When the clutch mechanism body 57 is switched to the on state, the input-side clutch mechanism 50 is switched to the on state such that the input shaft 22 and the power transmission gear 52 are interlocked so as to be capable of in-unison rotation, and the carrier 41 of the planetary power transmission section 40 is switched to the interlocking-on state with respect to the input shaft 22.

When the clutch mechanism body 57 is switched to the off state, the input-side clutch mechanism 50 is switched to the off state such that the interlocking of the input shaft 22 and the power transmission gear 52 is cut off, and the carrier 41 of the planetary power transmission section 40 is switched to the interlocking-off state with respect to the input shaft 22.

Accordingly, in the planetary power transmission section 40, when the input-side clutch mechanism 50 is switched to the on state, drive force from the input shaft 22 is inputted from a site located between the engine-coupled side and the continuously variable transmission-coupled side of the input shaft 22 to the carrier 41 via the power train 50. When the input-side clutch mechanism 50 is switched to the off state, the planetary power transmission section 40 enters a state in which interlocking with the input shaft 22 is cut off.

An output-side clutch mechanism 60 that includes a clutch member 61 fit around the power transmission shaft 23 is provided so as to span between the sun gear 42 of the planetary power transmission section 40 and the planet-side interlocking member 26.

When hydraulic oil is supplied to an oil chamber formed on the inner circumferential side of the clutch member 61, the clutch member 61 switches to an off position by being caused to slide toward the sun gear 42 in resistance to an on biasing spring 62, and when hydraulic oil is discharged from the oil chamber, the clutch member 61 switches to an on position by being caused to slide toward the planet-side interlocking member 26 by the on biasing spring 62. When the clutch member 61 switches to the on position, a clutch claw 61a provided on the clutch member 61 engages with a clutch claw provided on the planet-side interlocking member 26, and thus the clutch member 61 is coupled to the planet-side interlocking member 26 so as to be capable of in-unison rotation. The clutch member 61 is caused to slide while maintaining the state of being engaged with the sun gear 42 so as to be capable of in-unison rotation by the engaging claw 61b, and reaches the on position while maintaining the engaged state with respect to the sun gear 42. When the clutch member 61 switches to the off position, the engagement with the planet-side interlocking member 26 using the clutch claw 61a is canceled.

Accordingly, with the output-side clutch mechanism 60, when the clutch member 61 is switched to the off position, the interlocking between the sun gear 42 and the planet-side interlocking member 26 is cut off thus cutting off the interlocking of the motor shaft 33a to the output rotary member 24, and this achieves a first power transmission state in which the ring gear 44 of the planetary power transmission section 40 and the output rotary member 24 are interlocked so as to be capable of in-unison rotation, thus enabling combined drive force from the planetary power transmission section 40 to be output from the output rotary member 24.

With the output-side clutch mechanism 60, when the clutch member 61 is switched to the on position, the sun gear 42 and the planet-side interlocking member 26 are interlocked an as to be capable of in-unison rotation, and this achieves a second power transmission state in which the motor shaft 33a is interlocked with the output rotary member 24 so as to be capable of in-unison rotation, thus enabling output from the hydraulic continuously variable transmission 30 to be output from the output rotary member 24. Also, when the sun gear 42 and the power transmission shaft 23 are interlocked so as to be capable of in-unison rotation, and the ring gear 44 and the planet-side interlocking member 26 are interlocked so as to be capable of in-unison rotation, the sun gear 42, the planet gears 43, and the ring gear 44 can rotate in unison with the motor shaft 33a such that autorotation of the planet gears 43 does not occur.

The output-side clutch mechanism 60 switches the sun gear 43 of the planetary power transmission section 40 and the output rotary member 24 between the interlocking-on state and the interlocking-off state while maintaining the interlocked state between the ring gear 44 of the planetary power transmission section 40 and the output rotary member 24.

Accordingly, with the planetary power transmission section 40, when the input-side clutch mechanism 55 is switched to the on state, and the output-side clutch mechanism 60 is switched to the off state, drive force from the input shaft 22 is inputted to the carrier 41 via the power train 50, output from the motor shaft 33a of the hydraulic continuously variable transmission 30 is inputted to the sun gear 42 via the power transmission shaft 23, drive force from the input shaft 22 and output from the hydraulic continuously variable transmission 30 are combined to generate combined drive force, and the generated combined drive force is outputted from the ring gear 44 to the output rotary member 24 via the planet-side interlocking member 26 and the output-side interlocking member 27.

A power transmission switching clutch mechanism 70 is configured to include the input-side clutch mechanism 55 and the output-side clutch mechanism 60. The power transmission switching clutch mechanism 70 switches between a single power transmission state and a combined power transmission state when the input-side clutch mechanism 55 and the output-side clutch mechanism 60 are switched.

FIG. 5 is an illustrative diagram showing the relationship that the operation states of the input-side clutch mechanism 55 and the output-side clutch mechanism 60, the operation state of the power transmission switching clutch mechanism 70, and the power transmission mode of the shift power transmission apparatus 20 have with each other. In FIG. 5, "OFF" indicates the off state of the input-side clutch mechanism 55 and the output-side clutch mechanism 60, and "ON" indicates the on state of the input-side clutch mechanism 55 and the output-side clutch mechanism 60. As shown in this figure, the power transmission switching clutch mechanism 70 switches to the single power transmission state when the input-side clutch mechanism 55 is switched to the off state and the output-side clutch mechanism 60 is switched to the on state, and switches to the combined power transmission state when the input-side clutch mechanism 55 is switched to the on state and the output-side clutch mechanism 60 is switched to the off state.

FIG. 3 is a front view in vertical section showing the shift power transmission apparatus 20 during HMT (Hydraulic Mechanical Transmission) mode power transmission. As shown in this figure, when the power transmission switching clutch mechanism 70 switches to the combined power transmission state, this achieves HMT mode power transmission in the shift power transmission apparatus 20, in which drive force from the input shaft 22 and output from the hydraulic continuously variable transmission 30 are combined by the planetary power transmission section 40, and combined drive force from the planetary power transmission section 40 is transmitted to the output rotary member 24. When the shift power transmission apparatus 20 enters the HMT mode power transmission state, engine drive force input to the input shaft 22 is subjected to speed change by both the hydraulic continuously variable transmission 30 and the planetary power transmission section 40, and the speed-changed drive force is transmitted from the ring gear 44 to the output rotary member 24, and transmitted from the output rotary member 24 to the pair of right and left travel apparatuses 1.

FIG. 4 is a front view in vertical section showing the shift power transmission apparatus 20 during HST (Hydraulic Static Transmission) mode power transmission. As shown in this figure, when the power transmission switching clutch mechanism 70 switches to the single power transmission state, this achieves HST mode power transmission in the shift power transmission apparatus 20, in which output from the hydraulic continuously variable transmission 30 is transmitted on its own to the output rotary member 24 without being subjected to speed change by the planetary power transmission section 40. When the shift power transmission apparatus 20 enters the HST mode power transmission state, engine drive force is subjected to speed change by only the hydraulic continuously variable transmission 30 and not subjected to speed change by the planetary power transmission section 40, and the speed-change drive force is transmitted from the motor shaft 33a to the output rotary member 24 via the power transmission shaft 23, the sun gear 42, the clutch member 61, the planet-side interlocking member 26, and the output-side interlocking member 27, and then transmitted from the output rotary member 24 to the pair of right and left travel apparatuses 1.

With the power transmission switching clutch mechanism 70, if the shift power transmission apparatus 20 is put in the HST mode power transmission state, power transmission from the input shaft 22 to the carrier 41 of the planetary power transmission section 40 is cut off, the sun gear 42 is interlocked with the motor shaft 33a via the power transmission shaft 23 so as to be capable of in-unison rotation, and the ring gear 44 is interlocked with the motor shaft 33a via the planet-side interlocking member 26, the clutch member 61, the sun gear 42, and the power transmission shaft 23 so as to be capable of in-unison rotation, and therefore the sun gear 42, the planet gears 43, and the ring gear 44 of the planetary power transmission section 40 operate so as to rotate in unison with the motor shaft 33a. Accordingly, if the shift power transmission apparatus 20 is put in the state in which HST mode power transmission is realized, output from the motor shaft 33a of the hydraulic continuously variable transmission 30 is transmitted to the output rotary member 24 without autorotation of the planet gears 43 occurring, that is to say, without relative rotation of the sun gear 42 and the planet gears 43 or relative rotation of the planet gears 43 and the ring gear 44 occurring.

Figure 6:
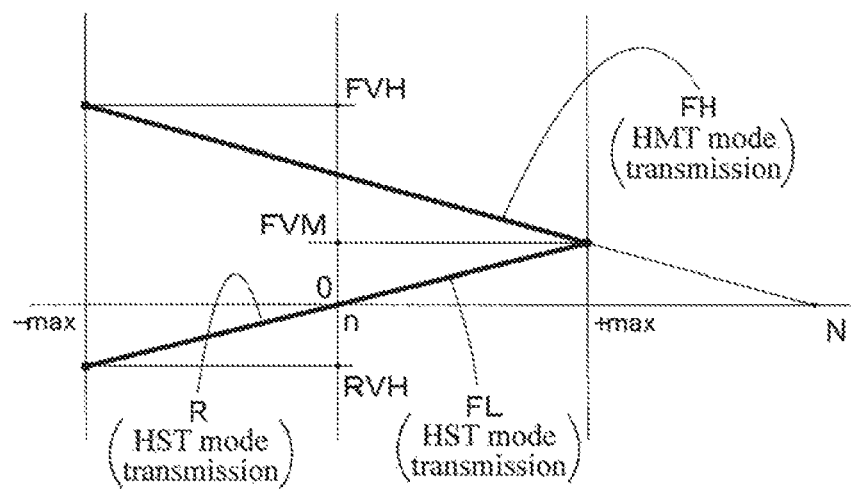
FIG. 6 is an illustrative diagram showing the relationship between the shift state of a hydraulic continuously variable transmission and the output speed of the shift power transmission apparatus.

FIG. 6 is an illustrative diagram showing the relationship between the shift state of the hydraulic continuously variable transmission 30 and the output speed of the output rotary member 24 of the shift power transmission apparatus 20 in the state in which the accelerator of the engine 8 is set such that a set constant speed of drive force is output. In FIG. 6, the horizontal axis indicates the shift state of the hydraulic continuously variable transmission 30, "n" indicates the neutral position of the hydraulic continuously variable transmission 30, "−max" indicates the maximum speed position in the reverse power transmission state of the hydraulic continuously variable transmission 30, and "+max" indicates the maximum speed position in the forward power transmission state of the hydraulic continuously variable transmission 30. The vertical axis in FIG. 6 indicates the output speed of the output rotary member 24. A solid line R and a solid line FL shown in FIG. 6 indicate change in the output speed when the input-side clutch mechanism 55 is in the off state, and the output-side clutch mechanism 60 is in the on state, that is to say, when the shift power transmission apparatus 20 is put in the HST mode power transmission state. A solid line FH shown in FIG. 6 indicates change in the output speed when the input-side clutch mechanism 55 is in the on state, and the output-side clutch mechanism 60 is in the off state, that is to say, when the shift power transmission apparatus 20 is put in the HMT mode power transmission state.

As shown by the solid line R and the solid line FL, in the state where the input-side clutch mechanism 55 is maintained in the off state and the output-side clutch mechanism 60 is maintained in the on state, if the hydraulic continuously variable transmission 30 is operated to the maximum speed position "−max" in the reverse power transmission state, the output speed reaches the reverse maximum speed "RVH".

As the hydraulic continuously variable transmission 30 is shifted from the maximum speed position "−max" in the reverse power transmission state toward the neutral position "n", the reverse output speed steplessly decreases. When the hydraulic continuously variable transmission 30 reaches the neutral position "n", the output speed reaches zero "0". As the hydraulic continuously variable transmission 30 is shifted from the neutral position "n" toward the maximum speed position "+max" in the forward power transmission state, the forward output speed steplessly increases. When the hydraulic continuously variable transmission 30 reaches the maximum speed position "+max" in the forward power transmission state, the output speed reaches a forward intermediate speed "FVM".

As shown by the solid line FH, when the hydraulic continuously variable transmission 30 reaches the maximum speed position "+max" in the forward power transmission state, the input-side clutch mechanism 55 is controlled so as to switch from the off state to the on state, the output-side clutch mechanism 60 is controlled so as to switch from the on state to the off state, and in the state in which the input-side clutch mechanism 55 is maintained in the on state, and the output-side clutch mechanism 60 is maintained in the off state, as the hydraulic continuously variable transmission 30 is shifted from the maximum speed position "+max" in the forward power transmission state toward the maximum speed position "−max" in the reverse power transmission state, the forward output speed steplessly increases. When the hydraulic continuously variable transmission 30 reaches the maximum speed position "+max" in the reverse power transmission state, the forward output speed reaches the maximum speed "FVH".

In FIG. 6, "N" indicates the value on the horizontal axis when the solid line FH extends beyond the forward-side maximum speed position "+max" of the hydraulic continuously variable transmission 30 to the point at which the output rotation reaches zero "0". Letting 1 be the horizontal axis value for the forward-side maximum speed position "+max" of the hydraulic continuously variable transmission 30, N=1.6 to 22. In other words, the capacities of the hydraulic pump 32 and the hydraulic motor 33 in the hydraulic continuously variable transmission 30 and the power transmission gear ratio of the planetary power transmission section 40 are set such that N=1.6 to 2.2.

Figure 7:
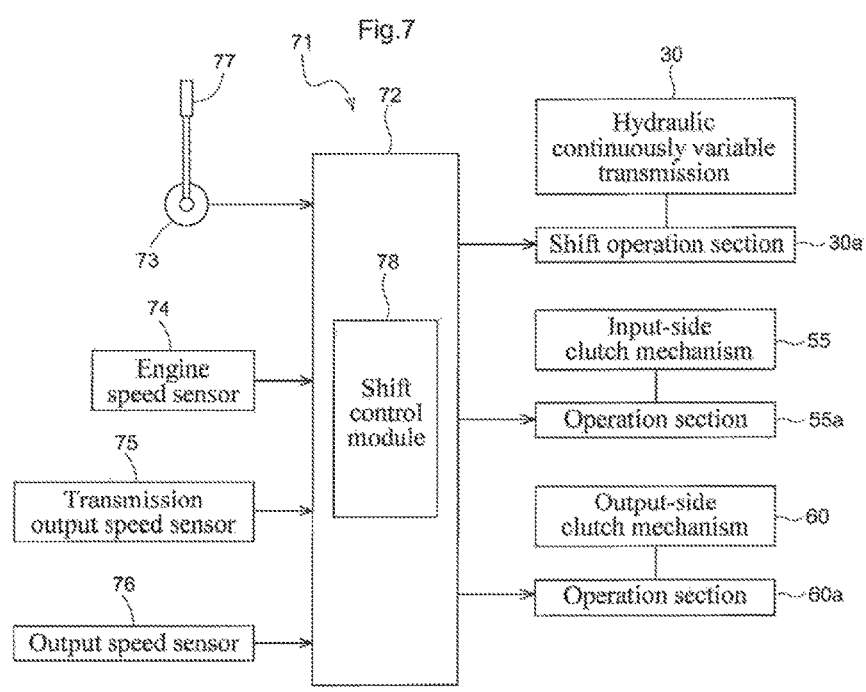
FIG. 7 is a block diagram showing a shift operation apparatus.

FIG. 7 is a block diagram showing a shift operation apparatus 71 that performs shift operations on the shift power transmission apparatus 20. As shown in this figure, the shift operation apparatus 71 includes a control apparatus 72 that is linked to a shift operation section 30a of the hydraulic continuously variable transmission 30 and operation sections 55a and 60a of the input-side clutch mechanism 55 and the output-side clutch mechanism 60, as well as a shift detection sensor 73, an engine speed sensor 74, a transmission output speed sensor 75, and an output speed sensor 76 that are linked to the control apparatus 72.

The shift operation section 30a is configured by an electrical actuator or a hydraulic actuator that operates so as to change the angle of the swash plate 32b of the hydraulic pump 32 in the hydraulic continuously variable transmission 30. The operation section 55a of the input-side clutch mechanism 55 is configured by an operation valve that is connected to the hydraulic piston 58 via an operation oil path formed inside the input shaft 22, and by operating the hydraulic piston 58 so as to cause the clutch member 56 to slide, the operation section 55a switches the input-side clutch mechanism 55. The operation section 60a of the output-side clutch mechanism 60 is configured by an operation valve that is connected to the oil chamber of the clutch member 61 via an operation oil path formed inside the power transmission shaft 23, and by supplying/discharging operation oil to/from the oil chamber of the clutch member 61, the operation section 60*a* causes the clutch member 61 to slide so as to switch the output-side clutch mechanism 60.

The shift detection sensor 73 detects the operation position of a shift lever 77, and outputs this detection result to the control apparatus 72. The engine speed sensor 74 detects the rotational speed of the engine 8, and outputs this detection result to the control apparatus 72. The transmission output speed sensor 75 detects the output speed of the hydraulic continuously variable transmission 30, and outputs this detection result to the control apparatus 72. The output speed sensor 76 detects the output speed of the shift power transmission apparatus 20, and outputs this detection result to the control apparatus 72.

The control apparatus 72 is configured using a microcomputer, and includes a shift control module 78. Based on the detection information from the shift detection sensor 73 and the transmission output speed sensor 75, the shift control module 78 performs shift control on the hydraulic continuously variable transmission by operating the shift operation section 30*a* such that the shift state of the hydraulic continuously variable transmission 30 corresponds to the operation position of the shift lever 77.

In addition to performing shift control on the hydraulic continuously variable transmission 30, the shift control module 78 detects the rotational speed of the engine 8, whose accelerator has been set, based on the detection information from the engine speed sensor 74, and then, based on this detection result and the detection information from the shift detection sensor 73, the transmission output speed sensor 75, and the output speed sensor 76, the shift control module 78 performs control for operating the operation section 55*a* and the operation section 60*a* so as to switch the input-side clutch mechanism 55 and the output-side clutch mechanism 60 in accordance with predetermined timing so that the shift power transmission apparatus 20 transmits power while achieving HST mode power transmission and HMT mode power transmission as shown in FIGS. 5 and 6.

First Alternative Embodiment

Figure 8:
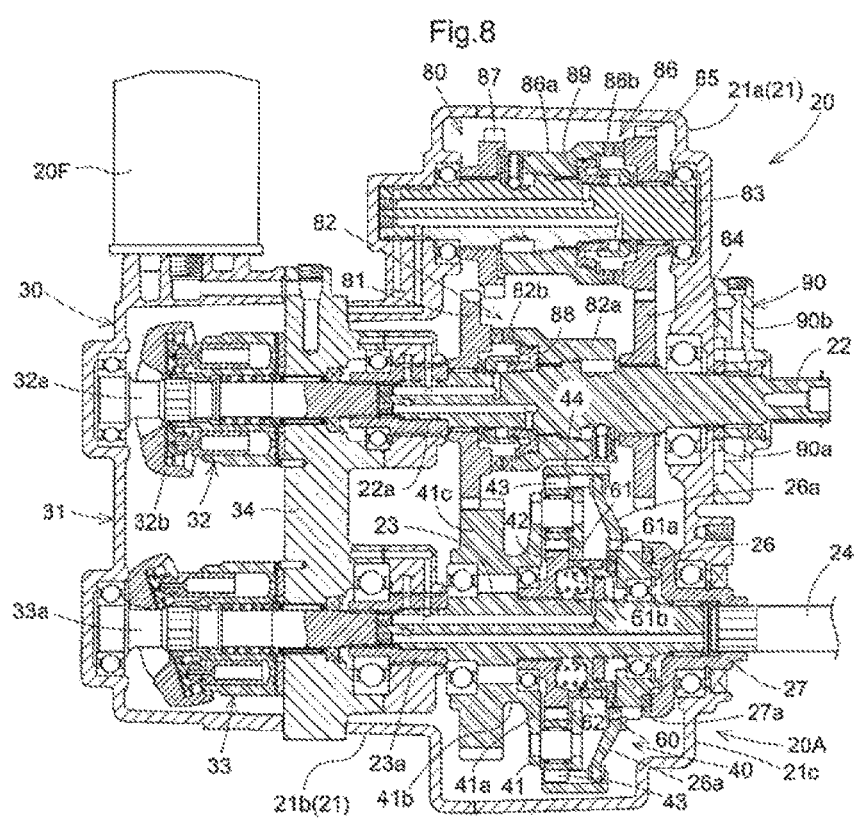
FIG. 8 is a front view in vertical section of a shift power transmission apparatus having a first alternative embodiment structure.

FIG. 8 is a front view in vertical section of the shift power transmission apparatus 20 having a first alternative embodiment structure. As shown in this figure, the shift power transmission apparatus 20 having the first alternative embodiment structure includes a forward/reverse switching mechanism 80 provided so as to span between the input shaft 22 and the carrier 41 of the planetary power transmission section 40.

The shift power transmission apparatus 20 having the first alternative embodiment structure includes a charge pump 90 mounted at a position that is between the engine-coupled side and the hydraulic continuously variable transmission-coupled side of the input shaft 22, and is between the engine-coupled side of the input shaft 22 and a forward clutch 82, and replenishing hydraulic oil is supplied to the hydraulic continuously variable transmission 30 by the charge pump 90. The charge pump 90 includes a rotor 90*a* that is coupled to the input shaft 22 so as to be capable of in-unison rotation, and a pump casing 90*b* that is removably attached to the shift case 21.

The forward/reverse switching mechanism 80 includes a forward power transmission gear 81 that is rotatably supported to the input shaft 22 via a needle bearing, a forward clutch 82 that is provided so as to span between the power transmission gear 81 and the input shaft 22, a reverse power transmission shaft 83 that is rotatably supported to the shift case 21 in an arrangement parallel or substantially parallel to the input shaft 22, a reverse rotation input gear 85 that is supported to the reverse power transmission shaft 83 so as to be capable of relative rotation when meshed with a power transmission gear 84 that is supported to the input shaft 22 an as to be capable of in-unison rotation, a reverse clutch 86 that is provided so as to span between the input gear 85 and the reverse power transmission shaft 83, and a reverse power transmission gear 87 that is provided so as to be capable of in-unison rotation with the reverse power transmission shaft 83.

The forward power transmission gear 81 and the reverse power transmission gear 87 are meshed with the input gear 41*c* of the carrier 41 that is provided an as to be capable of in-unison rotation with the tube shaft portion 41*b* of the carrier 41. The input gear 85 and the power transmission gear 84 are located on the side of the planetary power transmission section 40 opposite to the side on which the forward power transmission gear 81 and the reverse power transmission gear 87 are located. The forward power transmission gear 81 and the reverse power transmission gear 87 are meshed with the input gear 41*c* of the planetary power transmission section 40 that is located on the side of the sun gear 42 opposite to the side on which the input gear 85 and the power transmission gear 84 are located.

The forward clutch 82 is configured to include a forward clutch member 82*a* that is supported to the input shaft 22 so as to be capable of in-unison rotation and sliding, and a clutch mechanism body 82*b* that is provided so as to span between one end side of the forward clutch member 82*a* and a lateral side of the forward power transmission gear 81. The forward clutch member 82*a* is caused to slide by a hydraulic piston 88 fit inside an end portion of the forward clutch member 82*a*. The clutch mechanism body 82*b* is configured as a meshing clutch that switches between an on state and an off state when a meshing claw provided on the forward clutch member 82*a* and a meshing claw provided on the forward power transmission gear 81 engage/disengage with each other.

The reverse clutch 86 is configured to include a reverse clutch member 86*a* that is supported to the reverse power transmission shaft 83 so as to be capable of in-unison rotation and sliding, and a clutch mechanism body 86*b* that is provided an as to span between one end side of the reverse clutch member 86*a* and a lateral side of the input gear 85. The reverse clutch member 86*a* is caused to slide by a hydraulic piston 89 fit inside an end portion of the reverse clutch member 86*a*. The clutch mechanism body 86*b* is configured as a meshing clutch that switches between an on state and an off state when a meshing claw provided on the reverse clutch member 86*a* and a meshing claw provided on the input gear 85 engage/disengage with each other.

When the forward clutch 82 is switched to the on state, and the reverse clutch 86 is switched to the off state, the forward/reverse switching mechanism 80 enters the forward power transmission state, inputs drive force of the input shaft 22 from the forward clutch member 82*a* that is located between the engine-coupled side and the hydraulic continuously variable transmission-coupled side of the input shaft 22, converts the drive force from the input shaft 22 into forward drive force, and transmits it from the forward power transmission gear 81 to the carrier 41.

When the forward clutch 82 is switched to the off state, and the reverse clutch 86 is switched to the on state, the forward/reverse switching mechanism 80 enters the reverse power transmission state, inputs drive force of the input shaft 22 from the power transmission gear 84 that is located between the engine-coupled side and the hydraulic continuously variable transmission-coupled side of the input shaft 22, converts the drive force from the input shaft 22 into reverse drive force, and transmits it from the reverse power transmission gear 87 to the carrier 41 of the planetary power transmission section 40.

When the forward clutch 82 and the reverse clutch 86 are switched to the off state, the forward/reverse switching mechanism 80 enters the neutral state and cuts off the interlocking of the input shaft 22 and the carrier 41 of the planetary power transmission section 40.

FIG. 9 is an illustrative diagram showing the relationship that the operation states of the hydraulic continuously variable transmission 30, the forward clutch 8, the reverse clutch 86, and the output-side clutch mechanism 60 have with the power transmission mode of the shift power transmission apparatus 20. In FIG. 9, "forward" indicates the forward power transmission state of the hydraulic continuously variable transmission 30, and "reverse" indicates the reverse power transmission state of the hydraulic continuously variable transmission 30. In FIG. 9, "OFF" indicates the off state of the forward clutch 82, the reverse clutch 86, and the output-side clutch mechanism 60, and "ON" indicates the on state of the forward clutch 82, the reverse clutch 86, and the output-side clutch mechanism 60.

When the forward clutch 82 and the reverse clutch 86 are controlled so as to be switched to the off state, and the output-side clutch mechanism 60 is controlled so as to be switched to the on state, the shift power transmission apparatus 20 enters the state in which HST mode power transmission is achieved. When the shift power transmission apparatus 20 enters the HST mode power transmission state, engine drive force input by the input shaft 22 is subjected to speed change by the hydraulic continuously variable transmission 30 without being transmitted to the planetary power transmission section 40, the speed-changed drive force is transmitted from the motor shaft 33a to the output rotary member 24 via the power transmission shaft 23, the sun gear 42, the clutch member 61, the planet-side interlocking member 26, and the output-side interlocking member 27, and then transmitted from the output rotary member 24 to the pair of right and left travel apparatuses 1.

When the forward clutch 82 is controlled so as to switch to the on state, and the reverse clutch 86 and the output-side clutch mechanism 60 are controlled so as to switch to the off state, the shift power transmission apparatus 20 enters a state in which forward-side HMT mode power transmission is achieved. When the shift power transmission apparatus 20 enters the forward-side HMT mode power transmission state, engine drive force input by the input shaft 20 is converted into forward drive force by the forward/reverse switching mechanism 80 and transmitted to the planetary power transmission section 40, the planetary power transmission section 40 combines the forward drive force from the forward/reverse switching mechanism 80 with output from the motor shaft 33a of the hydraulic continuously variable transmission 30 so as to generate forward-side combined drive force, and the generated forward-side combined drive force is transmitted from the ring gear 44 to the output rotary member 24 via the planet-side interlocking member 26 and the output-side interlocking member 27, and then transmitted from the output rotary member 24 to the pair of right and left travel apparatuses 1.

When the reverse clutch 86 is controlled so as to switch to the on state, and the forward clutch 82 and the output-side clutch mechanism 60 are controlled so as to switch to the off state, the shift power transmission apparatus 20 enters a state in which reverse-side HMT mode power transmission is achieved. When the shift power transmission apparatus 20 enters the reverse-side HMT mode power transmission state, engine drive force input by the input shaft 20 is converted into reverse drive force by the forward/reverse switching mechanism 80 and transmitted to the planetary power transmission section 40, the planetary power transmission section 40 combines the reverse drive force from the forward/reverse switching mechanism 80 with output from the motor shaft 33a of the hydraulic continuously variable transmission 30 so as to generate reverse-side combined drive force, and the generated reverse-side combined drive force is transmitted from the ring gear 44 to the output rotary member 24 via the planet-side interlocking member 26 and the output-side interlocking member 27, and then transmitted from the output rotary member 24 to the pair of right and left travel apparatuses 1.

FIG. 10 is an illustrative diagram showing the output speed of the shift power transmission apparatus 20 having the first alternative embodiment structure, being an illustrative diagram showing the relationship that the shift state of the hydraulic continuously variable transmission 30 has with the output speed of the output rotary member 24 of the shift power transmission apparatus 20 in the state in which the accelerator of the engine 8 is set such that a set constant speed of drive force is output. In FIG. 10, the horizontal axis indicates the shift state of the hydraulic continuously variable transmission 30, "n" indicates the neutral position of the hydraulic continuously variable transmission 30, "−max" indicates the maximum speed position in the reverse power transmission state of the hydraulic continuously variable transmission 30, and "+max" indicates the maximum speed position in the forward power transmission state of the hydraulic continuously variable transmission 30. The vertical axis in FIG. 10 indicates the output speed of the output rotary member 24. A solid line RL and a solid line FL shown in FIG. 10 indicate change in the output speed when the forward clutch 82 and the reverse clutch 86 are controlled so as to switch to the off state, and the output-side clutch mechanism 60 is controlled so as to switch to the on state, that is to say, when the shift power transmission apparatus 20 is put in the HST mode power transmission state. Solid lines FM and FH shown in FIG. 10 indicate change in the output speed when the forward clutch 82 is controlled so as to switch to the on state, and the reverse clutch 86 and the output-side clutch mechanism 60 are controlled so as to switch to the off state, that is to say, when the shift power transmission apparatus 20 is put in the forward-side HMT mode power transmission state. Solid lines RM and RH shown in FIG. 10 indicate change in the output speed when the reverse clutch 86 is controlled so as to switch to the on state, and the forward clutch 82 and the output-side clutch mechanism 60 are controlled so as to switch to the off state, that is to say, when the shift power transmission apparatus 20 is put in the reverse-side HMT mode power transmission state.

As shown in FIG. 9, and as shown by the solid line FL in FIG. 10, in the state in which the forward clutch 82 and the reverse clutch 86 are in the off state, and the output-side clutch mechanism 60 is in the on state, if the hydraulic continuously variable transmission 30 is operated to the neutral position "n", the output changes to zero "0".

While the forward clutch 82 and the reverse clutch 86 are maintained in the off state, and the output-side clutch mechanism 60 is maintained in the on state, if the hydraulic continuously variable transmission 30 is shifted from the neutral position "n" toward the maximum speed position "+max" in the forward power transmission state, forward drive force is output. While the forward clutch 82 and the reverse clutch 86 are maintained in the off state, and the output-side clutch mechanism 60 is maintained in the on state, as the hydraulic continuously variable transmission 30 is shifted from the neutral position "n" toward the maximum speed position "+max" in the forward power transmission state, forward output steplessly increases. When the hydraulic continuously variable transmission 30 reaches the maximum speed position "+max" in the forward power transmission state, the output speed reaches a forward intermediate speed "FV1".

As shown in FIG. 9, and as shown by the solid lines FM and FH in FIG. 10, when the hydraulic continuously variable transmission 30 reaches the maximum speed position "+max" in the forward power transmission state, the forward clutch 82 is controlled no as to switch to the on state, and the output-side clutch mechanism 60 is controlled so as to switch to the off state, and, while the forward clutch 82 is maintained in the on state, and the reverse clutch 86 and the output-side clutch mechanism 60 are maintained in the off state, as the hydraulic continuously variable transmission 30 is shifted from the maximum speed position "+max" in the forward power transmission state toward the maximum speed position "−max" in the reverse power transmission state, the forward output steplessly increases from the intermediate speed "FV1". When the hydraulic continuously variable transmission 30 reaches the maximum speed position "−max" in the reverse power transmission state, the output speed reaches a forward intermediate speed "FV2".

As shown in FIG. 9, and as shown by the solid line RL in FIG. 10, while the forward clutch 82 and the reverse clutch 86 are maintained in the off state, and the output-side clutch mechanism 60 is maintained in the on state, if the hydraulic continuously variable transmission 30 is shifted from the neutral position "n" toward the maximum speed position "−max" in the reverse power transmission state, reverse drive force is output. While the forward clutch 82 and the reverse clutch 86 are maintained in the off state, and the output-side clutch mechanism 60 is maintained in the on state, as the hydraulic continuously variable transmission 30 is shifted from the neutral position "n" toward the maximum speed position "−max" in the reverse power transmission state, the reverse output steplessly increases. When the hydraulic continuously variable transmission 30 reaches the maximum speed position "−max" in the reverse power transmission state, the output speed reaches a reverse intermediate speed "RV1".

As shown in FIG. 9, and as shown by the solid lines RM and RH in FIG. 10, when the hydraulic continuously variable transmission 30 reaches the maximum speed position "−max" in the reverse power transmission state, the reverse clutch 86 is controlled so as to switch to the on state, and the output-side clutch mechanism 60 is controlled so as to switch to the off state, and, while the reverse clutch 86 is maintained in the on state, and the forward clutch 82 and the output-side clutch mechanism 60 are maintained in the off state, as the hydraulic continuously variable transmission 30 is shifted from the maximum speed position "−max" in the reverse power transmission state toward the maximum speed position "+max" in the forward power transmission state, the reverse output steplessly increases from the intermediate speed "RV1". When the hydraulic continuously variable transmission 30 reaches the maximum speed position "+max" in the forward power transmission state, the output reaches a reverse intermediate speed "RV2".

In FIG. 10, "N" indicates the value on the horizontal axis when the solid lines FH and FM extend beyond the forward-side maximum speed position "+max" of the hydraulic continuously variable transmission 30 to the point at which the output rotation reaches zero "0". Letting 1 be the horizontal axis value for the forward-side maximum speed position "+max" of the hydraulic continuously variable transmission 30, N=1.6 to 2.2. In other words, the capacities of the hydraulic pump 32 and the hydraulic motor 33 in the hydraulic continuously variable transmission 30 and the power transmission gear ratio of the planetary power transmission section 40 are set such that N=1.6 to 2.2.

FIG. 11 is a block diagram showing a shift operation apparatus 91 that performs shift operations on the shift power transmission apparatus 20 having the first alternative embodiment structure. As shown in this figure, the shift operation apparatus 91 includes a control apparatus 72 that is linked to the shift operation section 30a of the hydraulic continuously variable transmission 30 and operation sections 82c, 86c, and 60a of the forward clutch 82, the reverse clutch 86, and the output-side clutch mechanism 60, as well as the shift detection sensor 73, the engine speed sensor 74, the transmission output speed sensor 75, and the output speed sensor 76 that are linked to the control apparatus 72.

The shift operation section 30a is configured by an electrical actuator or a hydraulic actuator that operates so as to change the angle of the swash plate 32b of the hydraulic pump 32 in the hydraulic continuously variable transmission 30. The operation section 82c of the forward clutch 82 is configured by an operation valve that is connected to a hydraulic piston 88 via an operation oil path formed inside the input shaft 22, and by operating the hydraulic piston 88 so as to cause the forward clutch member 82a to slide, the operation section 82c switches the forward clutch 82. The operation section 86c of the reverse clutch 86 is configured by an operation valve that is connected to a hydraulic piston 89 via an operation oil path formed inside the reverse power transmission shaft 83, and by operating the hydraulic piston 89 so as to cause the reverse clutch member 86a to slide, the operation section 86c switches the reverse clutch 86. The operation section 60a of the output-side clutch mechanism 60 is configured by an operation valve that is connected to the oil chamber of the clutch member 61 via an operation oil path formed inside the power transmission shaft 23, and by supplying/discharging operation oil to/from the oil chamber of the clutch member 61, the operation section 60a causes the clutch member 61 to slide so as to switch the output-side clutch mechanism 60.

The shift detection sensor 73 detects the operation position of a shift lever 77, and outputs this detection result to the control apparatus 72. The engine speed sensor 74 detects the rotational speed of the engine 8, and outputs this detection result to the control apparatus 72. The transmission output speed sensor 75 detects the output speed of the hydraulic continuously variable transmission 30, and outputs this detection result to the control apparatus 72. The output speed sensor 76 detects the output speed of the shift power transmission apparatus 20, and outputs this detection result to the control apparatus 72.

The control apparatus 72 is configured using a microcomputer, and includes a shift control module 78. Based on the detection information from the shift detection sensor 73 and the transmission output speed sensor 75, the shift control module 78 performs shift control on the hydraulic continuously variable transmission by operating the shift operation section 30a such that the shift state of the hydraulic continuously variable transmission 30 corresponds to the operation position of the shift lever 77.

In addition to performing shift control on the hydraulic continuously variable transmission 30, the shift control module 78 detects the rotational speed of the engine 8, whose accelerator has been set, based on the detection information from the engine speed sensor 74, and then, based on this detection result and the detection information from the shift detection sensor 73, the transmission output speed sensor 75, and the output speed sensor 76, the shift control module 78 performs control for operating the operation section 82c, the operation section 86c, and the operation section 60a so as to switch the forward clutch 82, the reverse clutch 86, and the output-side clutch mechanism 60 in accordance with predetermined timing so that the shift power transmission apparatus 20 transmits power while achieving HST mode power transmission, forward-side HMT mode power transmission, and reverse-side HMT mode power transmission as shown in FIGS. 9 and 10.

Second Alternative Embodiment

FIG. 12 is a front view in vertical section of the shift power transmission apparatus 20 having a second alternative embodiment structure. As shown in this figure, in the shift power transmission apparatus 20 having the second alternative embodiment structure, the charge pump 90 that supplies replenishing hydraulic oil to the hydraulic continuously variable transmission 30 is mounted at a position that is between the engine-coupled side and the hydraulic continuously variable transmission-coupled side of the input shaft 22, and is between the engine-coupled side of the input shaft 22 and the input-side clutch mechanism 55. The charge pump 90 includes the rotor 90a that is coupled to the input shaft 22 so as to be capable of in-unison rotation, and the pump casing 90b that is removably coupled to the shift case 21.

Third Alternative Embodiment

Figure 13:
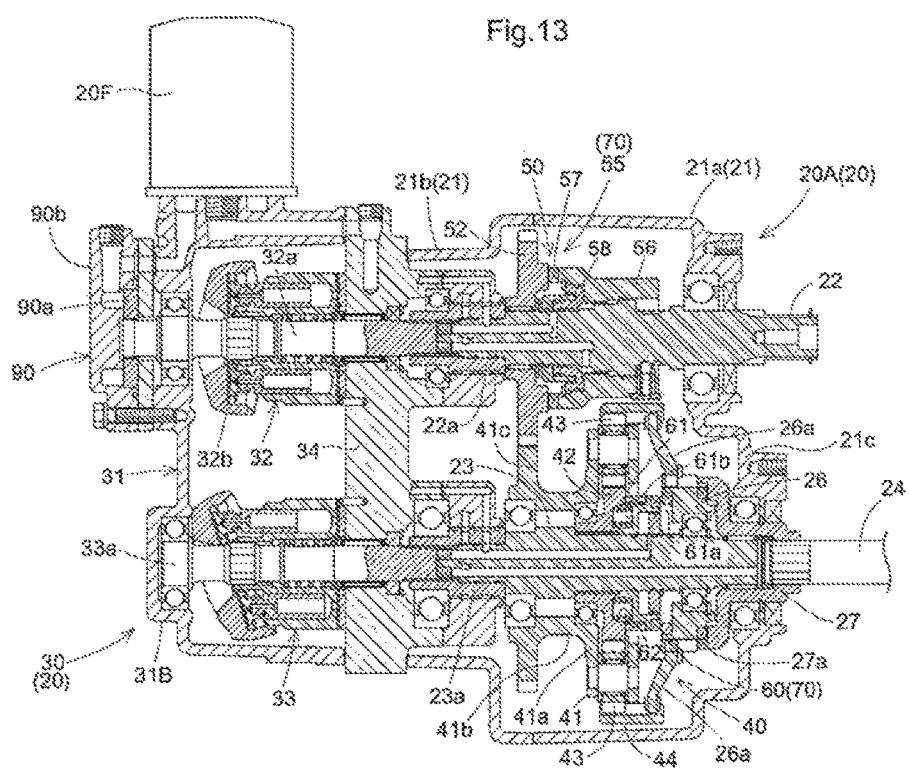
FIG. 13 is a front view in vertical section of a shift power transmission apparatus having a third alternative embodiment structure.

FIG. 13 is a front view in vertical section of the shift power transmission apparatus 20 having a third alternative embodiment structure. As shown in this figure, in the shift power transmission apparatus 20 having the third alternative embodiment structure, the hydraulic continuously variable transmission 30 is configured to include a variable displacement hydraulic pump 32 and a variable displacement hydraulic motor 33.

Fourth Alternative Embodiment

Figure 14:
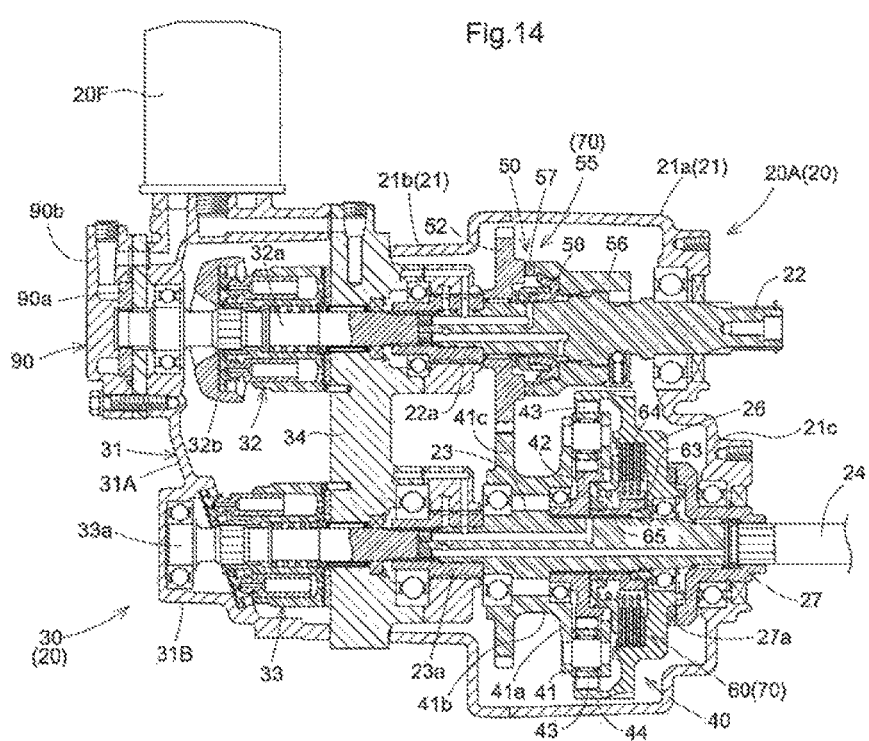
FIG. 14 is a front view in vertical section of a shift power transmission apparatus having a fourth alternative embodiment structure.

FIG. 14 is a front view in vertical section of the shift power transmission apparatus 20 having a fourth alternative embodiment structure. As shown in this figure, in the shift power transmission apparatus 20 having the fourth alternative embodiment structure, the output-side clutch mechanism 60 is configured as a friction-type clutch mechanism that includes a multi-disc friction clutch portion 64 provided so as to span between a support member 63 that is provided on the power transmission shaft 23 so as to be capable of in-unison rotation and a clutch body portion provided on the planet-side interlocking member 26. This output-side clutch mechanism 60 operates so as to switch the motor shaft 33a and the output rotary member 24 between the interlocking-on state and the interlocking-off state when the friction clutch portion 64 is switched between the on state and the off state by a hydraulic piston 65 supported to the sun gear 42.

Fifth Alternative Embodiment

Figure 15:
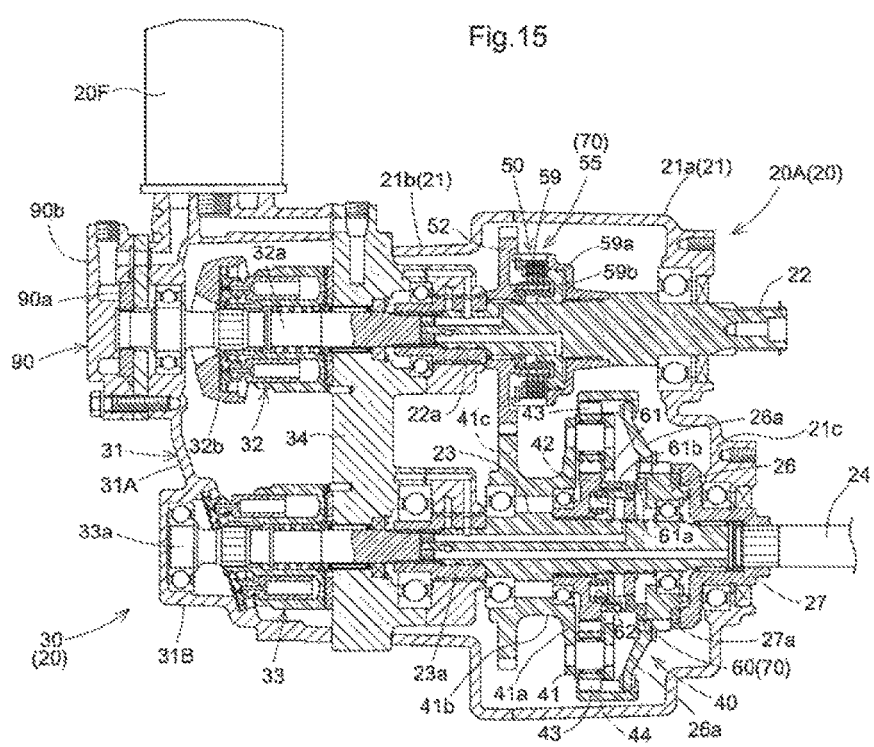
FIG. 15 is a front view in vertical section of a shift power transmission apparatus having a fifth alternative embodiment structure.

FIG. 15 is a front view in vertical section of the shift power transmission apparatus 20 having a fifth alternative embodiment structure. As shown in this figure, in the shift power transmission apparatus 20 having the fifth alternative embodiment structure, the input-side clutch mechanism 55 is configured as a friction-type clutch mechanism that includes a multi-disc friction clutch portion 59 provided so as to span between a support portion that is provided on the power transmission gear 52 so as to be capable of in-unison rotation and a clutch body portion 59a provided on the input shaft 22 so as to be capable of in-unison rotation. This input-side clutch mechanism 55 operates so as to switch the input shaft 22 and the power transmission gear 52 between the interlocking-on state and the interlocking-off state when the friction clutch portion 59 is switched between the on state and the off state by a hydraulic piston 59b provided inside the clutch body portion 59a.

Sixth Alternative Embodiment

Figure 16:
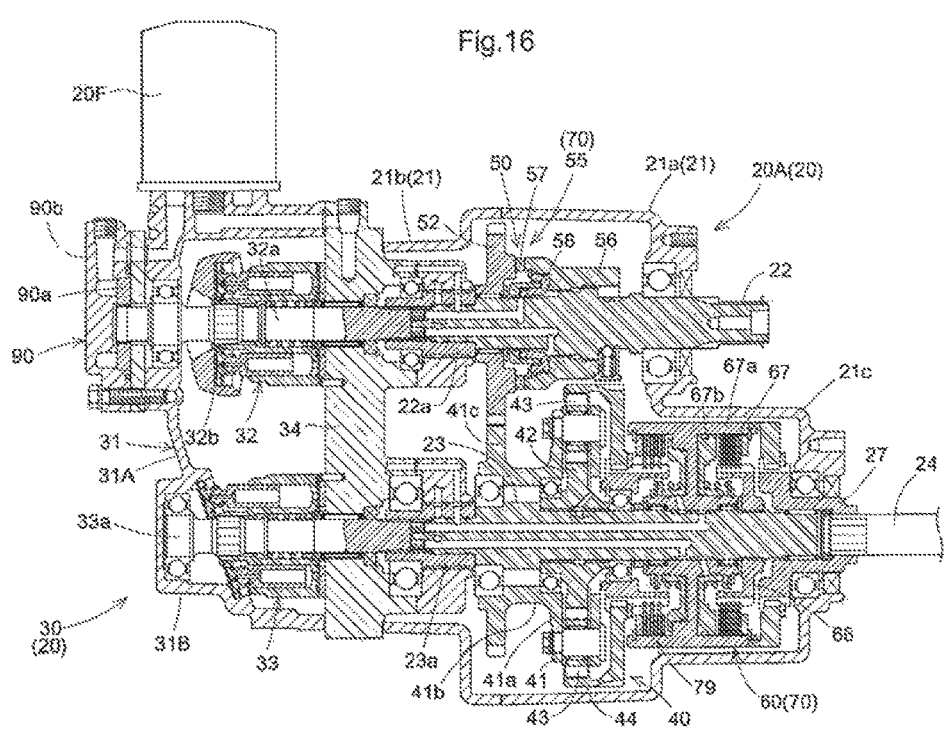
FIG. 16 is a front view in vertical section of a shift power transmission apparatus having a sixth alternative embodiment structure.

FIG. 16 is a front view in vertical section of the shift power transmission apparatus 20 having a sixth alternative embodiment structure. As shown in this figure, in the shift power transmission apparatus 20 having the sixth alternative embodiment structure, the output-side clutch mechanism 60 is configured as a friction-type clutch mechanism that includes a multi-disc friction clutch portion 67 provided no as to span between a support portion 66 that is provided on the power transmission shaft 23 so as to be capable of in-unison rotation and a clutch body 67a coupled to the output-side interlocking member 27 so as to be capable of in-unison rotation. This output-side clutch mechanism 60 operates so as to switch the motor shaft 33a and the output rotary member 24 between the interlocking-on state and the interlocking-off state when the friction clutch portion 67 is switched between the on state and the off state by a hydraulic piston 67b provided inside the clutch body 67a.

The shift power transmission apparatus 20 having the sixth alternative embodiment structure includes a friction clutch mechanism 79 that can switch the ring gear 44 and the motor shaft 33a between the interlocking-on state and the interlocking-off state, and it is possible to switch between a state in which the sun gear 42, the planet gears 43, and the ring gear 44 rotate in unison with the motor shaft 33a in HST mode power transmission, and a state in which the ring gear 44 can rotate in HST mode power transmission.

Other Alternative Embodiments (1) Although the above-described embodiment gives the example where drive force from the input shaft 22 is inputted to the carrier 41 of the planetary power transmission section 40, and drive force from the ring gear 44 of the planetary power transmission section 40 is transmitted to the output rotary member 24, a configuration may be implemented in which drive force from the input shaft 22 is inputted to the ring gear 44 of the planetary power transmission section 40, and drive force from the carrier 41 of the planetary power transmission section 40 is transmitted to the output rotary member 24.

(2) Although the above-described embodiment gives the example where the input shaft 22 is formed so as to be separate from the pump shaft 32a and is coupled to the pump shaft 32a via the joint 22a, and the power transmission shaft 23 is formed so as to be separate from the motor shaft 33a and is coupled to the motor shaft 33a via the joint 23a, an implementation is possible in which the input shaft 22 is formed integral with the pump shaft 32a, and the power transmission shaft 23 is formed integral with the motor shaft 33a.

Second Embodiment

Next, a second embodiment will be described with reference to FIGS. 17 to 25.

Figure 17:
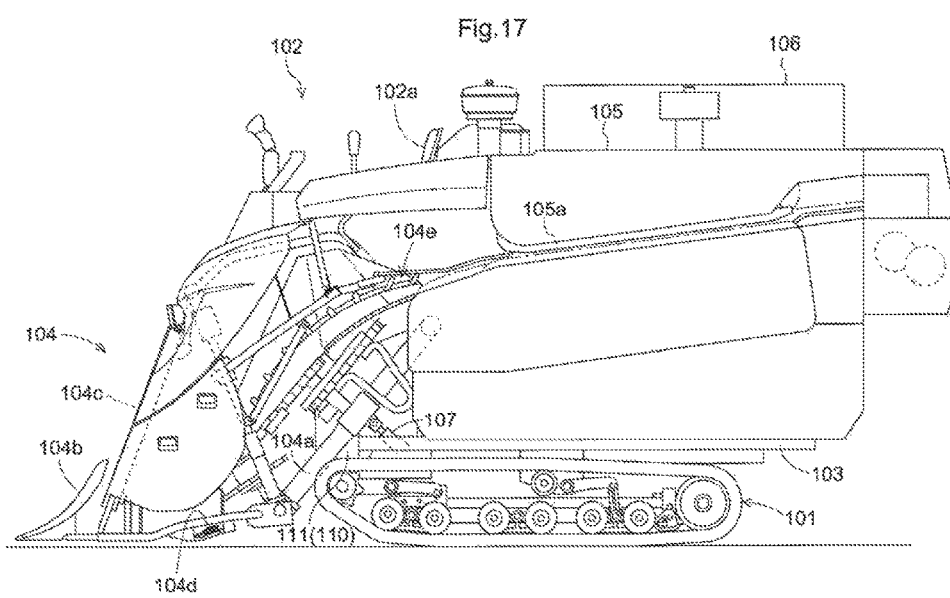
FIG. 17 is a figure pertaining to a second embodiment (the same follows through to FIG. 27), showing a side view of an entire combine.

As shown in FIG. 17, the combine, which performs the task of harvesting rice, barley, and the like, is configured to be self-propelled with a pair of right and left crawling travel apparatuses 101, and is configured to include a traveling body equipped with a riding driving section 102, a reaping section 104 coupled to the front portion of a body frame 103 of the traveling body, a threshing apparatus 105 provided so as to be arranged rearward of the reaping section 104 on the rear side of the body frame 103, and a grain tank 106 provided so as to be arranged to the side of the threshing apparatus 105 on the rear side of the body frame 103.

Specifically, the reaping section 104 includes a reaping section frame 104a that extends forward from the front portion of the body frame 103 in a vertically swingable manner, and when the reaping section frame 104a is swung by an elevating cylinder 107, the reaping section 104 moves up/down between a lowered operating position at which a divider 104b, which is provided at the front edge portion of the reaping section 104, is lowered close to the ground, and a raised non-operating position at which the divider 104b is raised high above the ground. When the traveling body is caused to travel with the reaping section 104 lowered to the lowered operating position, the reaping section 104 operates such that reaping-target planted stalks are guided to a raising path by the divider 104b, the planted stalks that were guided to the raising path are reaped by a clipper-type reaping apparatus 104d while being raised up by a raising apparatus 104c, and the reaped stalks are supplied to the threshing apparatus 105 by a supplying apparatus 104e. In the threshing apparatus 105, the reaped stalks are conveyed from the supplying apparatus 104e toward the rear of the apparatus body with their base sides clamped by a threshing feed chain 105a, the ear tip-sides of the reaped stalks are supplied to a handling compartment (not shown) where they are subjected to reaping processing, and the reaped grain is fed to the grain tank 106.

The combine is configured such that an engine 108 is provided underneath a driver seat 102a provided in the driving section 102, and drive force outputted by the engine 108 is transmitted to the pair of right and left travel apparatuses 101 by a power transmission structure 110 that includes a transmission case 111 provided at the front edge portion of the body frame 103.

Figure 18:
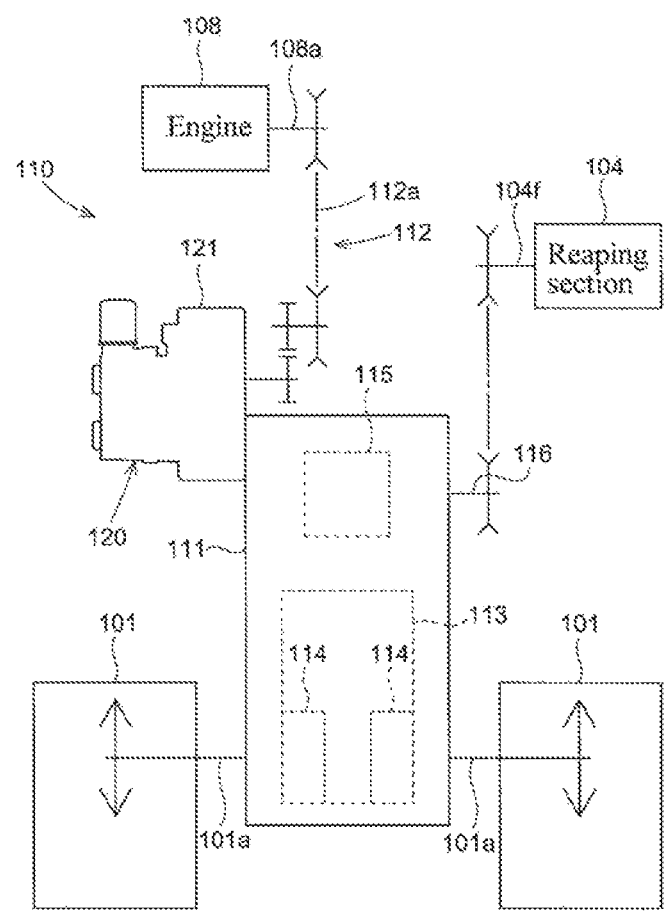
FIG. 18 is a schematic front view of a power transmission structure.

FIG. 18 is a front view of the schematic structure of the power transmission structure 110. As shown in this figure, in the power transmission structure 110, engine drive force from an output shaft 108a of the engine 108 is inputted to a shift power transmission apparatus 120 provided on the side of the upper end portion of the transmission case 111 via a power train 112 provided with a power transmission belt 112a. Output of the shift power transmission apparatus 120 is inputted to a traveling transmission 113 provided inside the transmission case 111, then transmitted from a left-side steering clutch mechanism 114, which is one of a pair of right and left steering clutch mechanisms 114 included in the traveling transmission 113, to a drive shaft 101a of the left-side travel apparatus 101, and also transmitted from the right-side steering clutch mechanism 114 to a drive shaft 101a of the right-side travel apparatus 101.

The power transmission structure 110 includes a reaping transmission 115 that is provided inside the transmission case 111, and output of the shift power transmission apparatus 120 is inputted to the reaping transmission 115 and transmitted from a reaping output shaft 116 to a drive shaft 104f of the reaping section 104.

Next, the shift power transmission apparatus 120 will be described.

Figure 19:
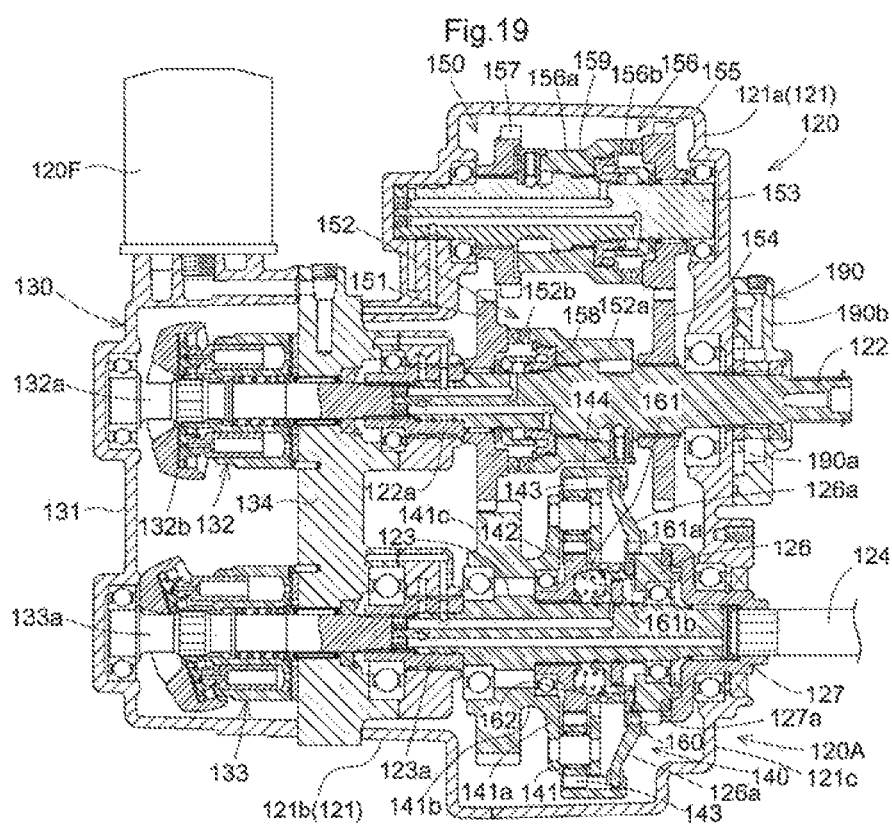
FIG. 19 is a front view in vertical section of a shift power transmission apparatus during HST mode power transmission.

As shown in FIG. 19, the shift power transmission apparatus 120 is configured to include a planetary shift section 120A, which is provided with a shift case 121 whose side portion is coupled to the upper end side of the transmission case 111, and a hydraulic continuously variable transmission 130 that has a casing 131 coupled to the side portion on the side opposite to the side on which the shift case 121 is coupled to the transmission case 111.

The shift case 121 is configured to include a main case portion 121a that accommodates a planetary power transmission section 140 and a forward/reverse switching mechanism 150, and a coupling case portion 121b that accommodates a connection portion between the hydraulic continuously variable transmission 130 and an input shaft 122 and a power transmission shaft 123, and that couples the shift case 121 with a port block 134 of the casing 131. The shift case 121 is coupled to the transmission case 111 with a bulging portion 121c formed on as to bulge outward horizontally on the side face of the lower portion of the main case portion 121a where the output rotary member 124 is located. The size of the coupling case portion 121b in the up/down direction of the traveling body is smaller than the size of the main case portion 121a, in the up/down direction of the traveling body. The main case portion 121a is formed such that the shape in vertical section is vertically elongated when viewed in the front/rear direction of the apparatus body, the casing 131 is formed such that the shape in vertical section is vertically elongated when viewed in the front/rear direction of the apparatus body, the planetary shift section 120A and the hydraulic continuously variable transmission 130 are aligned in the horizontal direction of the apparatus body such that the shift power transmission apparatus 120 has a small width overall in the horizontal direction of the apparatus body, and the shift power transmission apparatus 120 is coupled to the lateral side of the transmission case 111 in a compact state with respect to the left/right direction of the traveling body so as to not protrude outward horizontally. Also, an oil filter 120F is arranged facing upward on the upper face of the casing 131, and further compactness is achieved by preventing the oil filter 120F from protruding outward horizontally.

The planetary shift section 120A includes the input shaft 122 that is oriented in the horizontal direction of the apparatus body and is rotatably supported to the upper end side of the shift case 121, a power transmission shaft 123 and a rotating shaft-type of output rotary member 124 that are rotatably supported to the lower end side of the shift case 121 parallel or substantially parallel to the input shaft 122, the planetary power transmission section 140 that is supported to the power transmission shaft 123, and the forward/reverse switching mechanism 150 provided so as to span from the input shaft 122 to a carrier 141 of the planetary power transmission section 140.

The input shaft 122 is arranged an as to be coaxially aligned with a pump shaft 132a of the hydraulic continuously variable transmission 130. The input shaft 122 is configured such that on the side on which it protrudes laterally outward from the shift case 121, it is coupled with an output shaft 108a of the engine 108 via the power train 112, and on the side opposite to the side coupled to the engine 108, it is coupled to the pump shaft 132a of the hydraulic continuously variable transmission 130 so as to be capable of in-unison rotation therewith via a joint 122a. The input shaft 122 receives engine drive force via the power train 112, and drives the hydraulic pump 132 of the hydraulic continuously variable transmission 130 upon being driven by engine drive force.

The output rotary member 124 is arranged so as to be coaxially aligned with a motor shaft 133a of the hydraulic continuously variable transmission 130 on the same side of the hydraulic continuously variable transmission 130 as the side on which the engine-coupled side of the input shaft 122 is located. The output rotary member 124 is configured such that on the side on which it protrudes laterally outward from the shift case 121, it is interlocked with an input portion of the traveling transmission 113, and outputs drive force from the planetary power transmission section 140 and the hydraulic continuously variable transmission 130 to the pair of right and left travel apparatuses 101 via the traveling transmission 113.

The hydraulic continuously variable transmission 130 is configured to include the hydraulic pump 132 whose pump shaft 132a is rotatably supported to the upper end side of the casing 131, and the hydraulic motor 133 whose motor shaft 133a is rotatably supported to the lower end side of the casing 131. The hydraulic pump 132 is configured by a variable displacement axial plunger pump, and the hydraulic motor 133 is configured by a variable displacement axial plunger motor. The hydraulic motor 133 is driven by hydraulic oil that is discharged from the hydraulic pump 132 and supplied via an oil path formed inside the port block 134. The hydraulic continuously variable transmission 130 is supplied with replenishing hydraulic oil by a charge pump 190 mounted on the engine-coupled side of the input shaft 122. The charge pump 190 includes a rotor 190a coupled to the input shaft 122 so as to be capable of in-unison rotation therewith, and a pump casing 190b that is removably coupled to the shift case 121.

Accordingly, the hydraulic continuously variable transmission 130 switches between the forward power transmission state, the reverse power transmission state, and the neutral state by an operation for changing the angle of a swash plate 132b that the hydraulic pump 132 is provided with. When the hydraulic continuously variable transmission 130 is switched to the forward power transmission state, engine drive force transmitted from the input shaft 122 to the pump shaft 132a is converted into forward drive force and output from the motor shaft 133a, and when it is switched to the reverse power transmission state, engine drive force transmitted from the input shaft 122 to the pump shaft 132a is converted into reverse drive force and output from the motor shaft 133a, and thus engine drive force is subjected to stepless speed changing and output in both the forward power transmission state and the reverse power transmission state. When the hydraulic continuously variable transmission 130 is switched to the neutral state, output from the motor shaft 133a is stopped.

The planetary power transmission section 140 is arranged so as to be located between the motor shaft 133a and the output rotary member 124 on the same side of the hydraulic continuously variable transmission 130 as the side on which the engine-coupled side of the input shaft 122 is located. The planetary power transmission section 140 includes a sun gear 142 that is supported to the power transmission shaft 123, multiple planet gears 143 that are meshed with the sun gear 142, a ring gear 144 that is meshed with the planet gears 143, and a carrier 141 that rotatably supports the planet gears 143. The carrier 141 includes arm portions 141a that rotatably support the planet gears 143 with an extending end portion, and a tube shaft portion 141b that is coupled to base sides of the arm portions 141a, and the carrier 141 is rotatably supported to the power transmission shaft 123 with the tube shaft portion 141b via a bearing.

The power transmission shaft 123 and the motor shaft 133a are coupled to each other via a joint 123a so as to be capable of in-unison rotation, the power transmission shaft 123 and the sun gear 142 are coupled via a spline structure so as to be capable of in-unison rotation, and the sun gear 142 is interlocked with the motor shaft 133a so as to be capable of in-unison rotation.

The ring gear 144 and the output rotary member 124 are interlocked so as to be capable of in-unison rotation, using an annular planet-side interlocking member 126 and an annular output-side interlocking member 127 that are aligned axially with the power transmission shaft 123 and fit around it so as to be capable of relative rotation. Specifically, the planet-side interlocking member 126 includes multiple engaging arm portions 126a that extend radially from the outer circumferential portion of the planet-side interlocking member 126 so as to be capable of in-unison rotation. The engaging arm portions 126a are engaged with the ring gear 144 at multiple locations, and the planet-side interlocking member 126 is interlocked with the ring gear 144 so as to be capable of in-unison rotation. The output-side interlocking member 127 is engaged with the planet-side interlocking member 126 using an engaging claw 127a so as to be capable of in-unison rotation, is engaged with the output rotary member 124 using a spline structure so as to be capable of in-unison rotation, and is coupled to the planet-side interlocking member 126 and the output rotary member 124 so as to be capable of in-unison rotation. The planet-side interlocking member 126 is supported to the power transmission shaft 123 via a bearing so as to be capable of relative rotation. The output-side interlocking member 127 is rotatably supported to the shift case 121 via a bearing.

The forward/reverse switching mechanism 150 includes a forward power transmission gear 151 that is rotatably supported to the input shaft 122 via a needle bearing, a forward clutch 152 that is provided so as to span between the power transmission gear 151 and the input shaft 122, a reverse power transmission shaft 153 that is rotatably supported to the shift case 121 in an arrangement parallel or substantially parallel to the input shaft 122, a reverse rotation input gear 155 that is supported to the reverse power transmission shaft 153 so as to be capable of relative rotation when meshed with a power transmission gear 154 that is supported to the input shaft 122 so as to be capable of in-unison rotation, a reverse clutch 156 that is provided so as to span between the input gear 155 and the reverse power transmission shaft 153, and a reverse power transmission gear 157 that is provided so as to be capable of in-unison rotation with the reverse power transmission shaft 153.

The forward power transmission gear 151 and the reverse power transmission gear 157 are meshed with the input gear 141*c* of the carrier 141 that is provided so as to be capable of in-unison rotation with the tube shaft portion 141*b* of the carrier 141. The input gear 155 and the power transmission gear 154 are located on the side of the planetary power transmission section 140 opposite to the side on which the forward power transmission gear 151 and the reverse power transmission gear 157 are located. The forward power transmission gear 151 and the reverse power transmission gear 157 are meshed with the input gear 141*c* of the planetary power transmission section 140 that is located on the side of the sun gear 142 opposite to the side on which the input gear 155 and the power transmission gear 154 are located.

The forward clutch 152 is configured to include a forward clutch member 152*a* that is supported to the input shaft 122 so as to be capable of in-unison rotation and sliding, and a clutch mechanism body 152*b* that is provided so as to span between one end side of the forward clutch member 152*a* and a lateral side of the forward power transmission gear 151. The forward clutch member 152*a* is caused to slide by a hydraulic piston 158 fit inside an end portion of the forward clutch member 152*a*. The clutch mechanism body 152*b* is configured as a meshing clutch that switches between an on state and an off state when a meshing claw provided on the forward clutch member 152*a* and a meshing claw provided on the forward power transmission gear 151 engage/disengage with each other.

The reverse clutch 156 is configured to include a reverse clutch member 156*a* that is supported to the reverse power transmission shaft 153 on as to be capable of in-unison rotation and sliding, and a clutch mechanism body 156*b* that is provided so as to span between one end side of the reverse clutch member 156*a* and a lateral side of the input gear 155. The reverse clutch member 156*a* is caused to slide by a hydraulic piston 159 fit inside an end portion of the reverse clutch member 156*a*. The clutch mechanism body 156*b* is configured as a meshing clutch that switches between an on state and an off state when a meshing claw provided on the reverse clutch member 156*a* and a meshing claw provided on the input gear 155 engage/disengage with each other.

When the forward clutch 152 is switched to the on state, and the reverse clutch 156 is switched to the off state, the forward/reverse switching mechanism 150 enters the forward power transmission state, inputs drive force of the input shaft 122 from the forward clutch member 152*a* that is located between the engine-coupled side and the hydraulic continuously variable transmission-coupled side of the input shaft 122, converts the drive force from the input shaft 122 into forward drive force, and transmits it from the forward power transmission gear 151 to the carrier 141 of the planetary power transmission section 140.

When the forward clutch 152 is switched to the off state, and the reverse clutch 156 is switched to the on state, the forward/reverse switching mechanism 150 enters the reverse power transmission state, inputs drive force of the input shaft 122 from the power transmission gear 154 that is located between the engine-coupled side and the hydraulic continuously variable transmission-coupled side of the input shaft 122, converts the drive force from the input shaft 122 into reverse drive force, and transmits it from the reverse power transmission gear 157 to the carrier 141 of the planetary power transmission section 140.

When the forward clutch 152 and the reverse clutch 156 are switched to the off state, the forward/reverse switching mechanism 150 enters the neutral state and cuts off the interlocking of the input shaft 122 and the carrier 141 of the planetary power transmission section 140.

An output-side clutch mechanism 160 that includes a clutch member 161 fit around the power transmission shaft 123 is provided on as to span between the sun gear 142 of the planetary power transmission section 140 and the planet-side interlocking member 126.

When hydraulic oil is supplied to an oil chamber formed on the inner circumferential side of the clutch member 161, the clutch member 161 switches to an off position by being caused to slide toward the sun gear 142 in resistance to an on biasing spring 162, and when hydraulic oil is discharged from the oil chamber, the clutch member 161 switches to an on position by being caused to slide toward the planet-side interlocking member 126 by the on biasing spring 162. When the clutch member 161 switches to the on position, a clutch claw 161*a* provided on the clutch member 161 engages with a clutch claw provided on the planet-side interlocking member 126, and thus the clutch member 161 is coupled to the planet-side interlocking member 126 so as to be capable of in-unison rotation. The clutch member 161 is caused to slide while maintaining the state of being engaged with the sun gear 142 so as to be capable of in-unison rotation by the engaging claw 161*b*, and reaches the on position while maintaining the engaged state with respect to the sun gear 142. When the clutch member 161 switches to the off position, the engagement with the planet-side interlocking member 126 using the clutch claw 161*a* is canceled.

Accordingly, with the output-side clutch mechanism 160, when the clutch member 161 is switched to the off position, the interlocking between the sun gear 142 and the planet-side interlocking member 126 is cut off, thus cutting off the interlocking of the motor shaft 133*a* to the output rotary member 124, and this achieves a first power transmission state in which the ring gear 144 of the planetary power transmission section 140 and the output rotary member 124 are interlocked so as to be capable of in-unison rotation, thus enabling combined drive force from the planetary power transmission section 140 to be output from the output rotary member 124.

With the output-side clutch mechanism 160, when the clutch member 161 is switched to the on position, the sun gear 142 and the planet-side interlocking member 126 are interlocked so as to be capable of in-unison rotation, and this achieves a second power transmission state in which the motor shaft 133*a* is interlocked with the output rotary member 124 so as to be capable of in-unison rotation, thus enabling output from the hydraulic continuously variable shift apparatus 130 to be output from the output rotary member 124. Also, when the sun gear 142 and the power transmission shaft 123 are interlocked so as to be capable of in-unison rotation, and the ring gear 144 and the planet-side interlocking member 126 are interlocked an as to be capable of in-unison rotation, the sun gear 142, the planet gears 143, and the ring gear 144 can rotate in unison with the motor shaft 133*a* such that autorotation of the planet gears 143 does not occur.

Accordingly, with the planetary power transmission section 140, when the forward/reverse switching mechanism 150 is switched to the forward power transmission state, and the output-side clutch mechanism 160 is switched to the off state, forward drive force from the input shaft 122 is inputted to the carrier 141 via the forward/reverse switching mechanism 150, output from the motor shaft 133a of the hydraulic continuously variable shift apparatus 130 is inputted to the sun gear 142 via the power transmission shaft 123, forward drive force from the input shaft 122 and output from the hydraulic continuously variable shift apparatus 130 are combined to generate forward-side combined drive force, and the generated forward-side combined drive force is outputted from the ring gear 144 to the output rotary member 124 via the planet-side interlocking member 126 and the output-side interlocking member 127.

With the planetary power transmission section 140, when the forward/reverse switching mechanism 150 is switched to the reverse power transmission state, and the output-side clutch mechanism 160 is switched to the off state, reverse drive force from the input shaft 122 is inputted to the carrier 141 via the forward/reverse switching mechanism 150, output from the motor shaft 133a of the hydraulic continuously variable shift apparatus 130 is inputted to the sun gear 142 via the power transmission shaft 123, forward drive force from the input shaft 122 and output from the hydraulic continuously variable shift apparatus 130 are combined to generate reverse-side combined drive force, and the generated reverse-side combined drive force is outputted from the ring gear 144 to the output rotary member 124 via the planet-side interlocking member 126 and the output-side interlocking member 127.

When the forward/reverse switching mechanism 150 is switched to the neutral state, the planetary power transmission section 140 enters a state in which interlocking with the input shaft 122 is cut off.

FIG. 22 is an illustrative diagram showing the relationship that the operation states of the hydraulic continuously variable transmission 130, the forward clutch 152, the reverse clutch 156, and the output-side clutch mechanism 160 have with the power transmission mode of the shift power transmission apparatus 120. In FIG. 22, "forward" indicates the forward power transmission state of the hydraulic continuously variable transmission 130, and "reverse" indicates the reverse power transmission state of the hydraulic continuously variable transmission 130. In FIG. 22, "OFF" indicates the off state of the forward clutch 152, the reverse clutch 156, and the output-side clutch mechanism 160, and "ON" indicates the on state of the forward clutch 152, the reverse clutch 156, and the output-side clutch mechanism 160. FIG. 19 is a front view in vertical section of the shift power transmission apparatus 120 in the state in which HST mode power transmission is achieved.

FIG. 19 is a front view in vertical section of the shift power transmission apparatus 120 during HST mode power transmission. A shown in FIGS. 19 and 22, when the forward clutch 152 and the reverse clutch 156 are controlled so as to be switched to the off state, and the output-side clutch mechanism 160 is controlled so as to be switched to the on state, the shift power transmission apparatus 120 enters the state in which HST mode power transmission is achieved. When the shift power transmission apparatus 120 enters the HST mode power transmission state, engine drive force input by the input shaft 122 is subjected to speed change by only the hydraulic continuously variable transmission 130 without being transmitted to the planetary power transmission section 140, the speed-changed drive force is transmitted from the motor shaft 133a to the output rotary member 124 via the power transmission shaft 123, the sun gear 142, the clutch member 161, the planet-side interlocking member 126, and the output-side interlocking member 127, and then transmitted from the output rotary member 124 to the pair of right and left travel apparatuses 101.

Figure 20:
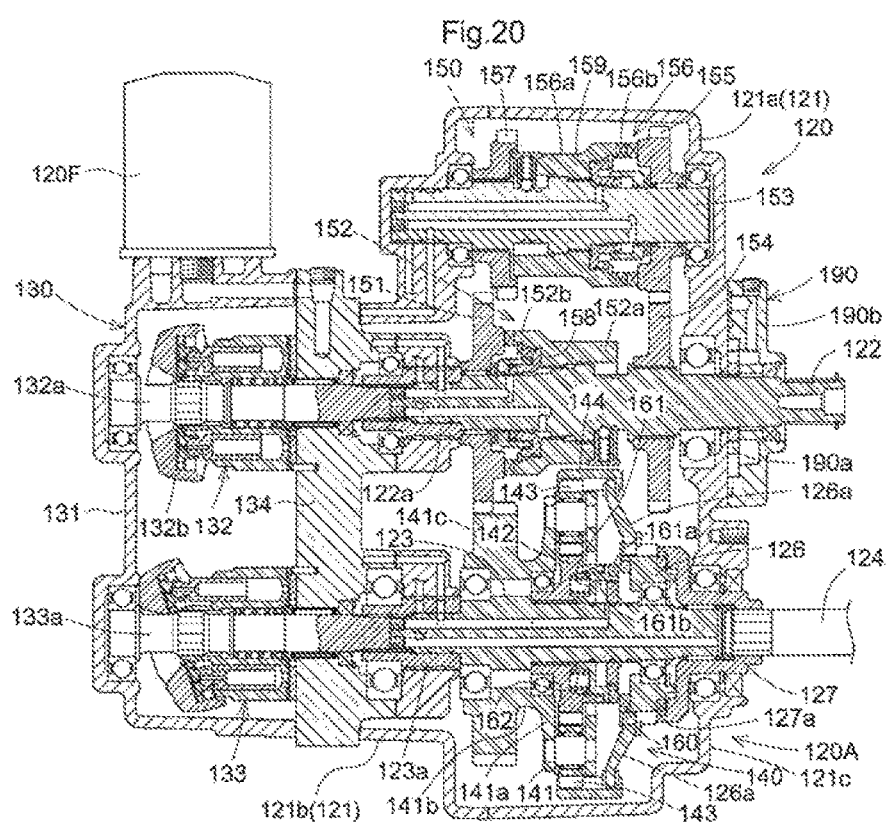
FIG. 20 is a front view in vertical section of the shift power transmission apparatus during forward-side HMT mode power transmission.

FIG. 20 is a front view in vertical section of the shift power transmission apparatus 120 during forward-side HMT mode power transmission. As shown in FIGS. 20 and 22, when the forward clutch 152 is controlled so as to switch to the on state, and the reverse clutch 156 and the output-side clutch mechanism 160 are controlled so as to switch to the off state, the shift power transmission apparatus 120 enters a state in which forward-side HMT mode power transmission is achieved. When the shift power transmission apparatus 120 enters the forward-side HMT mode power transmission state, engine drive force input by the input shaft 122 is converted into forward drive force by the forward/reverse switching mechanism 150 and transmitted to the planetary power transmission section 140, the planetary power transmission section 140 combines the forward drive force from the forward/reverse switching mechanism 150 with output from the motor shaft 133a of the hydraulic continuously variable transmission 130 so as to generate forward-side combined drive force, and the generated forward-side combined drive force is transmitted from the ring gear 144 to the output rotary member 124 via the planet-side interlocking member 126 and the output-side interlocking member 127, and then transmitted from the output rotary member 124 to the pair of right and left travel apparatuses 101.

Figure 21:
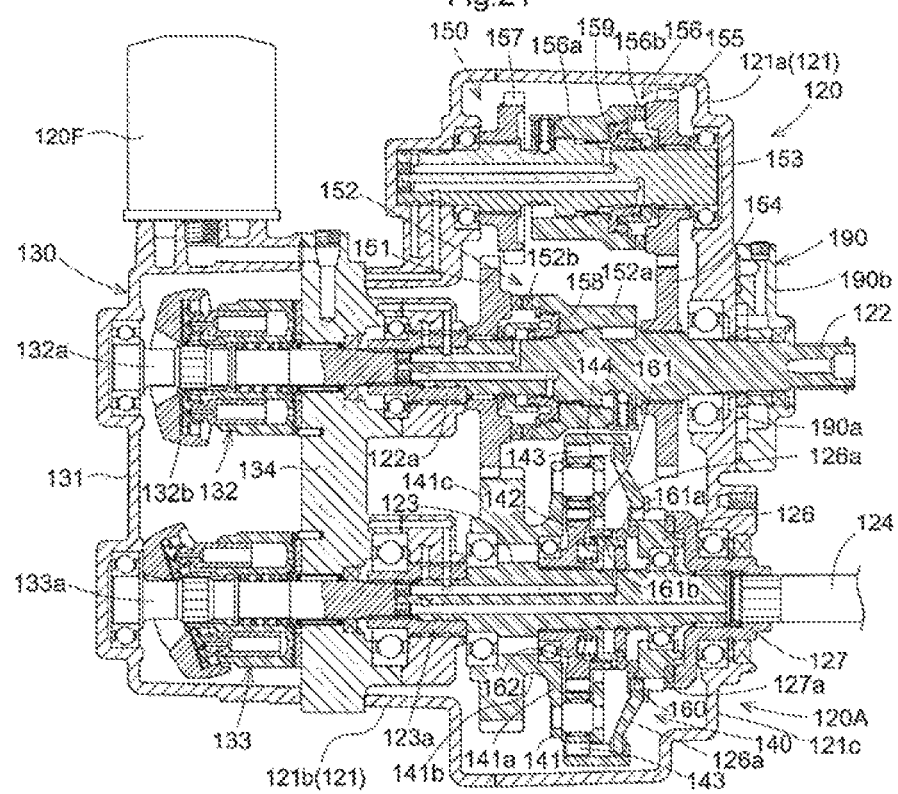
FIG. 21 is a front view in vertical section of the shift power transmission apparatus during reverse-side HMT mode power transmission.

FIG. 21 is a front view in vertical section of the shift power transmission apparatus 120 during reverse-side HMT mode power transmission. As shown in FIGS. 21 and 22, when the reverse clutch 156 is controlled so as to switch to the on state, and the forward clutch 152 and the output-side clutch mechanism 160 are controlled so as to switch to the off state, the shift power transmission apparatus 120 enters a state in which reverse-side HMT mode power transmission is achieved. When the shift power transmission apparatus 120 enters the reverse-side HMT mode power transmission state, engine drive force input by the input shaft 122 is converted into reverse drive force by the forward/reverse switching mechanism 150 and transmitted to the planetary power transmission section 140, the planetary power transmission section 140 combines the reverse drive force from the forward/reverse switching mechanism 150 with output from the motor shaft 133a of the hydraulic continuously variable transmission 130 so as to generate reverse-side combined drive force, and the generated reverse-side combined drive force is transmitted from the ring gear 144 to the output rotary member 124 via the planet-side interlocking member 126 and the output-side interlocking member 127, and then transmitted from the output rotary member 124 to the pair of right and left travel apparatuses 101.

FIG. 23 is an illustrative diagram showing the relationship between the shift state of the hydraulic continuously variable transmission 130 and the output speed of the output rotary member 124 of the shift power transmission apparatus 120 in the state in which the accelerator of the engine 108 is set such that a set constant speed of drive force is output. In FIG. 23, the horizontal axis indicates the shift state of the hydraulic continuously variable transmission 130, "n" indicates the neutral position of the hydraulic continuously variable transmission 130, "−max" indicates the maximum speed position in the reverse power transmission state of the hydraulic continuously variable transmission 130, and "+max" indicates the maximum speed position in the forward power transmission state of the hydraulic continuously variable transmission 130. The vertical axis in FIG. 23 indicates the output speed of the output rotary member 124. A solid line RL and a solid line FL shown in FIG. 23 indicate change in the output speed when the forward clutch 152 and the reverse clutch 156 are controlled so as to switch to the off state, and the output-side clutch mechanism 160 is controlled so as to switch to the on state, that is to say, when the shift power transmission apparatus 120 is put in the HST mode power transmission state. Solid lines FM and FH shown in FIG. 23 indicate change in the output speed when the forward clutch 152 is controlled so as to switch to the on state, and the reverse clutch 156 and the output-side clutch mechanism 160 are controlled so as to switch to the off state, that is to say, when the shift power transmission apparatus 120 is put in the forward-side HMT mode power transmission state. Solid lines RM and RH shown in FIG. 23 indicate change in the output speed when the reverse clutch 156 is controlled so as to switch to the on state, and the forward clutch 152 and the output-side clutch mechanism 160 are controlled so as to switch to the off state, that is to say, when the shift power transmission apparatus 120 is put in the reverse-side HMT mode power transmission state.

As shown in FIG. 22, and as shown by the solid line FL in FIG. 23, in the state in which the forward clutch 152 and the reverse clutch 156 are in the off state, and the output-side clutch mechanism 160 is in the on state, if the hydraulic continuously variable transmission 130 is operated to the neutral position "n", the output changes to zero "0".

While the forward clutch 152 and the reverse clutch 156 are maintained in the off state, and the output-side clutch mechanism 160 is maintained in the on state, if the hydraulic continuously variable transmission 130 is shifted from the neutral position "n" toward the maximum speed position "+max" in the forward power transmission state, forward drive force is output. While the forward clutch 152 and the reverse clutch 156 are maintained in the off state, and the output-side clutch mechanism 160 is maintained in the on state, as the hydraulic continuously variable transmission 130 is shifted from the neutral position "n" toward the maximum speed position "+max" in the forward power transmission state, forward output steplessly increases. When the hydraulic continuously variable transmission 130 reaches the maximum speed position "+max" in the forward power transmission state, the output speed reaches a forward intermediate speed "FV1".

As shown in FIG. 22, and as shown by the solid lines FM and FH in FIG. 23, when the hydraulic continuously variable transmission 130 reaches the maximum speed position "+max" in the forward power transmission state, the forward clutch 152 is controlled so as to switch to the on state, and the output-side clutch mechanism 160 is controlled so as to switch to the off state, and, while the forward clutch 152 is maintained in the on state, and the reverse clutch 156 and the output-side clutch mechanism 160 are maintained in the off state, as the hydraulic continuously variable shift apparatus 130 is shifted from the maximum speed position "+max" in the forward power transmission state toward the maximum speed position "−max" in the reverse power transmission state, the forward output steplessly increases from the intermediate speed "FV1". When the hydraulic continuously variable transmission 130 reaches the maximum speed position "−max" in the reverse power transmission state, the output speed reaches a forward intermediate speed "FV2".

As shown in FIG. 22, and as shown by the solid line RL in FIG. 23, while the forward clutch 152 and the reverse clutch 156 are maintained in the off state, and the output-side clutch mechanism 160 is maintained in the on state, if the hydraulic continuously variable transmission 130 is shifted from the neutral position "n" toward the maximum speed position "−max" in the reverse power transmission state, reverse drive force is output. While the forward clutch 152 and the reverse clutch 156 are maintained in the off state, and the output-side clutch mechanism 160 is maintained in the on state, as the hydraulic continuously variable transmission 130 is shifted from the neutral position "n" toward the maximum speed position "−max" in the reverse power transmission state, reverse output steplessly increases. When the hydraulic continuously variable transmission 130 reaches the maximum speed position "−max" in the reverse power transmission state, the output speed reaches a reverse intermediate speed "RV1".

As shown in FIG. 22, and as shown by the solid lines RM and RH in FIG. 23, when the hydraulic continuously variable transmission 130 reaches the maximum speed position "−max" in the reverse power transmission state, the reverse clutch 156 is controlled so as to switch to the on state, and the output-side clutch mechanism 160 is controlled so as to switch to the off state, and, while the reverse clutch 156 is maintained in the on state, and the forward clutch 152 and the output-side clutch mechanism 160 are maintained in the off state, as the hydraulic continuously variable shift apparatus 130 is shifted from the maximum speed position "−max" in the reverse power transmission state toward the maximum speed position "+max" in the forward power transmission state, the reverse output steplessly increases from the intermediate speed "RV1". When the hydraulic continuously variable transmission 130 reaches the maximum speed position "+max" in the forward power transmission state, the output reaches a reverse intermediate speed "RV2".

In FIG. 23, "N" indicates the value on the horizontal axis when the solid lines FH and FM extend beyond the forward-side maximum speed position "+max" of the hydraulic continuously variable transmission 130 to the point at which the output rotation reaches zero "0". Letting 1 be the horizontal axis value for the forward-side maximum speed position "+max" of the hydraulic continuously variable transmission 130, N=1.6 to 2.2. In other words, the capacities of the hydraulic pump 132 and the hydraulic motor 133 in the hydraulic continuously variable transmission 130 and the power transmission gear ratio of the planetary power transmission section 140 are set such that N=1.6 to 2.2.

FIG. 24 is a block diagram showing a shift operation apparatus 171 that performs shift operations on the shift power transmission apparatus 120. As shown in this figure, the shift operation apparatus 171 includes a control apparatus 172 that is linked to the shift operation section 130a of the hydraulic continuously variable transmission 130 and operation sections 152c, 156c, and 160a of the forward clutch 152, the reverse clutch 156, and the output-side clutch mechanism 160, as well as the shift detection sensor 173, the engine speed sensor 174, the transmission output speed sensor 175, and the output speed sensor 176 that are linked to the control apparatus 172.

The shift operation section 130a is configured by an electrical actuator or a hydraulic actuator that operates so as to change the angle of the swash plate 132b of the hydraulic pump 132 in the hydraulic continuously variable shift apparatus 130. The operation section 152c of the forward clutch 152 is configured by an operation valve that is connected to a hydraulic piston 158 via an operation oil path formed inside the input shaft 122, and by operating the hydraulic piston 158 so as to cause the forward clutch member 152a to slide, the operation section 152c switches the forward clutch 152. The operation section 156c of the reverse clutch 156 is configured by an operation valve that is connected to a hydraulic piston 159 via an operation oil path formed inside the reverse power transmission shaft 153, and by operating the hydraulic piston 159 so as to cause the reverse clutch member 156a to slide, the operation section 156c switches the reverse clutch 156. The operation section 160c of the output-side clutch mechanism 160 is configured by an operation valve that is connected to the oil chamber of the clutch member 161 via an operation oil path formed inside the power transmission shaft 123, and by supplying/discharging operation oil to/from the oil chamber of the clutch member 161, the operation section 160c causes the clutch member 161 to slide so as to switch the output-side clutch mechanism 160.

The shift detection sensor 173 detects the operation position of a shift lever 177, and outputs this detection result to the control apparatus 172. The engine speed sensor 174 detects the rotational speed of the engine 108, and outputs this detection result to the control apparatus 172. The transmission output speed sensor 175 detects the output speed of the hydraulic continuously variable transmission 130, and outputs this detection result to the control apparatus 172. The output speed sensor 176 detects the output speed of the shift power transmission apparatus 120, and outputs this detection result to the control apparatus 172.

The control apparatus 172 is configured using a microcomputer, and includes a shift control module 178. Based on the detection information from the shift detection sensor 173 and the transmission output speed sensor 175, the shift control module 178 performs shift control on the hydraulic continuously variable transmission by operating the shift operation section 130a such that the shift state of the hydraulic continuously variable transmission 130 corresponds to the operation position of the shift lever 177.

In addition to performing shift control on the hydraulic continuously variable transmission 130, the shift control module 178 detects the rotational speed of the engine 108, whose accelerator has been set, based on the detection information from the engine speed sensor 174, and then, based on this detection result and the detection information from the shift detection sensor 173, the transmission output speed sensor 175, and the output speed sensor 176, the shift control module 178 performs control for operating the operation section 152c, the operation section 156c, and the operation section 160c so as to switch the forward clutch 152, the reverse clutch 156, and the output-side clutch mechanism 160 in accordance with predetermined timing so that the shift power transmission apparatus 120 transmits power while achieving HST mode power transmission, forward-side HMT mode power transmission, and reverse-side HMT mode power transmission as shown in FIGS. 22 and 23.

Alternative Embodiment

Figure 25:
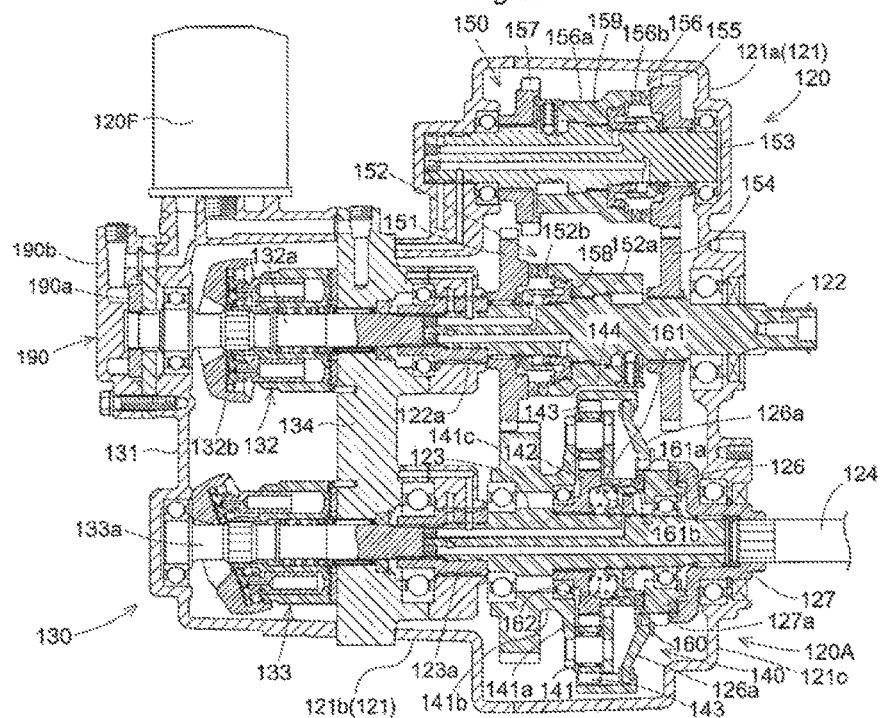
FIG. 25 is a front view in vertical section of a shift power transmission apparatus having an alternative embodiment structure.
Figure 26:
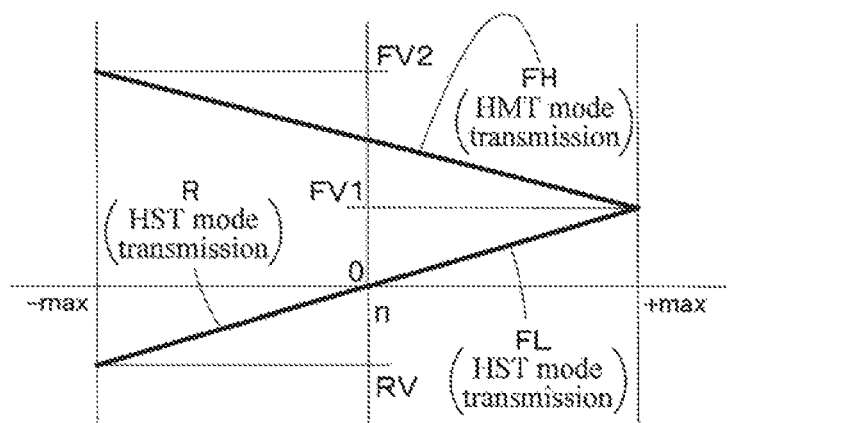
FIG. 26 is an illustrative diagram showing output characteristics of a shift power transmission apparatus having a comparative structure.
Figure 27:
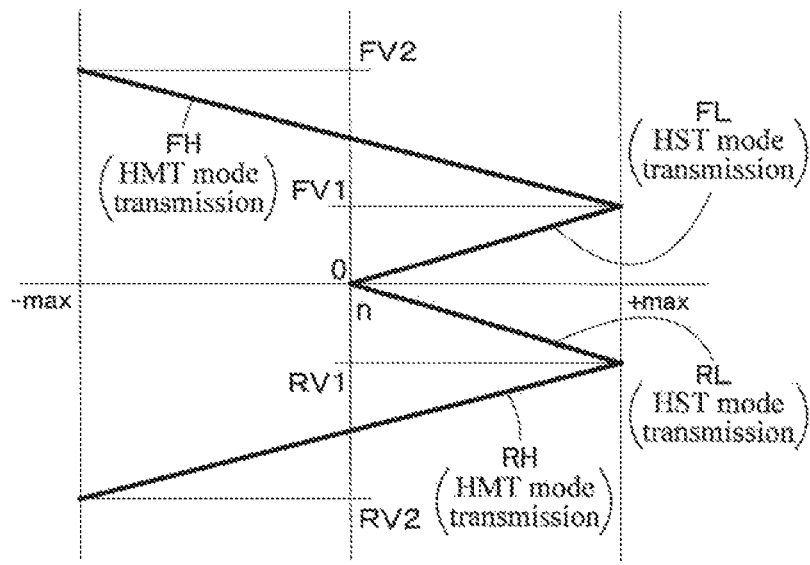
FIG. 27 is an illustrative diagram showing output characteristics of a shift power transmission apparatus having a comparative structure.

FIG. 25 is a front view in vertical section of the shift power transmission apparatus 120 having an alternative embodiment structure. As shown in this figure, in the shift power transmission apparatus 120 having the alternative embodiment structure, the charge pump 190 that supplies replenishing hydraulic oil to the hydraulic continuously variable transmission 130 is mounted to an end portion of the pump shaft 132a. The charge pump 190 includes a rotor 190a attached to the pump shaft 132a so as to be capable of in-unison rotation therewith, and a pump casing 190b that is removably coupled to the casing 131.

Other Alternative Embodiments (1) Although the above-described embodiment gives the example where the forward/reverse switching mechanism 150 is configured such that the ratio of power transmission from the input shaft 122 to the carrier 141 in the forward power transmission state and the ratio of power transmission from the input shaft 122 to the carrier 141 in the reverse power transmission state are the same or substantially the same, it is possible to employ a forward/reverse switching mechanism configured such that the ratio of power transmission from the input shaft 122 to the carrier 141 in the forward power transmission state and the ratio of power transmission from the input shaft 122 to the carrier 141 in the reverse power transmission state are different. In this case, the angle of inclination of the solid lines RM and RH indicating the output speed in reverse-side HMT mode power transmission relative to the horizontal axis and the angle of inclination of the solid lines FM and FH indicating the output speed in forward-side HMT mode power transmission may be the same or different, and the maximum speed of reverse output and the maximum speed of forward output may be the same or different.

(2) Although the above-described embodiment gives the example where the reverse clutch 156 is provided so as to span between the input gear 155 and the reverse power transmission shaft 153, an implementation is possible in which the input gear 155 is supported to the reverse power transmission shaft 153 so as to be capable of in-unison rotation, the reverse power transmission gear 157 is supported to the reverse power transmission shaft 153 so as to be capable of relative rotation, and the reverse clutch 156 is provided so as to span between the reverse power transmission gear 157 and the reverse power transmission shaft 153.

(3) Although the above-described embodiment gives the example where the forward clutch 152, the reverse clutch 156, and the output-side clutch mechanism 160 are configured by a meshing type of clutch, an implementation is possible in which they are configured by a friction type of clutch.

(4) Although the above-described embodiment gives the example where forward drive force and reverse drive force from the forward/reverse switching mechanism 150 is inputted to the carrier 141 of the planetary power transmission section 140, and drive force from the ring gear 144 of the planetary power transmission section 140 is transmitted to the output rotary member 124, a configuration may be implemented in which forward drive force and reverse drive force from the forward/reverse switching mechanism 150 is inputted to the ring gear 144 of the planetary power transmission section 140, and drive force from the carrier 141 of the planetary power transmission section 140 is transmitted to the output rotary member 124.

(5) Although the above-described embodiment gives the example where the hydraulic motor 133 has a variable displacement configuration, an implementation is possible in which it has a fixed capacity configuration.

Third Embodiment

Next, a third embodiment will be described with reference to FIGS. 28 to 44.

Figure 28:
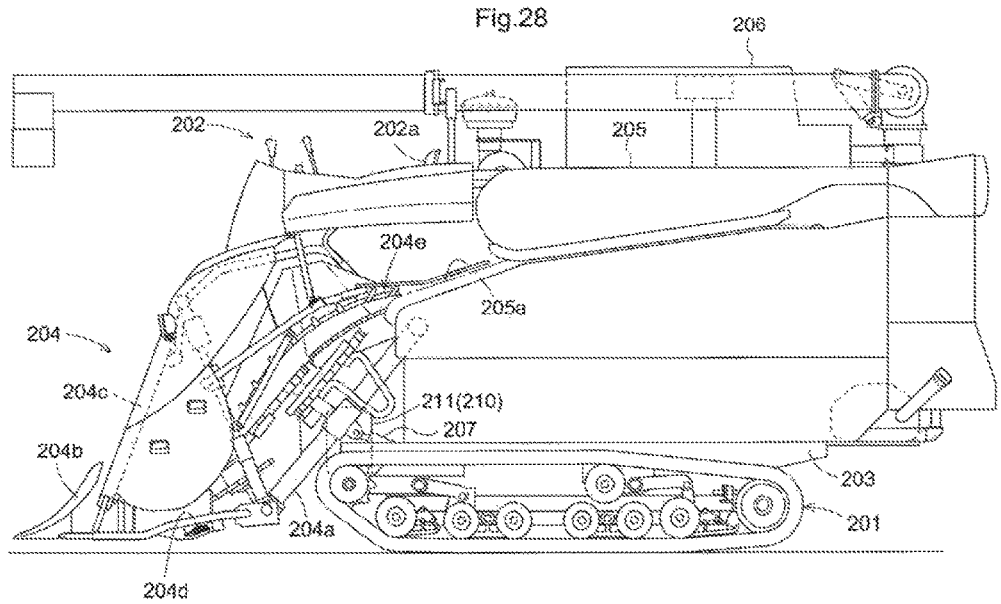
FIG. 28 is a figure pertaining to a third embodiment (the same follows through to FIG. 44), showing a side view of an entire combine.

As shown in FIG. 28, the combine, which performs the task of harvesting rice, barley, and the like, is configured to be self-propelled with a pair of right and left crawling travel apparatuses 201, and is configured to include a traveling body equipped with a riding driving section 202, a reaping section 204 coupled to the front portion of a body frame 203 of the traveling body, a threshing apparatus 205 provided so as to be arranged rearward of the reaping section 204 on the rear side of the body frame 203, and a grain tank 206 provided so as to be arranged to the side of the threshing apparatus 205 on the rear side of the body frame 203.

Specifically, the reaping section 204 includes a reaping section frame 204a that extends forward from the front portion of the body frame 203 in a vertically swingable manner, and when the reaping section frame 204a is swung by an elevating cylinder 207, the reaping section 204 moves up/down between a lowered operating position at which a divider 204b, which is provided at the front edge portion of the reaping section 204, is lowered close to the ground, and a raised non-operating position at which the divider 204b is raised high above the ground. When the traveling body is caused to travel with the reaping section 204 lowered to the lowered operating position, the reaping section 204 operates such that reaping-target planted stalks are guided to a raising path by the divider 204b, the planted stalks that were guided to the raising path are reaped by a clipper-type reaping apparatus 204d while being raised up by a raising apparatus 204c, and the reaped stalks are supplied to the threshing apparatus 205 by a supplying apparatus 204e. In the threshing apparatus 205, the reaped stalks are conveyed from the supplying apparatus 204e toward the rear of the apparatus body with their base sides clamped by a threshing feed chain 205a, the ear tip-sides of the reaped stalks are supplied to a handling compartment (not shown) where they are subjected to reaping processing, and the reaped grain is fed to the grain tank 206.

The combine is configured such that an engine 208 is provided underneath a driver seat 202a provided in the driving section 202, and drive force outputted by the engine 208 is transmitted to the pair of right and left travel apparatuses 201 by a travel power transmission apparatus 210 that includes a transmission case 211 provided at the front edge portion of the body frame 203.

Figure 29:
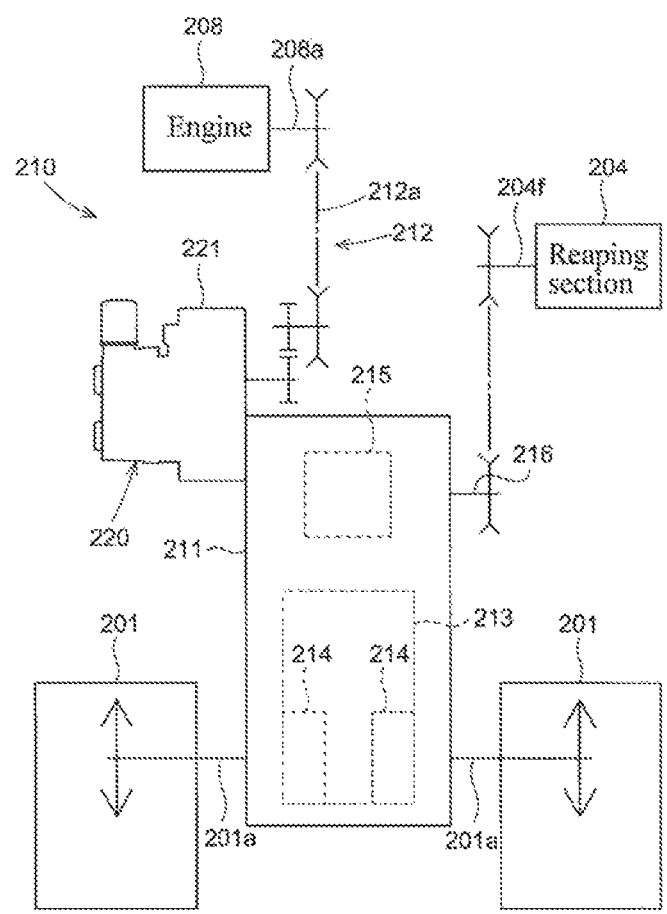
FIG. 29 is a schematic front view of a travel power transmission apparatus.

FIG. 29 is a front view of the schematic structure of the travel power transmission apparatus 210. As shown in this figure, in the travel power transmission apparatus 210, engine drive force from an output shaft 208a of the engine 208 is inputted to a shift power transmission device 220 provided on the side of the upper end portion of the transmission case 211 via a power train 212 provided with a power transmission belt 212a. Output of the shift power transmission device 220 is inputted to a traveling transmission 213 provided inside the transmission case 211, then transmitted from a left-side steering clutch mechanism 214, which is one of a pair of right and left steering clutch mechanisms 214 included in the traveling transmission 213, to a drive shaft 201a of the left-side travel apparatus 201, and also transmitted from the right-side steering clutch mechanism 214 to a drive shaft 201a of the right-side travel apparatus 201.

The travel power transmission apparatus 210 includes a reaping transmission 215 that is provided inside the transmission case 211, and output of the shift power transmission device 220 is inputted to the reaping transmission 215 and transmitted from a reaping output shaft 216 to a drive shaft 204f of the reaping section 204.

Next, the shift power transmission device 220 will be described.

Figure 30:
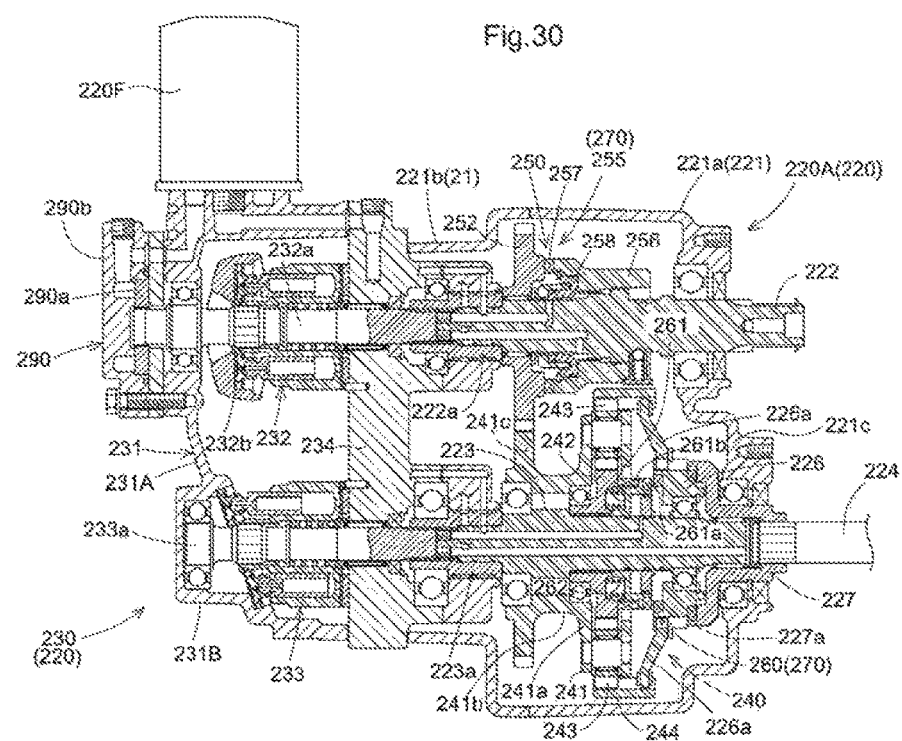
FIG. 30 is a front view in vertical section of a shift power transmission device during HMT power transmission.
Figure 31:
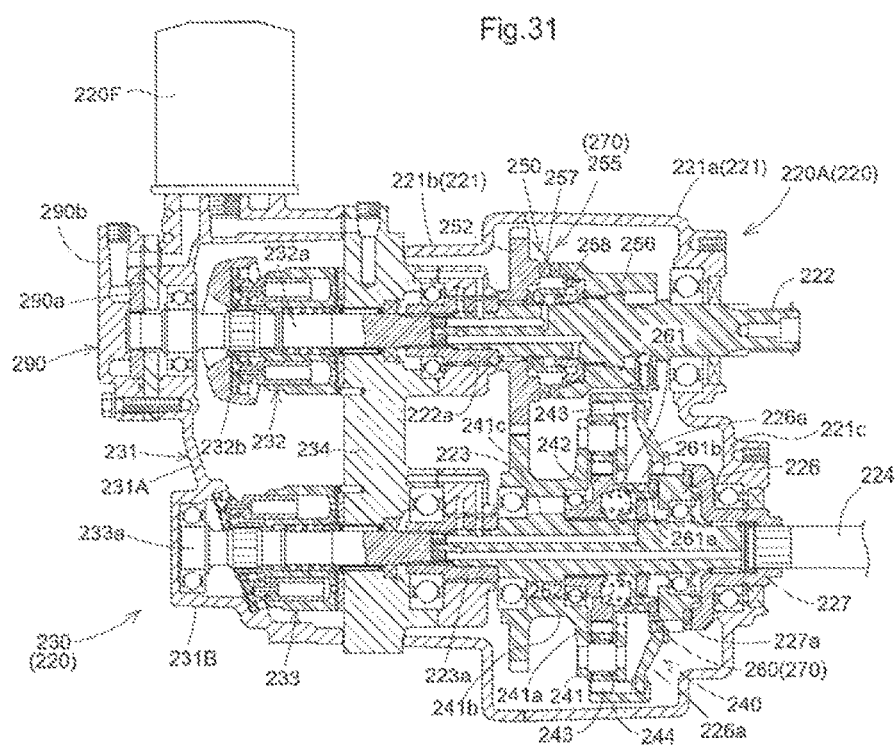
FIG. 31 is a front view in vertical section of the shift power transmission device during HST power transmission.

As shown in FIGS. 30 and 31, the shift power transmission device 220 is configured to include a planetary shift section 220A, which is provided with a shift case 221 whose side portion is coupled to the upper end side of the transmission case 211, and a hydrostatic continuously variable shift section 230 that has a casing 231 coupled to the side portion on the side opposite to the side on which the shift case 221 is coupled to the transmission case 211.

The shift case 221 is configured to include a main case portion 221a that accommodates a planetary power transmission section 240 and a power train 250, and a coupling case portion 221b that accommodates a connection portion between the continuously variable shift section 230 and an input shaft 222 and a power transmission shaft 223, and that couples the shift case 221 with a port block 234 of the casing 231. The shift case 221 is coupled to the transmission case 211 with a bulging portion 221c formed so as to bulge outward horizontally on the side face of the lower portion of the main case portion 221a where the output rotary member 224 is located. The size of the coupling case portion 221b in the up/down direction of the traveling body is smaller than the size of the main case portion 221a in the up/down direction of the traveling body. The main case portion 221a is formed such that the shape in vertical section is vertically elongated when viewed in the front/rear direction of the apparatus body, the casing 231 is formed such that the shape in vertical section is vertically elongated when viewed in the front/rear direction of the apparatus body, the planetary shift section 220A and the continuously variable shift section 230 are aligned in the horizontal direction of the apparatus body such that the shift power transmission device 220 has a small width overall in the horizontal direction of the apparatus body, and the shift power transmission device 220 is coupled to the lateral side of the transmission case 211 in a compact state with respect to the left/right direction of the traveling body so as to not protrude outward horizontally. Furthermore, the side face of the lower portion of the casing 231 is formed so as to have an inclined face 231A that is inclined toward the interior of the apparatus in the downward direction. A bulging portion 231B that supports a bearing of a motor shaft 233a is formed on the inclined face 231A, thus making the shift power transmission device 220 even more compact. Also, an oil filter 220F is arranged facing upward on the upper face of the casing 231, and further compactness is achieved by preventing the oil filter 220F from protruding outward horizontally.

The planetary shift section 220A includes the input shaft 222 that is oriented in the horizontal direction of the apparatus body and is rotatably supported to the upper end side of the shift case 221, a power transmission shaft 223 and a rotating shaft-type of output rotary member 224 that are rotatably supported to the lower end side of the shift case 221 parallel or substantially parallel to the input shaft 222, the planetary power transmission section 240 that is supported to the power transmission shaft 223, and the power train 250 provided so as to span from the input shaft 222 to a carrier 241 of the planetary power transmission section 240.

The input shaft 222 is arranged so as to be coaxially aligned with a pump shaft 232a of the continuously variable shift section 230. The input shaft 222 is configured such that on the side on which it protrudes laterally outward from the shift case 221, it is coupled with an output shaft 208a of the engine 208 via the power train 212, and on the side opposite to the side coupled to the engine 208, it is coupled to the pump shaft 232a of the continuously variable shift section 230 so as to be capable of in-unison rotation therewith via a joint 222a. The input shaft 222 receives engine drive force via the power train 212, and drives the hydraulic pump 232 of the continuously variable shift section 230 upon being driven by engine drive force.

The output rotary member 224 is arranged so as to be coaxially aligned with a motor shaft 233a of the continuously variable shift section 230 on the same side of the continuously variable shift section 230 as the side on which the engine-coupled side of the input shaft 222 is located. The output rotary member 224 is configured such that on the side on which it protrudes laterally outward from the shift case 221, it is interlocked with an input portion of the traveling transmission 213, and outputs drive force from the planetary power transmission section 240 and the continuously variable shift section 230 to the pair of right and left travel apparatuses 201 via the traveling transmission 213.

The continuously variable shift section 230 is configured to include the hydraulic pump 232 whose pump shaft 232a is rotatably supported to the upper end side of the casing 231, and the hydraulic motor 233 whose motor shaft 233a is rotatably supported to the lower end side of the casing 231. The hydraulic pump 232 is configured by a variable displacement axial plunger pump, and the hydraulic motor 233 is configured by an axial plunger motor. The hydraulic motor 233 is driven by hydraulic oil that is discharged from the hydraulic pump 232 and supplied via an oil path formed inside the port block 234. The continuously variable shift section 230 is supplied with replenishing hydraulic oil by a charge pump 290 mounted to an end portion of the pump shaft 232a. The charge pump 290 includes a rotor 290a attached to the pump shaft 232a so as to be capable of in-unison rotation therewith, and a pump casing 290b that is removably coupled to the casing 231.

Accordingly, the continuously variable shift section 230 switches between the forward power transmission state, the reverse power transmission state, and the neutral state by an operation for changing the angle of a swash plate 232b that the hydraulic pump 232 is provided with. When the continuously variable shift section 230 is switched to the forward power transmission state, engine drive force transmitted from the input shaft 222 to the pump shaft 232a is converted into forward drive force and output from the motor shaft 233a, and when it is switched to the reverse power transmission state, engine drive force transmitted from the input shaft 222 to the pump shaft 232a is converted into reverse drive force and output from the motor shaft 233a, and thus engine drive force is subjected to stepless speed changing and output in both the forward power transmission state and the reverse power transmission state. When the hydraulic continuously variable shift section 230 is switched to the neutral state, output from the motor shaft 233a is stopped.

The planetary power transmission section 240 is arranged so as to be located between the motor shaft 233a and the output rotary member 224 on the same side of the continuously variable shift section 230 as the side on which the engine-coupled side of the input shaft 222 is located. The planetary power transmission section 240 includes a sun gear 242 that is supported to the power transmission shaft 223, multiple planet gears 243 that are meshed with the sun gear 242, a ring gear 244 that is meshed with the planet gears 243, and a carrier 241 that rotatably supports the planet gears 243. The carrier 241 includes arm portions 241a that rotatably support the planet gears 243 with an extending end portion, and a tube shaft portion 241b that is coupled to base sides of the arm portions 241a, and the carrier 241 is rotatably supported to the power transmission shaft 223 with the tube shaft portion 241b via a bearing.

The power transmission shaft 223 and the motor shaft 233a are coupled to each other via a joint 223a so as to be capable of in-unison rotation, the power transmission shaft 223 and the sun gear 242 are coupled via a spline structure so as to be capable of in-unison rotation, and the sun gear 242 is interlocked with the motor shaft 233a so as to be capable of in-unison rotation.

The ring gear 244 and the output rotary member 224 are interlocked so as to be capable of in-unison rotation, using an annular planet-side interlocking member 226 and an annular output-side interlocking member 227 that are aligned axially with the power transmission shaft 223 and fit around it so as to be capable of relative rotation. Specifically, the planet-side interlocking member 226 includes multiple engaging arm portions 226a that extend radially from the outer circumferential portion of the planet-side interlocking member 226 so as to be capable of in-unison rotation. The engaging arm portions 226a are engaged with the ring gear 244 at multiple locations, and the planet-side interlocking member 226 is interlocked with the ring gear 244 so as to be capable of in-unison rotation. The output-side interlocking member 227 is engaged with the planet-side interlocking member 226 using an engaging claw 227a so as to be capable of in-unison rotation, is engaged with the output rotary member 224 using a spline structure so as to be capable of in-unison rotation, and is coupled to the planet-side interlocking member 226 and the output rotary member 224 so as to be capable of in-unison rotation. The planet-side interlocking member 226 is supported to the power transmission shaft 223 via a bearing so as to be capable of relative rotation. The output-side interlocking member 227 is rotatably supported to the shift case 221 via a bearing.

The power train 250 is configured to include a power transmission gear 252 that is supported to the input shaft 222 via a needle bearing so as to be capable of relative rotation in a state of being meshed with an input gear 241c of the carrier 241 that is provided so as to be capable of in-unison rotation with the tube shaft portion 241b of the carrier 241, and an HMT clutch 255 provided so as to span between the power transmission gear 252 and the input shaft 222.

The HMT clutch 255 is configured to include a clutch member 256 supported to the input shaft 222 so as to be capable of in-unison rotation and sliding, and a clutch body 257 provided so as to span between one end side of the clutch member 256 and a lateral side of the power transmission gear 252. The clutch member 256 is caused to slide by a hydraulic piston 258 that is fit inside an end portion of the clutch member 256. The clutch body 257 is configured as a meshing clutch that switches between an on state and an off state when a meshing claw provided on the clutch member 256 and a meshing claw provided on the power transmission gear 252 engage/disengage with each other.

When the clutch body 257 is switched to the on state, the HMT clutch 255 is switched to the on state such that the input shaft 222 and the power transmission gear 252 are interlocked so as to be capable of in-unison rotation, and thus the HMT clutch 255 enters the state in which HMT power transmission is set so that the carrier 241 of the planetary power transmission section 240 and the input shaft 222 are interlocked.

When the clutch body 257 is switched to the off state, the HMT clutch 255 is switched to the off state such that the interlocking of the input shaft 222 and the power transmission gear 252 is cut off, and thus the HMT clutch 255 enters the state in which the HMT power transmission setting is canceled so that the interlocking of the carrier 241 of the planetary power transmission section 240 and the input shaft 222 is cut off.

Accordingly, in the planetary power transmission section 240, when the HMT clutch 255 is switched to the state in which HMT power transmission is set, drive force from the input shaft 222 is inputted from a site located between the engine-coupled side and the continuously variable shift section-coupled side of the input shaft 222 to the carrier 241 via the power train 250. When the HMT clutch 255 is switched to the state in which the HMT power transmission setting is canceled, the planetary power transmission section 240 enters a state in which interlocking of the carrier 241 with the input shaft 222 is cut off.

An HST clutch 260 that includes a clutch member 261 fit around the power transmission shaft 223 is provided so as to span between the sun gear 242 of the planetary power transmission section 240 and the planet-side interlocking member 226.

When hydraulic oil is supplied to an oil chamber formed on the inner circumferential side of the clutch member 261, the clutch member 261 switches to an off position by being caused to slide toward the sun gear 242 in resistance to an on biasing spring 262, and when hydraulic oil is discharged from the oil chamber, the clutch member 261 switches to an on position by being caused to slide toward the planet-side interlocking member 226 by the on biasing spring 262. When the clutch member 261 switches to the on position, a clutch claw 261a provided on the clutch member 261 engages with a clutch claw provided on the planet-side interlocking member 226, and thus the clutch member 261 is coupled to the planet-side interlocking member 226 so as to be capable of in-unison rotation. The clutch member 261 is caused to slide while maintaining the state of being engaged with the sun gear 242 so as to be capable of in-unison rotation by the engaging claw 261b, and reaches the on position while maintaining the engaged state with respect to the sun gear 242. When the clutch member 261 switches to the off position, the engagement with the planet-side interlocking member 226 using the clutch claw 261a is canceled.

Accordingly, with the HST clutch 260, when the clutch member 261 is switched to the on position, the sun gear 242 and the planet-side interlocking member 226 are interlocked so as to be capable of in-unison rotation, and this achieves a state in which HST power transmission is set so that the motor shaft 233a is interlocked with the output rotary member 224 so as to be capable of in-unison rotation, thus enabling output from the continuously variable shift section 230 to be output from the output rotary member 224. Also, when HST power transmission is set in the HST clutch 260, when the sun gear 242 and the power transmission shaft 223 are interlocked an as to be capable of in-unison rotation, and the ring gear 244 and the planet-side interlocking member 226 are interlocked on as to be capable of in-unison rotation, the sun gear 242, the carrier 241, and the ring gear 244 can rotate in unison with the motor shaft 233a such that autorotation of the planet gears 243 does not occur.

The HST clutch 260 switches the sun gear 242 of the planetary power transmission section 240 and the output rotary member 224 between the interlocking-on state and the interlocking-off state while maintaining the interlocked state between the ring gear 244 of the planetary power transmission section 240 and the output rotary member 224.

When the clutch member 261 is switched to the off position, the HST clutch 260 enters the state in which the setting of HST power transmission is canceled so that the interlocking of the sun gear 242 and the planet-side interlocking member 226 is cut off, the interlocking of the motor shaft 233a with the output rotary member 224 is cut off, and a state is realized in which the ring gear 244 of the planetary power transmission section 240 and the output rotary member 224 are interlocked so as to be capable of in-unison rotation, thus enabling combined drive force from the planetary power transmission section 240 to be output from the output rotary member 224.

Accordingly, with the planetary power transmission section 240, when the HMT clutch 255 is switched to the state in which HST power transmission is set, and the HST clutch 260 is switched to the state in which the setting of HST power transmission is canceled, drive force transmitted from the engine to the input shaft 222 is inputted to the carrier 241 via the power train 250, speed-changed drive force output from the motor shaft 233a of the continuously variable shift section 230 is inputted to the sun gear 242 via the power transmission shaft 223, drive force from the engine and speed-changed drive force output from motor shaft 233a of the continuously variable shift section 230 are combined to generate combined drive force, and the generated combined drive force is outputted from the ring gear 244 to the output rotary member 224 via the planet-side interlocking member 226 and the output-side interlocking member 227.

In other words, the clutch mechanism 270 is configured to include the HMT clutch 255 and the HST clutch 260 in order to perform power transmission setting for switching the setting of the shift power transmission device 220 between HMT power transmission and HST power transmission.

FIG. 32 is an illustrative diagram showing the relationship that the operation states of the HMT clutch 255 and the HST clutch 260, the operation state of the power transmission setting clutch mechanism 270, and the power transmission mode of the shift power transmission device 220 have with each other. In FIG. 32, "OFF" indicates the off state of the HMT clutch 255 and the HST clutch 260, and "ON" indicates the on state of the HMT clutch 255 and the HST clutch 260. As shown in this figure, when the HMT clutch 255 is switched to the off state and the HST clutch 260 is switched to the on state, the power transmission setting clutch mechanism 270 enters the state in which HST power transmission is set, and the shift power transmission device 220 is set to HST power transmission. When the HMT clutch 255 is switched to the on state, and the HST clutch 260 is switched to the off state, the power transmission setting clutch mechanism 270 enters the state in which HMT power transmission is set, and the shift power transmission device 220 is set to HMT power transmission.

FIG. 30 is a front view in vertical section of the shift power transmission device 220 during HMT power transmission. As shown in this figure, in the shift power transmission device 220, when the HMT clutch 255 is switched to the on state, and the HST clutch 260 is switched to the off state, drive force from the input shaft 222 (drive force from the engine 208) is inputted to the carrier 241 of the planetary power transmission section 240 via the power train 250, drive force input from the input shaft 222 is subjected to speed change by the continuously variable shift section 230, the speed-changed drive force output from the motor shaft 233a is inputted to the sun gear 242 of the planetary power transmission section 240, the planetary power transmission section 240 combines the drive force from the engine 208 that is inputted from the input shaft 222 with the speed-changed drive force input from the continuously variable shift section 230 so as to generate combined drive force, and the combined drive force output from the ring gear 244 of the planetary power transmission section 240 is transmitted to the end portion of the output rotary member 224 via the planet-side interlocking member 226 and the output-side interlocking member 227, and then output from the output rotary member 224 to the traveling transmission 213.

FIG. 31 is a front view in vertical section of the shift power transmission device 220 during HST power transmission. As shown in this figure, in the shift power transmission device 220, when the HMT clutch 255 is switched to the off state, and the HST clutch 260 is switched to the on state, drive force input from the input shaft 222 is subjected to speed change by the continuously variable shift section 230, and the speed-changed drive force output from the motor shaft 233a is transmitted to the end portion of the output rotary member 224 via the power transmission shaft 223, the HST clutch 260, the planet-side interlocking member 226, and the output-side interlocking member 227, and then output from the output rotary member 224 to the traveling transmission 213.

When HST power transmission is set, the power transmission setting clutch mechanism 270 is in the state where power transmission from the input shaft 222 to the carrier 241 of the planetary power transmission section 240 is cut off, the sun gear 242 is interlocked to the motor shaft 233a via the power transmission shaft 223 so as to be capable of in-unison rotation, and the ring gear 244 is interlocked to the motor shaft 233a via the planet-side interlocking member 226, the clutch member 261, the sun gear 242, and the power transmission shaft 223 so as to be capable of in-unison rotation. Accordingly, the sun gear 242, the carrier 241, and the ring gear 244 of the planetary power transmission section 240 rotate in unison with the motor shaft 233a, and in the shift power transmission device 220, during HST power transmission, output from the motor shaft 233a of the continuously variable shift section 230 is transmitted to the output rotary member 224 without autorotation of the planet gears 243 occurring, that is to say, without relative rotation of the sun gear 242 and the planet gears 243 occurring or relative rotation of the planet gears 243 and the ring gear 244 occurring.

Figure 33:
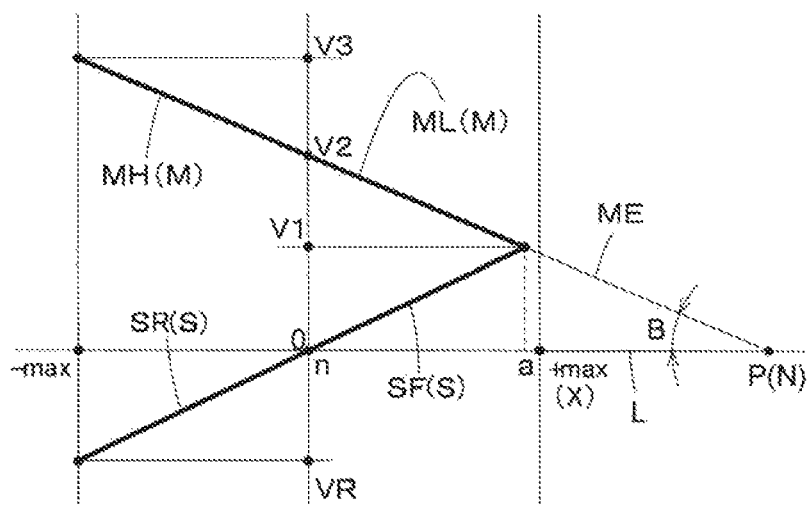
FIG. 33 is a graph showing output characteristics of the shift power transmission device during no-load driving.

FIG. 33 is a graph (speed line diagram) showing output characteristics of the shift power transmission device 220 during no-load driving, in which the output rotary member 224 is driven without being subjected to traveling load as driving load. A speed line indicating the rotational speed of the output rotary member 224 is shown on the vertical axis in this graph. An operation position line L that passes through the position at which the rotational speed plotted on the vertical axis is zero "0", and that indicates the position of the swash plate of the hydraulic pump 232 configuring the continuously variable shift section 230 is shown on the horizontal axis. Here, "n" on the operation position line L indicates the neutral position of the swash plate 232b at which the continuously variable shift section 230 is put into the neutral state. Also, "a" on the operation position line L is the set forward high-speed position, which is set as the maximum speed position on the forward side of the swash plate 232b, which is for switching between the HST power transmission setting and the HMT power transmission setting during no-load driving. Also, "+max" on the operation position line L is the actual forward maximum speed position of the continuously variable shift section 230, which is the swash plate angular position that is actually achieved by the swash plate 232b of the hydraulic pump 232 when the continuously variable shift section 230 is shifted to the operation limit on the forward high speed side. In a simple configuration in which rotation of the motor shaft 233a is inputted to the planet terminal without being accelerated/decelerated, the set forward high-speed position "a" is set to a position in front of the actual forward maximum speed position "+max" in order to maintain speed continuity at the point where there is a switch between HST power transmission and HMT power transmission. Also, "−max" on the operation position line L is the set reverse high-speed position, which is set as the maximum speed position on the reverse side of the swash plate 232b, which is operated in accordance with shift control. The set reverse high-speed position "−max" is set to the same position as the swash plate angular position that is actually achieved by the swash plate 232b of the hydraulic pump 232 when the continuously variable shift section 230 is shifted to the operation limit on the reverse high speed side.

A shift line S shown in FIG. 33 is a no-load HST shift line (referred to hereinafter as the HST shift line S) that indicates change in the rotational speed of the output rotary member 224 when the shift power transmission device 220 is shifted during HST power transmission in the state in which the accelerator of the engine 208 is set such that a set constant speed of drive force is output, and a shift line M is a no-load HMT shift line (referred to hereinafter as the HMT shift line M) that indicates change in the rotational speed of the output rotary member 224 when the shift power transmission device 220 is shifted during HMT power transmission in the state in which the accelerator of the engine 208 is set such that a set constant speed of drive force is output.

As shown in FIG. 33, when the HMT clutch 255 is controlled so as to be switched to the off state and the HST clutch 260 is controlled so as to be switched to the on state, HST power transmission is set, and in the state in which the HST power transmission setting is maintained, if the continuously variable shift section 230 is shifted from the neutral position "n" toward the set forward high-speed position "a", the rotational speed of the output rotary member 224 steplessly increases from zero "0" to the forward side along a forward range SF of the HST shift line S, and when the continuously variable shift section 230 reaches the set forward high-speed position "a", the rotational speed of the output rotary member 224 reaches a first forward intermediate speed "V1".

When the continuously variable shift section 230 reaches the set forward high-speed position "a", the HMT clutch 255 is controlled so as to be switched from the off state to the on state, and the HST clutch 260 is controlled so as to be switched from the on state to the off state, thus setting HMT power transmission instead of HST power transmission, and in the state in which the HMT power transmission setting is maintained, if the continuously variable shift section 230 is shifted from the set forward high-speed position "a" toward the neutral position "n", the rotational speed of the output rotary member 224 steplessly increases from the first forward intermediate speed "V1" along a low speed range ML of the HMT shift line M, and when the continuously variable shift section 230 reaches the neutral position "n", the rotational speed of the output rotary member 224 reaches a second forward intermediate speed "V2". In the state in which the HMT power transmission setting is maintained, if the continuously variable shift section 230 is shifted from the neutral position "n" toward the set reverse high-speed position "−max", the rotational speed of the output rotary member 224 steplessly increases from the second forward intermediate speed "V2" along a high speed range ML of the HMT shift line M, and when the continuously variable shift section 230 reaches the set reverse high-speed position "−max", the rotational speed of the output rotary member 224 reaches a forward maximum speed "V3"

In the state in which the HST power transmission setting is maintained, if the continuously variable shift section 230 is shifted from the neutral position "n" toward the set reverse high-speed position "−max", the rotational speed of the output rotary member 224 steplessly increases from zero "0" to the reverse side along a reverse range SR of the HST shift line S, and when the continuously variable shift section 230 reaches the set reverse high-speed position "−max", the rotational speed of the output rotary member 224 reaches a reverse maximum speed "VR".

The angle of inclination B of the HMT shift line M relative to the operation position line L is set as follows in order for the drive force that is to be output in the shift state corresponding to the high speed range MH of the HMT shift line M to be drive force with a rotational speed that is appropriate for location change traveling, in order for the drive force that is to be output in the shift state corresponding to the low speed range ML of the HMT shift line M to be drive force with a rotational speed that is appropriate for task traveling, and in order to obtain speed-changed drive force with minimal loss that accompanies the speed change of drive force input from the engine 208 when employing a continuously variable shift section 230 whose hydraulic pump 232 has the smallest possible discharge capacity.

A shift line extension line ME shown in FIG. 33 is an extension of the HMT shift line M toward the operation position line L, and a position "P" on the operation position line L is the intersection position where the shift line extension line ME and the operation position line L intersect. Assuming that the swash plate 232b of the hydraulic pump 232 of the continuously variable shift section 230 can be tilted beyond the actual forward maximum speed position "+max", which is the farthest tilt position on the forward side that can actually be reached, to the intersection position "P", letting "N" be the value of the virtual angle of inclination achieved by the swash plate 232b when tilted to the intersection position "P", and letting "X" be the value of the actual highest swash plate angle that is actually achieved in the hydraulic pump 232 of the continuously variable shift section 230 when it is shifted to the actual forward maximum speed position "+max", the angle of inclination B of the HMT shift line M relative to the operation position line L is set to the angle of inclination that corresponds to the case where N is two times the value of X (N/X=2.0). The setting corresponding to N/X=2.0 depends on the setting of the discharge capacity of the hydraulic pump 232 and the setting of the gear power transmission ratio in the planetary power transmission section 240 and mechanical power transmission portions other than the planetary power transmission section 240.

The angle of inclination B of the HMT shift line M relative to the operation position line L is set to the angle of inclination at which the rotational speed of the output rotary member 224 at the forward maximum speed "V3" is greater than or equal to two times the rotational speed of the output rotary member 224 at the first forward intermediate speed "V1".

The setting corresponding to N/X=2.0 is based on the evidence described below.

When the output rotation of the continuously variable shift section 230 is zero and the output rotational speed is V2, all of the drive force is outputted without passing through the continuously variable shift section 230. At the virtual swash plate angle position (P), at which the output rotation is zero, the drive force at the output rotational speed V2 passes through the continuously variable shift section 230 and is returned to the drive side, and output becomes zero. In other words, mechanical transmission power that does not pass through the continuously variable shift section 230 and power from the continuously variable shift section 230 (referred to hereinafter as HST power) cancel each other out. In actuality, the virtual swash plate angle position (P) is a virtual position, and therefore giving consideration to the fact that the actual maximum angle of inclination X=1 when the continuously variable shift section 230 is at the actual forward maximum speed position "+max", since the rotational speed is 1/N, the HST power is 1/N times the mechanical transmission power that does not pass through the continuously variable shift section 230.

Letting KM be the mechanical efficiency of mechanical transmission power, and letting KH be the power that passes through the continuously variable shift section 230, the output power is a constant mechanical power ±HST power, and the overall efficiency achieved by the shift power transmission device 220 is calculated as shown below when the continuously variable shift section 230 is at the neutral position "n".

$$(1+0\times1/N)/(1/KM+0\times1/N/KH)=KM$$

When the continuously variable shift section 230 is at the set reverse high-speed position "−max":

$$(1+1/N)/(1/KM+1/N/KH)=KM?KH(N+1)/(KM+KH?N)$$

When the continuously variable shift section 230 is at the actual forward maximum speed position "+max":

$$(1?1/N)/(1/KM?1/N?KH)=KM(N?1)/(N?KM?KH)$$

According to these calculations, the higher N is, the greater the efficiency can be improved.

Figure 34:
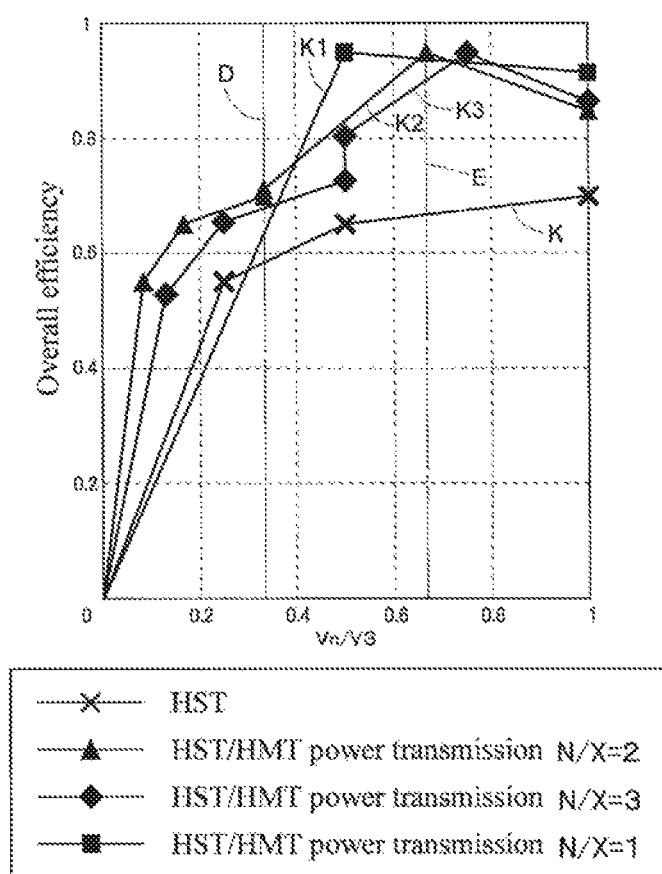
FIG. 34 is an illustrative diagram showing the relationship between the value of N/X and overall efficiency.

FIG. 34 is an illustrative diagram showing the relationship between overall efficiency and shift positions when varying the value N/X. The overall efficiency shown here was approximated as described above, assuming that KM=0.95 and KH=0.7, and using N/X=1.0, N/X=2.0, and N/X=3.0.

The horizontal axis shown in FIG. 34 indicates the shift position, and the shift position on the horizontal axis is the ratio of the output rotational speed when the continuously variable shift section 230 is shifted to an arbitrary shift position during forward-side HST power transmission and HMT power transmission to the output rotational speed when the continuously variable shift section 230 is shifted to the set reverse high-speed position "−max". In other words, letting Vn be the rotational speed of drive force that is outputted when the continuously variable shift section 230 is shifted to an arbitrary shift position during forward-side HST power transmission and HMT power transmission, Vn/V3 is the shift position on the horizontal axis. A vertical line D shown in FIG. 34 is a line indicating the maximum speed during HST power transmission when N/X=2.0, which is Vn/V3=0.33 (between 0.2 and 0.4). A vertical line E shown in FIG. 34 is a line indicating the speed when the swash plate of the hydraulic pump 232 is at the neutral position during HMT power transmission when N/X=2.0, which is Vn/V3=0.67 (between 0.6 and 0.8). Accordingly, the set forward high-speed position "a" of the continuously variable shift section 230 is a position between 0.2 and 0.4 on the horizontal axis, and the neutral position "n" of the shift 230 is a position between 0.6 and 0.8 on the horizontal axis.

An efficiency line K shown in FIG. 34 indicates the overall efficiency of the continuously variable shift section 230. An efficiency line K1 shown in FIG. 34 indicates the overall efficiency approximated using N/X=1.0, an efficiency line K2 indicates the overall efficiency approximated using N/X=2.0, and an efficiency line K3 indicates the overall efficiency approximated using N/X=3.0.

Between the vertical line D and the vertical line E, the overall efficiency is favorable when N/X=1.0, but since the output is also high on the high speed side, the amount of power loss increases, and even a small difference in efficiency cannot be ignored. In consideration of power loss obtained by multiplying output power by the rate of loss, approximately N/X=1.8 is the minimum value. Although the most appropriate value in terms of power loss has a wide range when the N/X value is low around N/X=1.8, N/X=2.0 is the most appropriate value for reducing the size of the continuously variable shift section 230. If N/X is approximately 1.5 to 2.5 in order to achieve balance, it is possible to both realize higher efficiency in the high speed range and achieve a 38% reduction in the size of the continuously variable shift section 230. The output rotation of the planetary power transmission section 240 during HMT power transmission at this time can also be designed so as to be in a realistic range that does not exceed 10000 rpm. When the shift power transmission device 220 is an independent unit, lowering the extent of rotational speed from the drive source enables reducing the influence of torque loss caused by output portion sealing and the like, and therefore deceleration of 2.5 to 3 is performed by the planetary power transmission section 240, which also makes the configuration realistically more readily achievable. When employing the simple power transmission setting clutch mechanism 270 as described above, the setting of N/X=1.5 to 2.5 is advantageous in terms of high efficiency and reducing the size of the continuously variable shift section 230.

Figure 35:
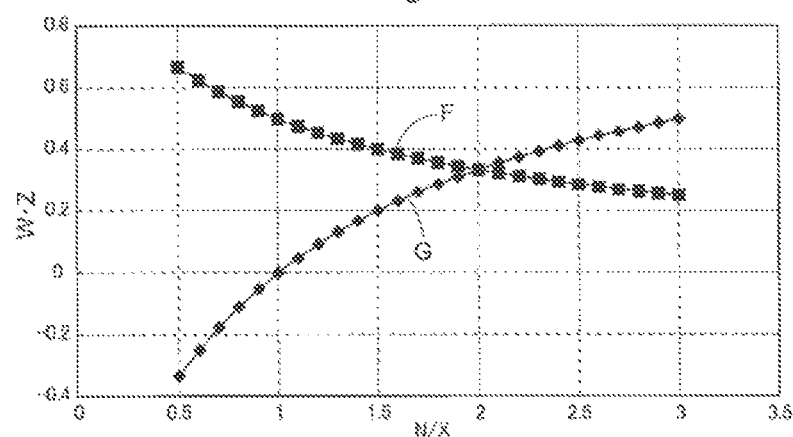
FIG. 35 is an illustrative diagram showing the relationship between the value of N/X and size reduction of a continuously variable shift section.

FIG. 35 is an illustrative diagram showing the relationship between the value of N/X and size reduction of the continuously variable shift section 230. The horizontal axis in FIG. 35 indicates the value of N/X. A line F shown in FIG. 35 indicates the ratio "W" of the HST power (1/N) to the total power (1+1/N). The higher this ratio "W" is, the larger the discharge capacity of the hydraulic pump 232 needs to be, and the larger the continuously variable shift section 230 needs to be.

The size of the continuously variable shift section 230 can be made smaller when drive force over a predetermined shift range is to be obtained by output from the planetary power transmission section 240 than when it is to be obtained by output from the continuously variable shift section 230, and a line G shown in FIG. 35 indicates the relationship between the value of N/X and the extent to which the size of the continuously variable shift section 230 can be reduced.

Specifically, assuming that the actual maximum tilt position "+max" is the point at which there is a switch between HST power transmission and HMT power transmission, the ratio of the maximum speed during HMT power transmission (forward maximum speed "V3") to the maximum speed during HST power transmission is similarly calculated as (N+1)/(N?1)=Z. Z is 5.0 when N/X=1.5, is 3.0 when N/X=2.0, is 2.3 when N/X=2.5, and is 2.0 when N/X=3.0. The values indicated on the vertical axis in FIG. 35 are the value of 1/Z.

The higher the value of Z is, the greater the shift range that can be obtained by HMT power transmission is, the smaller the shift range that needs to be obtained by HST power transmission is, and the greater the size of the continuously variable shift section 230 can be reduced, but if the discharge capacity of the hydraulic pump 232 is too small, drive problems will occur, such as the relief circuit opening and operating. Accordingly, by employing N/X=2.0, which achieves an intersection between the line F and the line G, it is possible to obtain a shift power transmission device 220 capable of shift power transmission that avoids the occurrence of drive problems in the continuously variable shift section 230, while also achieving a forward maximum speed "V3" and a second forward intermediate speed "V2" during HMT power transmission that are speeds necessary for location change and task, and also achieving a reduction in the size of the continuously variable shift section 230.

Figure 37:
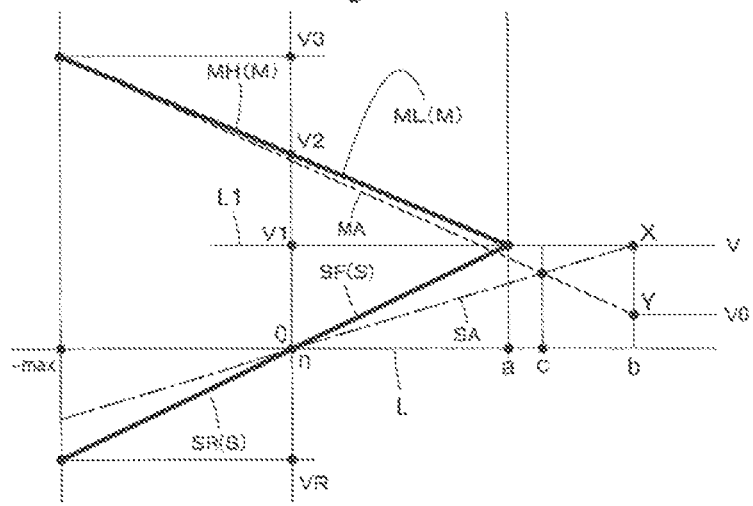
FIG. 37 is a graph showing output characteristics of a shift power transmission device.
Figure 39:
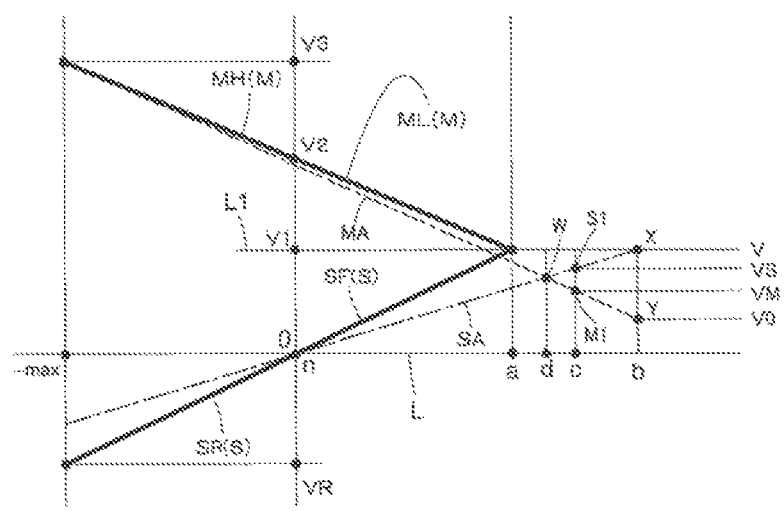
FIG. 39 is an illustrative diagram showing switching of the setting from HST power transmission to HMT power transmission.

FIG. 37 is a graph (speed line diagram) showing output characteristics of the shift power transmission device 220 during no-load driving, in which the output rotary member 224 is driven without being subjected to traveling load as driving load, and also output characteristics of the shift power transmission device 220 during load driving, in which the output rotary member 224 is driven in the state of being subjected to traveling load as driving load. FIG. 39 is an illustrative diagram showing switching of the setting from HST power transmission to HMT power transmission. The vertical axis and the horizontal axis in FIGS. 37 and 39 are the same as the vertical axis and the horizontal axis in the graph shown in FIG. 31. Also, "n", "a", and "−max" shown in FIGS. 37 and 39 are the same as "n", "a", and "−max" shown in the graph in FIG. 31.

A shift line SA shown in FIG. 37 is a load HST shift line (referred to hereinafter as the HST shift line SA) that indicates change in the rotational speed of the output rotary member 224 in the state in which the accelerator of the engine 208 is set such that a set constant speed of drive force is output, a traveling load is applied to the output rotary member as the driving load with a set value, and the shift power transmission device 220 is driven while HST power transmission is set. A shift line MA shown in FIG. 37 is a load HMT shift line (referred to hereinafter as the HMT shift line MA) that indicates change in the rotational speed of the output rotary member 224 in the state in which the accelerator of the engine 208 is set such that a set constant speed of drive force is output, a traveling load is applied to the output rotary member as the driving load with a set value, and the shift power transmission device 220 is driven while HMT power transmission is set. Since the HST shift line SA corresponds to the state in which the swash plate 232b is subjected to driving load, the angle of inclination of the HST shift line SA relative to the operation position line L is smaller than the angle of inclination of the HST shift line S relative to the operation position line L. Since the HMT shift line MA corresponds to the state in which the swash plate 232b is subjected to driving load, the low speed side of the HMT shift line MA is shifted to the low speed side of the HMT shift line M.

When provided for the motor shaft 233 for when switching the setting from HST power transmission to HMT power transmission, a horizontal line L1 shown in FIG. 37 indicates the rotational speed of the motor shaft 233a at which in-unison rotation of the sun gear 242, the carrier 241, and the ring gear 244 is achieved (in-unison rotation achievement speed "V") in the planetary power transmission section 240 at the point in time when switching is completed by the clutch mechanism 270 for switching the setting from HST power transmission to HMT power transmission, and drive force from the engine 208 is transmitted to the planetary power transmission section 240. This rotational speed of the motor shaft 233a is the same as the rotational speed "V1" of the output rotary member 224. During HST power transmission and no-load driving, the continuously variable shift section 230 achieves the in-unison rotation achievement speed "V" when the swash plate 232b of the hydraulic pump 232 is set to the set forward high-speed position "a".

Figure 36:
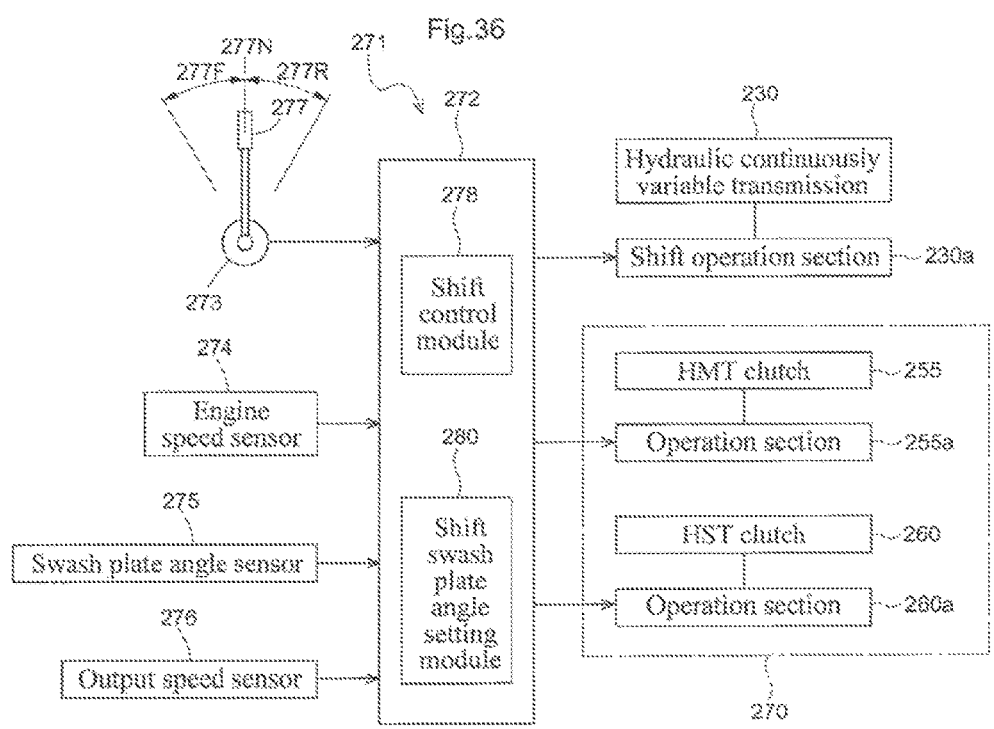
FIG. 36 is a block diagram showing a shift operation apparatus.

FIG. 36 is a block diagram showing a shift operation apparatus 271 that performs shift operations on the shift power transmission device 220. As shown in this figure, the shift operation apparatus 271 includes a control apparatus 272 that is linked to a shift operation section 230a of the continuously variable shift section 230 and operation sections 255a and 260a of the HMT clutch 255 and the HST clutch 260, as well as a shift operation device 277, an engine speed sensor 274, a swash plate angle sensor 275, and an output speed sensor 276 that are linked to the control apparatus 272.

The shift operation section 230a is configured by an electrical actuator or a hydraulic actuator that operates so as to change the angle of the swash plate 232b of the hydraulic pump 232 in the continuously variable shift section 230. The operation section 255a of the HMT clutch 255 is configured by an operation valve that is connected to the hydraulic piston 258 via an operation oil path formed inside the input shaft 222, and by operating the hydraulic piston 258 so as to cause the clutch member 256 to slide, the operation section 255a switches the HMT clutch 255. The operation section 260a of the HST clutch 260 is configured by an operation valve that is connected to the oil chamber of the clutch member 261 via an operation oil path formed inside the power transmission shaft 223, and by supplying/discharging operation oil to/from the oil chamber of the clutch member 261, the operation section 260a causes the clutch member 261 to slide so as to switch the HST clutch 260.

The shift operation device 277 is configured by a shift lever provided in the driving section 202 so as to be capable of being swung in the front/rear direction of the traveling body, and is swung to a neutral position "277N", in a forward operation range "277F" that extends from the neutral position "277N" toward the front of the device body, and in a reverse operation range "277R" that extends from the neutral position "277N" toward the rear of the device body. The shift operation device 277 is linked to the control apparatus 272 via a shift detection sensor 273 that detects the operation position of the shift operation device 277. The shift detection sensor 273 is configured by a rotation potential meter that is interlocked to the rotation operation shaft of the shift operation device 277, and when the shift operation device 277 is swung, the shift detection sensor 273 operates, and a shift instruction is outputted from the shift detection sensor 273 to the control apparatus 272 in the form of an electrical signal.

The engine speed sensor 274 detects the rotational speed of the engine 208, and outputs this detection result to the control apparatus 272. The swash plate angle sensor 275 detects the angle of the swash plate of the hydraulic pump 232 of the continuously variable shift section 230, and outputs this detection result to the control apparatus 272. The output speed sensor 276 detects the rotational speed of the output rotary member 224 as the output rotational speed of the shift power transmission device 220, and outputs this detection result to the control apparatus 272.

The control apparatus 272 is configured using a microcomputer, and includes a shift control module 278 and a shift swash plate angle setting module 280.

The shift swash plate angle setting module 280 is configured by a storage section provided in the control apparatus 272. The shift swash plate angle setting module 280 receives a swash plate angle for performing control for switching the setting from HST power transmission to HMT power transmission, as a pre-set set shift swash plate angle "c".

Based on detection information from the engine speed sensor 274, the shift control module 278 detects the speed of the engine 208 whose accelerator has been set, performs shift control on the hydraulic pump 232 based on this detection result, a shift instruction from the shift operation device 277, and detection information from the swash plate angle sensor 275 and the output speed sensor 276, and also controls the switching of the HST clutch 260 and the HMT clutch 255 of the clutch mechanism 270.

Figure 38:
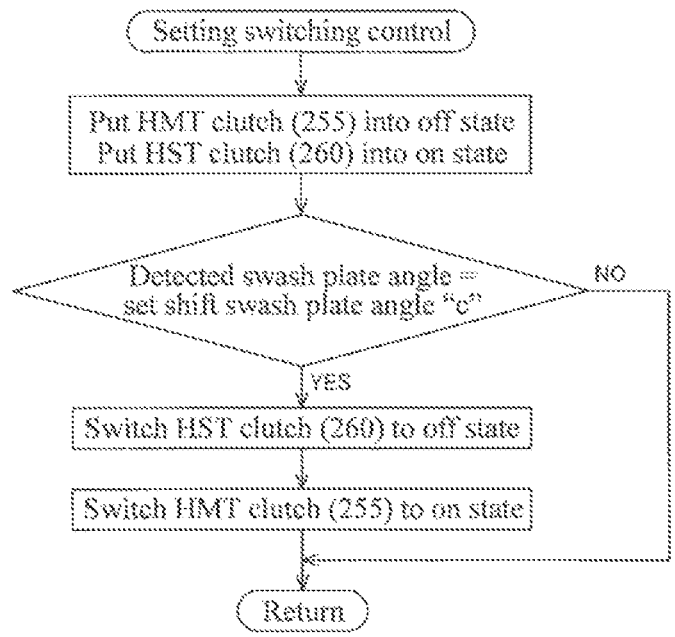
FIG. 38 is a flowchart of setting switching control.

FIG. 38 is a flowchart showing setting switching control for switching the setting from HST power transmission to HMT power transmission. As shown in this figure, the shift control module 278 compares the detected swash plate angle from the swash plate angle sensor 275 and the set shift swash plate angle "c" from the shift swash plate angle setting module 280, and determines whether or not the detected swash plate angle is equal to the set shift swash plate angle "c", thus determining whether or not the swash plate angle sensor 275 detected a swash plate angle that is equal to the set shift swash plate angle "c". In the case of determining that the swash plate angle sensor 275 detected a swash plate angle that is equal to the set shift swash plate angle "c", the shift control module 278 performs control for switching the HST clutch 260 of the clutch mechanism 270 to the off state, and performs control for switching the HMT clutch 255 to the on state, thus switching the setting from HST power transmission to HMT power transmission.

Accordingly, in the state in which the accelerator of the engine 208 is set such that drive force with a constant rotational speed is output, when the shift operation device 277 is operated in the reverse operation range "277R", to the neutral position "277N", and in the forward operation range "277F", the shift control module 278 performs control for switching the setting of the shift power transmission device 220 between HST power transmission and HMT power transmission and performs shift control on the hydraulic pump 232, thus causing the traveling body to travel in forward and reverse, as well as traveling while changing speed in forward and reverse, and stopping.

Specifically, when the shift operation device 277 is operated to the neutral position "277N" or the low speed range portion of the reverse operation range "277R" or the forward operation range "277F", the shift control module performs control for switching the HMT clutch 255 and the HST clutch 260 based on a shift instruction from the shift operation device 277 and setting information from the shift swash plate angle setting module 280, and thus the shift power transmission device 220 is set to HST power transmission. When the shift operation device 277 is operated to the high speed range portion of the forward operation range "277F", the shift control module performs control for switching the HMT clutch 255 and the HST clutch 260 based on a shift instruction from the shift operation device 277 and setting information from the shift swash plate angle setting module 280, and thus the shift power transmission device 220 is set to HMT power transmission.

If the shift operation device 277 is operated to the neutral position "277N", the shift control module 278 moves the swash plate 232b of the hydraulic pump 232 to the neutral position "n" based on a shift instruction from the shift operation device 277, the continuously variable shift section 230 enters the neutral state, and output from the shift power transmission device 220 is stopped.

If the shift operation device 277 is moved in the low speed range portion of the forward operation range "277F", the shift control module 278 tilts the swash plate 232b of the hydraulic pump 232 on the forward side of the neutral position "n" based on a shift instruction from the shift operation device 277 and detection information from the output speed sensor 276, and the speed of the drive force outputted by the shift power transmission device 220 changes along the forward range of the load HST shift line SA.

If the shift operation device 277 is moved in the high speed range of the forward operation range "277F", the shift control module 278 tilts the swash plate 232b of the hydraulic pump 232 over the forward side and the reverse side based on a shift instruction from the shift operation device 277 and detection information from the output speed sensor 276, and the speed of the drive force outputted by the shift power transmission device 220 changes along the load HMT shift line MA.

If the shift operation device 277 is moved in the reverse operation range "277R", the shift control module 278 tilts the swash plate 232b of the hydraulic pump 232 on the reverse side of the neutral position "n" based on a shift instruction from the shift operation device 277 and detection information from the output speed sensor 276, and the speed of the drive force outputted by the shift power transmission device 220 changes along the reverse range of the load HST shift line SA.

Figure 44:
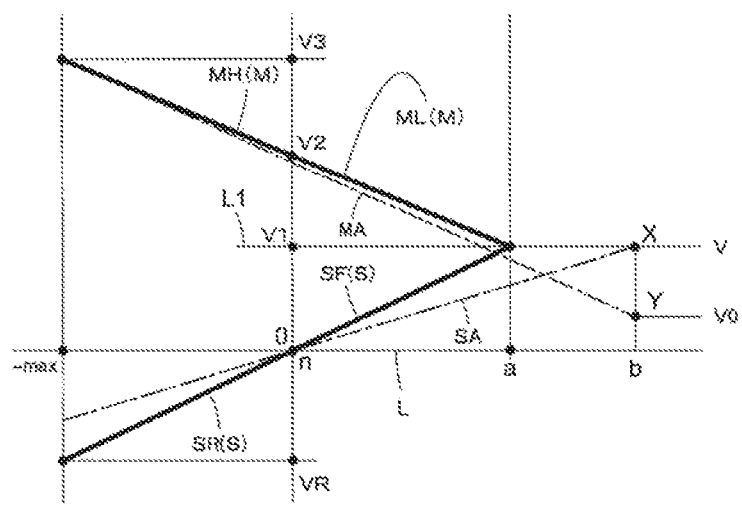
FIG. 44 is an illustrative diagram showing switching of the setting from HST power transmission to HMT power transmission in a comparative example.

FIG. 44 is an illustrative diagram showing switching from HST power transmission to HMT power transmission in a comparative example. A horizontal line L1 shown in FIG. 44 is the same as the horizontal line L1 shown in FIG. 37.

As shown in FIGS. 37 and 44, the time when the rotational speed of the motor shaft 233a increasing along the HST shift line S reaches the in-unison rotation achievement speed "V" is the point in time indicated by the intersection between the HST shift line S and the HMT shift line M, and the swash plate angle of the hydraulic pump 232 at this point in time is the no-load swash plate angle "a" achieved at the forward set high speed position "a". The time when the rotational speed of the motor shaft 233a increasing along the HST shift line SA reaches the in-unison rotation achievement speed "V" is the point in time indicated by the intersection "X" between the HST shift line SA and the horizontal line L1, the swash plate angle of the hydraulic pump 232 at this point in time is the load swash plate angle "b", and this load swash plate angle "b" is a swash plate angle reached when the swash plate 232b is tilted on the high speed side of the no-load swash plate angle "a".

When the setting is switched from HST power transmission to HMT power transmission at the point in time when the rotational speed of the motor shaft 233a increasing along the HST shift line SA reaches the in-unison rotation achievement speed "V", the output speed of the output rotary member 224 changes from the in-unison rotation achievement speed "V" to the rotational speed "V0" that is lower than the in-unison rotation achievement speed "V" and corresponds to the intersection "Y" between the HMT shift line MA and a vertical line that passes through the intersection "X" and the position corresponding to the load swash plate angle "b". In other words, when the setting is switched from HST power transmission to HMT power transmission, after the switch, the traveling speed decreases from the speed corresponding to the in-unison rotation achievement speed "V" to the speed that corresponds to the output speed "V0".

FIG. 39 is an illustrative diagram showing setting switching from HST power transmission to HMT power transmission performed by the shift control module 278 according to this embodiment of the present invention. As shown in this figure, the set shift swash plate angle "c" is set as a swash plate angle between the no-load swash plate angle "a" and the load swash plate angle "b". More specifically, the set shift swash plate angle "c" is set as a swash plate angle that is between the load swash plate angle "b" and the intersection swash plate angle "d", which corresponds to the intersection "W" between the HST shift line SA and the HMT shift line MA. This swash plate angle is closer to the intersection swash plate angle "d" than the load swash plate angle "b".

Accordingly, when the rotational speed of the motor shaft 233b increasing along the HST shift line SA reaches the rotational speed "VS" that corresponds to the intersection "S1" between the HST shift line SA and the vertical line that passes through the set shift swash plate angle "c", the shift control module 278 performs control for switching the setting from HST power transmission to HMT power transmission. Accordingly, the rotational speed of the output rotary member 224, which is the output speed of the shift power transmission device 220 immediately after the setting is switched from HST power transmission to HMT power transmission, is the rotational speed "VM" that corresponds to the intersection "M1" between the HMT shift line MA and the vertical line that passes through the intersection "S1". The control performed by the shift control module 278 for switching the setting from HST power transmission to HMT power transmission is performed when the shift operation device 277 is located in the central portion of the forward operation range "277F".

Specifically, the rotational speed "VS" of the motor shaft 233a that is the output speed of the continuously variable shift section 230 when the setting is to be switched from HST power transmission to HMT power transmission is a rotational speed that is lower than the in-unison rotation achievement speed "V". The rotational speed of the output rotary member 224 that is the output speed of the shift power transmission device 220 immediately after the setting is switched from HST power transmission to HMT power transmission is higher than the rotational speed "V0" of the output rotary member 224 immediately after a switch when the setting is switched from HST power transmission to HMT power transmission due to the output speed of the continuously variable shift section 230 reaching the in-unison rotation achievement speed "V". The amount of change in the traveling speed that accompanies a switch from HST power transmission to HMT power transmission corresponds to the difference in speed between the output speed "VS" immediately before the switch and the output speed "VM" immediately after the switch, and the switch from an HST power transmission speed range to an HMT power transmission speed range is performed while causing this difference in speed to be smaller than the difference in speed between the output speed "V" immediately before the switch and the output speed "V0" immediately after the switch when the switching of the setting from HST power transmission to HMT power transmission is performed based on the output speed.

First Alternative Embodiment

Figure 40:
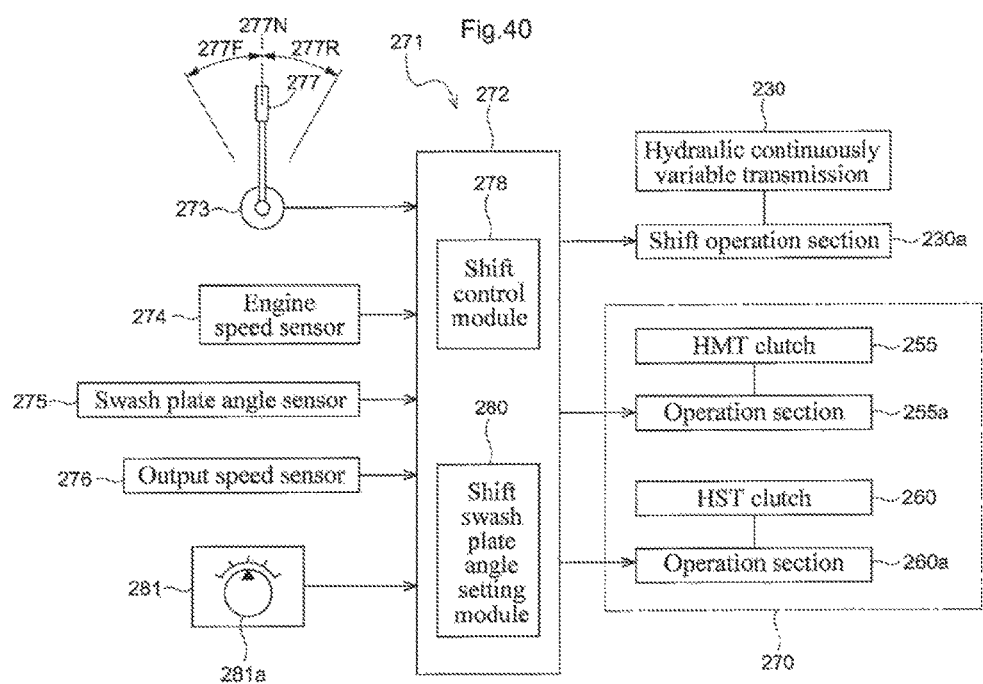
FIG. 40 is a block diagram showing a shift operation apparatus according to a first alternative embodiment.

FIG. 40 is a block diagram showing the shift operation apparatus 271 according to a first alternative embodiment. As shown in this figure, in the shift operation apparatus 271 according to the first alternative embodiment, the shift swash plate angle setting module 280 is provided with an adjustment section 281 that is linked to the control apparatus 272.

The adjustment section 281 is configured by a rotation potential meter that includes a rotation operation device 281a. When an adjustment operation is performed using the rotation operation device 281a, the setting of the swash plate angle of the hydraulic pump 232 for when switching the setting from HST power transmission to HMT power transmission is changed by the adjustment section 281 to the high speed side or the low speed side, and the changed set shift swash plate angle is outputted to the control apparatus 272, and thus the shift swash plate angle setting module 280 is adjusted such that the new set shift swash plate angle from the adjustment section 281 is inputted to the shift swash plate angle setting module 280 in place of the set shift swash plate angle that was previously input.

Figure 41:
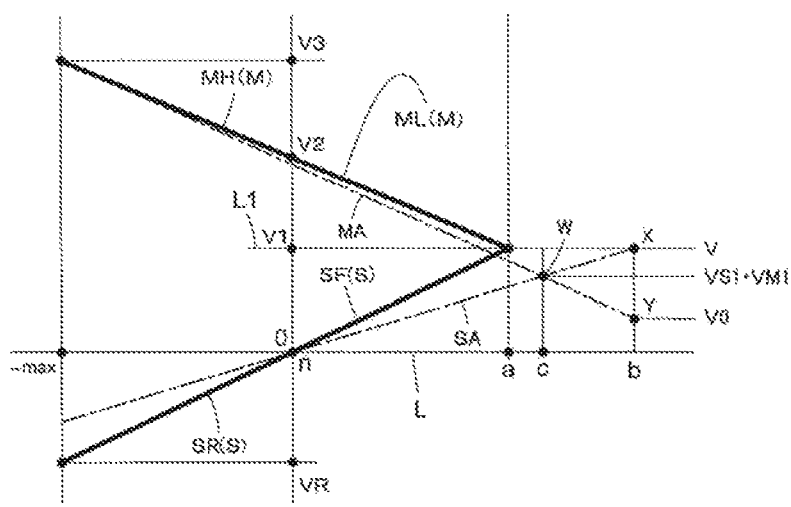
FIG. 41 is an illustrative diagram showing a switch from HST power transmission to HMT power transmission in the shift operation apparatus according to the first alternative embodiment.

Specifically, when the shift swash plate angle setting module 280 is adjusted by the adjustment section 281, as shown in FIG. 41 for example, the swash plate angle "c" of the hydraulic pump 232 that corresponds to the intersection "W" between the HST shift line SA and the HMT shift line MA is set as the set shift swash plate angle by the shift swash plate angle setting module 280, and it is possible to perform control for switching the setting from HST power transmission to HMT power transmission in the state in which the rotational speed "VS1" of the motor shaft 233*a* for when switching the setting from HST power transmission to HMT power transmission and the rotational speed "VM1" of the output rotary member 224 immediately after switching the setting from HST power transmission to HMT power transmission are the same rotational speed.

Second Alternative Embodiment

Figure 42:
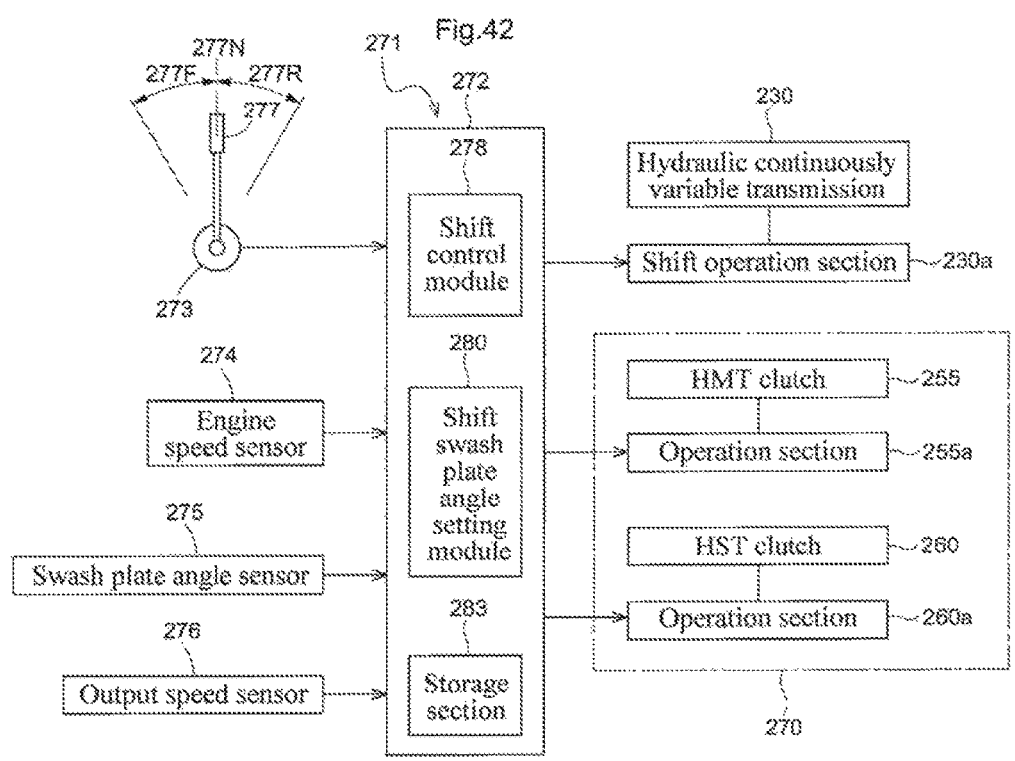
FIG. 42 is a block diagram showing a shift operation apparatus according to a second alternative embodiment.

FIG. 42 is a block diagram showing the shift operation apparatus 271 according to a second alternative embodiment. As shown in this figure, the shift operation apparatus 271 according to the second alternative embodiment includes a storage section 283 that receives map control data.

The storage section 283 receives in advance and stores map control data that includes a detected swash plate angle that is detected by the swash plate angle sensor 275 when the shift power transmission device 220 is to be driven during HST power transmission and load driving, an appropriate corresponding HST shift line that corresponds to the detected swash plate angle, and an appropriate corresponding HMT shift line that corresponds to the corresponding HST shift line.

Figure 43:
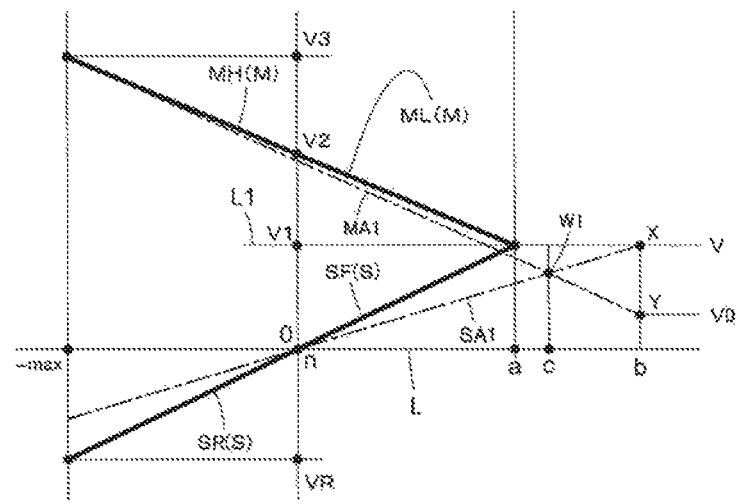
FIG. 43 is an illustrative diagram showing control for switching the setting from HST power transmission to HMT power transmission in the shift operation apparatus according to the second alternative embodiment.

FIG. 43 is an illustrative diagram showing control for switching the setting from HST power transmission to HMT power transmission in the shift operation apparatus 271 according to the second alternative embodiment. As shown in this figure, in the shift swash plate angle setting module 280, when the shift power transmission device 220 is driven during HST power transmission and load driving, up to the time when the setting is switched from HST power transmission to HMT power transmission, detection information is continuously received from the swash plate angle sensor 275, and each time detection information is received from the swash plate angle sensor 275, a calculated HST shift line SA1 for HST power transmission and load driving that corresponds to the detected swash plate angle from the swash plate angle sensor 275 is calculated and set based on the detection information from the swash plate angle sensor 275 and the map control data input to the storage section 283, an appropriate calculated HMT shift line MA1 that corresponds to the calculated HST shift line SA1 is calculated and set, the swash plate angle achieved by the hydraulic pump 232 in the shift state for outputting speed-changed drive force at a speed that corresponds to the intersection W1 between the calculated HST shift line SA1 and the calculated HMT shift line MA1 is determined, and the determined swash plate angle is set as the set shift swash plate angle "c".

Accordingly, in the shift control module 278, even if the drive load changes during traveling, a set shift swash plate angle "c" that is optimum for switching the setting from HST power transmission to HMT power transmission and for preventing a change in traveling speed that accompanies the switching of the setting from HST power transmission to HMT power transmission is given as the set shift swash plate angle, the switch from an HST power transmission speed range to an HMT power transmission speed range is performed in the state where the switch is not accompanied by a change in speed regardless of the change in drive load, and thus the shift from an HST power transmission speed range to an HMT power transmission speed range is performed without causing shift shock or unpleasantness.

Other Alternative Embodiments (1) Although the above-described embodiment gives the example where the clutch mechanism 270 is configured by a meshing type HMT clutch 255 and HST clutch 260, an implementation is possible in which the clutch mechanism 270 is configured by a friction HMT clutch 255 and HST clutch 260.

(2) Although the above-described embodiment gives the example where the continuously variable shift section 230 is configured to include a fixed-capacity hydraulic motor 233, an implementation is possible in which the continuously variable shift section 230 is configured to include a variable displacement hydraulic motor.

Fourth Embodiment

Next, a fourth embodiment will be described with reference to FIGS. 45 to 54.

Figure 45:
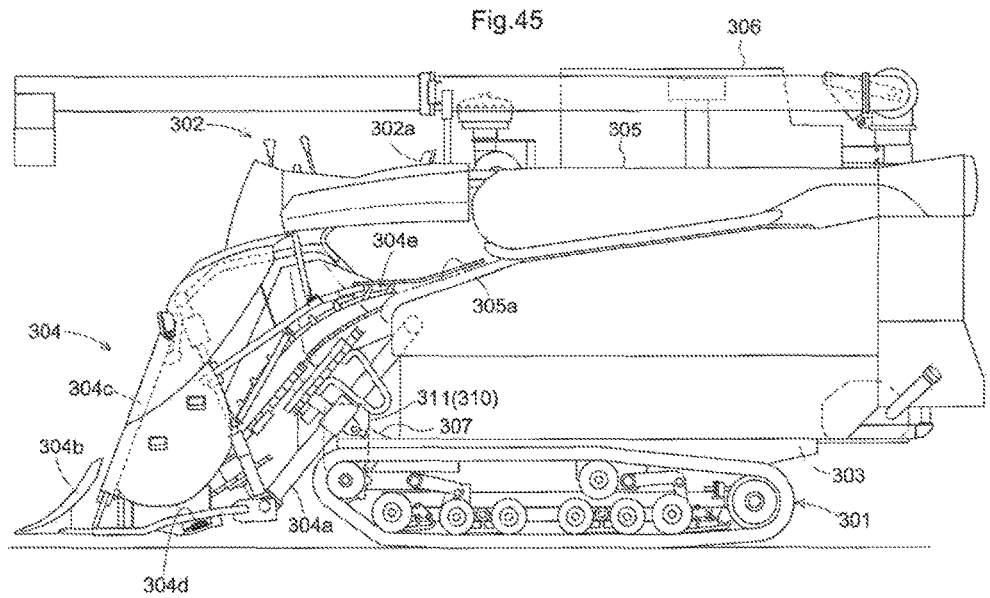
FIG. 45 is a figure pertaining to a fourth embodiment (the same follows through to FIG. 54), showing a side view of an entire combine.

As shown in FIG. 45, the combine, which performs the task of harvesting rice, barley, and the like, is configured to be self-propelled with a pair of right and left crawling travel apparatuses 301, and is configured to include a traveling body equipped with a riding driving section 302, a reaping section 304 coupled to the front portion of a body frame 303 of the traveling body, a threshing apparatus 305 provided so as to be arranged rearward of the reaping section 304 on the rear side of the body frame 303, and a grain tank 306 provided so as to be arranged to the side of the threshing apparatus 305 on the rear side of the body frame 303.

Specifically, the reaping section 304 includes a reaping section frame 304*a* that extends forward from the front portion of the body frame 303 in a vertically swingable manner, and when the reaping section frame 304*a* is swung by an elevating cylinder 307, the reaping section 304 moves up/down between a lowered operating position at which a divider 304*b*, which is provided at the front edge portion of the reaping section 304, is lowered close to the ground, and a raised non-operating position at which the divider 304*b* is raised high above the ground. When the traveling body is caused to travel with the reaping section 304 lowered to the lowered operating position, the reaping section 304 operates such that reaping-target planted stalks are guided to a raising path by the divider 304*b*, the planted stalks that were guided to the raising path are reaped by a clipper-type reaping apparatus 304*d* while being raised up by a raising apparatus 304*c*, and the reaped stalks are supplied to the threshing apparatus 305 by a supplying apparatus 304*e*. In the threshing apparatus 305, the reaped stalks are conveyed from the supplying apparatus 304*e* toward the rear of the apparatus body with their base sides clamped by a threshing feed chain 305*a*, the ear tip-sides of the reaped stalks are supplied to a handling compartment (not shown) where they are subjected to reaping processing, and the reaped grain is fed to the grain tank 306.

The combine is configured such that an engine 308 is provided underneath a driver seat 302a provided in the driving section 302, and drive force outputted by the engine 308 is transmitted to the pair of right and left travel apparatuses 301 by a travel power transmission apparatus 310 that includes a transmission case 311 provided at the front edge portion of the body frame 303.

Figure 46:
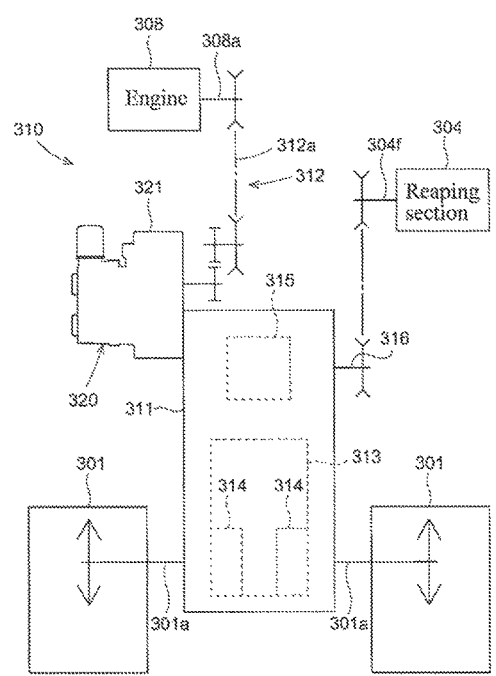
FIG. 46 is a schematic front view of a travel power transmission apparatus.

FIG. 46 is a front view of the schematic structure of the travel power transmission apparatus 310. As shown in this figure, in the travel power transmission apparatus 310, engine drive force from an output shaft 308a of the engine 308 is inputted to a shift power transmission device 320 provided on the side of the upper end portion of the transmission case 311 via a power train 312 provided with a power transmission belt 312a. Output of the shift power transmission device 320 is inputted to a traveling transmission 313 provided inside the transmission case 311, then transmitted from a left-side steering clutch mechanism 314, which is one of a pair of right and left steering clutch mechanisms 314 included in the traveling transmission 313, to a drive shaft 301a of the left-side travel apparatus 301, and also transmitted from the right-side steering clutch mechanism 314 to a drive shaft 301a of the right-side travel apparatus 301.

The travel power transmission apparatus 310 includes a reaping transmission 315 that is provided inside the transmission case 311, and output of the shift power transmission device 320 is inputted to the reaping transmission 315 and transmitted from a reaping output shaft 316 to a drive shaft 304f of the reaping section 304.

Next, the shift power transmission device 320 will be described.

Figure 47:
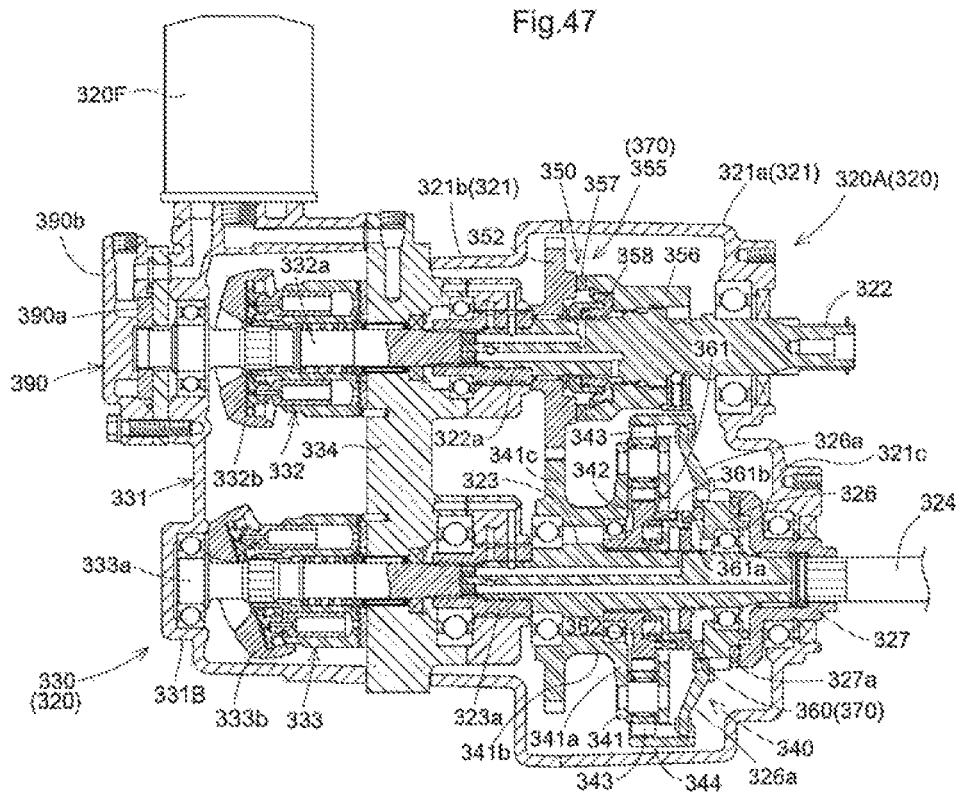
FIG. 47 is a front view in vertical section of a shift power transmission device during HMT power transmission.
Figure 48:
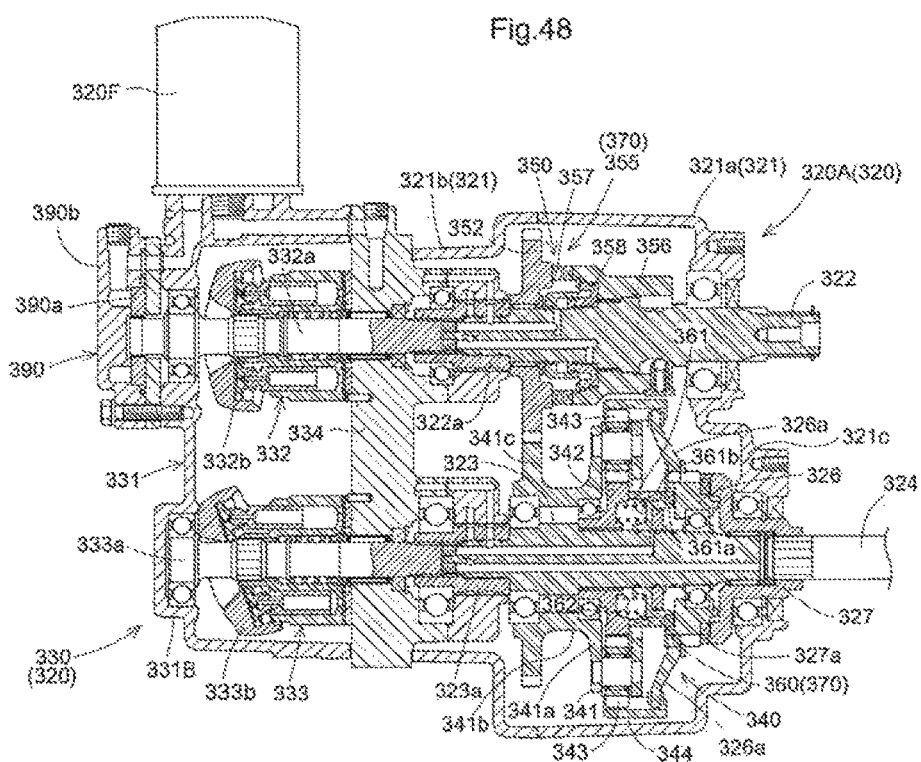
FIG. 48 is a front view in vertical section of the shift power transmission device during HST power transmission.

As shown in FIGS. 47 and 48, the shift power transmission device 320 is configured to include a planetary shift section 320A, which is provided with a shift case 321 whose side portion is coupled to the upper end side of the transmission case 311, and a hydrostatic continuously variable shift section 330 that has a casing 331 coupled to the side portion on the side opposite to the side on which the shift case 321 is coupled to the transmission case 311.

The shift case 321 is configured to include a main case portion 321a that accommodates a planetary power transmission section 340 and a power train 350, and a coupling case portion 321b that accommodates a connection portion between the continuously variable shift section 330 and an input shaft 322 and a power transmission shaft 323, and that couples the shift case 321 with a port block 334 of the casing 331. The shift case 321 is coupled to the transmission case 311 with a bulging portion 321c formed so as to bulge outward horizontally on the side face of the lower portion of the main case portion 321a where the output rotary member 324 is located. The size of the coupling case portion 321b in the up/down direction of the traveling body is smaller than the size of the main case portion 321a in the up/down direction of the traveling body. The main case portion 321a is formed such that the shape in vertical section is vertically elongated when viewed in the front/rear direction of the apparatus body, the casing 331 is formed such that the shape in vertical section is vertically elongated when viewed in the front/rear direction of the apparatus body, the planetary shift section 320A and the continuously variable shift section 330 are aligned in the horizontal direction of the apparatus body such that the shift power transmission device 320 has a small width overall in the horizontal direction of the apparatus body, and the shift power transmission device 320 is coupled to the lateral side of the transmission case 311 in a compact state with respect to the left/right direction of the traveling body so as to not protrude outward laterally. Furthermore, a bulging portion 331B that supports a bearing of a motor shaft 333a is formed on the side face of the lower portion of the casing 331, thus making the shift power transmission device 320 even more compact. Also, an oil filter 320F is arranged facing upward on the upper face of the casing 331, and further compactness is achieved by preventing the oil filter 320F from protruding outward laterally.

The planetary shift section 320A includes the input shaft 322 that is oriented in the horizontal direction of the apparatus body and is rotatably supported to the upper end side of the shift case 321, a power transmission shaft 323 and a rotating shaft-type of output rotary member 324 that are rotatably supported to the lower end side of the shift case 321 parallel or substantially parallel to the input shaft 322, the planetary power transmission section 340 that is supported to the power transmission shaft 323, and the power train 350 provided so as to span from the input shaft 322 to a carrier 341 of the planetary power transmission section 340.

The input shaft 322 is arranged so as to be coaxially aligned with a pump shaft 332a of the continuously variable shift section 330. The input shaft 322 is configured such that on the side on which it protrudes laterally outward from the shift case 321, it is coupled with an output shaft 308a of the engine 308 via the power train 312, and on the side opposite to the side coupled to the engine 308, it is coupled to the pump shaft 332a of the continuously variable shift section 330 so as to be capable of in-unison rotation therewith via a joint 322a. The input shaft 322 receives engine drive force via the power train 312, and drives the hydraulic pump 332 of the continuously variable shift section 330 upon being driven by engine drive force.

The output rotary member 324 is arranged so as to be coaxially aligned with a motor shaft 333a of the continuously variable shift section 330 on the same side of the continuously variable shift section 330 as the side on which the engine-coupled side of the input shaft 322 is located. The output rotary member 324 is configured such that on the side on which it protrudes laterally outward from the shift case 321, it is interlocked with an input portion of the traveling transmission 313, and outputs drive force from the planetary power transmission section 340 and the continuously variable shift section 330 to the pair of right and left travel apparatuses 301 via the traveling transmission 313.

The continuously variable shift section 330 is configured to include the hydraulic pump 332 whose pump shaft 332a is rotatably supported to the upper end side of the casing 331, and the hydraulic motor 333 whose motor shaft 333a is rotatably supported to the lower end side of the casing 331. The hydraulic pump 332 is configured by a variable displacement axial plunger pump, and the hydraulic motor 333 is configured by a variable displacement axial plunger motor. The hydraulic motor 333 is driven by hydraulic oil that is discharged from the hydraulic pump 332 and supplied via an oil path formed inside the port block 334. The continuously variable shift section 330 is supplied with replenishing hydraulic oil by a charge pump 390 mounted to an end portion of the pump shaft 332a. The charge pump 390 includes a rotor 390a attached to the pump shaft 332a so as to be capable of in-unison rotation therewith, and a pump casing 390b that is removably coupled to the casing 331.

Accordingly, the continuously variable shift section 330 switches between the forward power transmission state, the reverse power transmission state, and the neutral state by an operation for changing the angle of a swash plate 332b that the hydraulic pump 332 is provided with. When the continuously variable shift section 330 is switched to the forward power transmission state, engine drive force transmitted from the input shaft 322 to the pump shaft 332a is converted into forward drive force and output from the motor shaft 333a, and when it is switched to the reverse power transmission state, engine drive force transmitted from the input shaft 322 to the pump shaft 332a is converted into reverse drive force and output from the motor shaft 333a, and thus engine drive force is subjected to stepless speed changing and output in both the forward power transmission state and the reverse power transmission state. When the hydraulic continuously variable shift section 330 is switched to the neutral state, output from the motor shaft 333a is stopped.

The planetary power transmission section 340 is arranged on as to be located between the motor shaft 333a and the output rotary member 324 on the same side of the continuously variable shift section 330 as the side on which the engine-coupled side of the input shaft 322 is located. The planetary power transmission section 340 includes a sun gear 342 that is supported to the power transmission shaft 323, multiple planet gears 343 that are meshed with the sun gear 342, a ring gear 344 that is meshed with the planet gears 343, and a carrier 341 that rotatably supports the planet gears 343. The carrier 341 includes arm portions 341a that rotatably support the planet gears 343 with an extending end portion, and a tube shaft portion 341b that is coupled to base sides of the arm portions 341a, and the carrier 341 is rotatably supported to the power transmission shaft 323 with the tube shaft portion 341b via a bearing.

The power transmission shaft 323 and the motor shaft 333a are coupled to each other via a joint 323a so as to be capable of in-unison rotation, the power transmission shaft 323 and the sun gear 342 are coupled via a spline structure so as to be capable of in-unison rotation, and the sun gear 342 is interlocked with the motor shaft 333a so as to be capable of in-unison rotation.

The ring gear 344 and the output rotary member 324 are interlocked so as to be capable of in-unison rotation, using an annular planet-side interlocking member 326 and an annular output-side interlocking member 327 that are aligned axially with the power transmission shaft 323 and fit around it so as to be capable of relative rotation. Specifically, the planet-side interlocking member 326 includes multiple engaging arm portions 326a that extend radially from the outer circumferential portion of the planet-side interlocking member 326 so as to be capable of in-unison rotation. The engaging arm portions 326a are engaged with the ring gear 344 at multiple locations, and the planet-side interlocking member 326 is interlocked with the ring gear 344 so as to be capable of in-unison rotation. The output-side interlocking member 327 is engaged with the planet-side interlocking member 326 using an engaging claw 327a so as to be capable of in-unison rotation, is engaged with the output rotary member 324 using a spline structure so as to be capable of in-unison rotation, and is coupled to the planet-side interlocking member 326 and the output rotary member 324 so as to be capable of in-unison rotation. The planet-side interlocking member 326 is supported to the power transmission shaft 323 via a bearing so as to be capable of relative rotation. The output-side interlocking member 327 is rotatably supported to the shift case 321 via a bearing.

The power train 350 is configured to include a power transmission gear 352 that is supported to the input shaft 322 via a needle bearing so as to be capable of relative rotation in a state of being meshed with an input gear 341c of the carrier 341 that is provided so as to be capable of in-unison rotation with the tube shaft portion 341b of the carrier 341, and an HMT clutch 355 provided so as to span between the power transmission gear 352 and the input shaft 322.

The HMT clutch 355 is configured to include a clutch member 356 supported to the input shaft 322 so as to be capable of in-unison rotation and sliding, and a clutch body 357 provided so as to span between one end side of the clutch member 356 and a lateral side of the power transmission gear 352. The clutch member 356 is caused to slide by a hydraulic piston 358 that is fit inside an end portion of the clutch member 356. The clutch body 357 is configured as a meshing clutch that switches between an on state and an off state when a meshing claw provided on the clutch member 356 and a meshing claw provided on the power transmission gear 352 engage/disengage with each other.

When the clutch body 357 is switched to the on state, the HMT clutch 355 is switched to the on state such that the input shaft 322 and the power transmission gear 352 are interlocked on as to be capable of in-unison rotation, and thus the HMT clutch 355 enters the state in which HMT power transmission is set so that the carrier 341 of the planetary power transmission section 340 and the input shaft 322 are interlocked.

When the clutch body 357 is switched to the off state, the HMT clutch 355 is switched to the off state such that the interlocking of the input shaft 322 and the power transmission gear 352 is cut off and thus the HMT clutch 355 enters the state in which the HMT power transmission setting is canceled so that the interlocking of the carrier 341 of the planetary power transmission section 340 and the input shaft 322 is cut off.

Accordingly, in the planetary power transmission section 340, when the HMT clutch 355 is switched to the state in which HMT power transmission is set, drive force from the input shaft 322 is inputted from a site located between the engine-coupled side and the continuously variable shift section-coupled side of the input shaft 322 to the carrier 341 via the power train 350. When the HMT clutch 355 is switched to the state in which the HMT power transmission setting is canceled, the planetary power transmission section 340 enters a state in which interlocking of the carrier 341 with the input shaft 322 is cut off.

An HST clutch 360 that includes a clutch member 361 fit around the power transmission shaft 323 is provided so as to span between the sun gear 342 of the planetary power transmission section 340 and the planet-side interlocking member 326.

When hydraulic oil is supplied to an oil chamber formed on the inner circumferential side of the clutch member 361, the clutch member 361 switches to an off position by being caused to slide toward the sun gear 342 in resistance to an on biasing spring 362, and when hydraulic oil is discharged from the oil chamber, the clutch member 361 switches to an on position by being caused to slide toward the planet-side interlocking member 326 by the on biasing spring 362. When the clutch member 361 switches to the on position, a clutch claw 361a provided on the clutch member 361 engages with a clutch claw provided on the planet-side interlocking member 326, and thus the clutch member 361 is coupled to the planet-side interlocking member 326 so as to be capable of in-unison rotation. The clutch member 361 is caused to slide while maintaining the state of being engaged with the sun gear 342 so as to be capable of in-unison rotation by the engaging claw 361b, and reaches the on position while maintaining the engaged state with respect to the sun gear 342. When the clutch member 361 switches to the off position, the engagement with the planet-side interlocking member 326 using the clutch claw 361a is canceled.

Accordingly, with the HST clutch 360, when the clutch member 361 is switched to the on position, the sun gear 342 and the planet-side interlocking member 326 are interlocked so as to be capable of in-unison rotation, and this achieves a state in which HST power transmission is set so that the motor shaft 333a is interlocked with the output rotary member 324 so as to be capable of in-unison rotation, thus enabling output from the continuously variable shift section 330 to be output from the output rotary member 324. Also, when HST power transmission is set in the HST clutch 360, and when the sun gear 342 and the power transmission shaft 323 are interlocked so as to be capable of in-unison rotation, and the ring gear 344 and the planet-side interlocking member 326 are interlocked so as to be capable of in-unison rotation, the sun gear 342, the carrier 341, and the ring gear 344 can rotate in unison with the motor shaft 333a such that autorotation of the planet gears 343 does not occur.

The HST clutch 360 switches the sun gear 342 of the planetary power transmission section 340 and the output rotary member 324 between the interlocking-on state and the interlocking-off state while maintaining the interlocked state between the ring gear 344 of the planetary power transmission section 340 and the output rotary member 324.

When the clutch member 361 is switched to the off position, the HST clutch 360 enters the state in which the setting of HST power transmission is canceled so that the interlocking of the sun gear 342 and the planet-side interlocking member 326 is cut off, the interlocking of the motor shaft 333a with the output rotary member 324 is cut off, and a state is realized in which the ring gear 344 of the planetary power transmission section 340 and the output rotary member 324 are interlocked so as to be capable of in-unison rotation, thus enabling combined drive force from the planetary power transmission section 340 to be output from the output rotary member 324.

Accordingly, with the planetary power transmission section 340, when the HMT clutch 355 is switched to the state in which HST power transmission is set, and the HST clutch 360 is switched to the state in which the setting of HST power transmission is canceled, drive force transmitted from the engine to the input shaft 322 is inputted to the carrier 341 via the power train 350, speed-changed drive force output from the motor shaft 333a of the continuously variable shift section 330 is inputted to the sun gear 342 via the power transmission shaft 323, drive force from the engine and speed-changed drive force output from motor shaft 333a of the continuously variable shift section 330 are combined to generate combined drive force, and the generated combined drive force is outputted from the ring gear 344 to the output rotary member 324 via the planet-side interlocking member 326 and the output-side interlocking member 327.

In other words, the clutch mechanism 370 is configured to include the HMT clutch 355 and the HST clutch 360 in order to perform power transmission setting for switching the setting of the shift power transmission device 320 between HMT power transmission and HST power transmission.

FIG. 49 is an illustrative diagram showing the relationship that the operation states of the HMT clutch 355 and the HST clutch 360, the operation state of the power transmission setting clutch mechanism 370, and the power transmission mode of the shift power transmission device 320 have with each other. In FIG. 49, "OFF" indicates the off state of the HMT clutch 355 and the HST clutch 360, and "ON" indicates the on state of the HMT clutch 355 and the HST clutch 360. As shown in this figure, when the HMT clutch 355 is switched to the off state and the HST clutch 360 is switched to the on state, the power transmission setting clutch mechanism 370 enters the state in which HST power transmission is set, and the shift power transmission device 320 is set to HST power transmission. When the HMT clutch 355 is switched to the on state, and the HST clutch 360 is switched to the off state, the power transmission setting clutch mechanism 370 enters the state in which HMT power transmission is set, and the shift power transmission device 320 is set to HMT power transmission.

FIG. 47 is a front view in vertical section of the shift power transmission device 320 during HMT power transmission. As shown in this figure, in the shift power transmission device 320, when the HMT clutch 355 is switched to the on state, and the HST clutch 360 is switched to the off state, drive force from the input shaft 322 (drive force from the engine 308) is inputted to the carrier 341 of the planetary power transmission section 340 via the power train 350, drive force input from the input shaft 322 is subjected to speed change by the continuously variable shift section 330, the speed-changed drive force output from the motor shaft 333a is inputted to the sun gear 342 of the planetary power transmission section 340, the planetary power transmission section 340 combines the drive force from the engine 308 that is inputted from the input shaft 322 with the speed-changed drive force input from the continuously variable shift section 330 so as to generate combined drive force, and the combined drive force output from the ring gear 344 of the planetary power transmission section 340 is transmitted to the end portion of the output rotary member 324 via the planet-side interlocking member 326 and the output-side interlocking member 327, and output from the output rotary member 324 to the traveling transmission 313.

FIG. 48 is a front view in vertical section of the shift power transmission device 320 during HST power transmission. As shown in this figure, in the shift power transmission device 320, when the HMT clutch 355 is switched to the off state, and the HST clutch 360 is switched to the on state, drive force input from the input shaft 322 is subjected to speed change by the continuously variable shift section 330, and the speed-changed drive force output from the motor shaft 333a is transmitted to the end portion of the output rotary member 324 via the power transmission shaft 323, the HST clutch 360, the planet-side interlocking member 326, and the output-side interlocking member 327, and output from the output rotary member 324 to the traveling transmission 313.

When HST power transmission is set, the power transmission setting clutch mechanism 370 is in the state where power transmission from the input shaft 322 to the carrier 341 of the planetary power transmission section 340 is cut off, the sun gear 342 is interlocked to the motor shaft 333a via the power transmission shaft 323 so as to be capable of in-unison rotation, and the ring gear 344 is interlocked to the motor shaft 333a via the planet-side interlocking member 326, the clutch member 361, the sun gear 342, and the power transmission shaft 323 so as to be capable of in-unison rotation. Accordingly, the sun gear 342, the carrier 341, and the ring gear 344 of the planetary power transmission section 340 rotate in unison with the motor shaft 333a, and in the shift power transmission device 320, during HST power transmission, output from the motor shaft 333a of the continuously variable shift section 330 is transmitted to the output rotary member 324 without autorotation of the planet gears 343 occurring, that is to say, without relative rotation of the sun gear 342 and the planet gears 343 occurring or relative rotation of the planet gears 343 and the ring gear 344 occurring.

Figure 50:
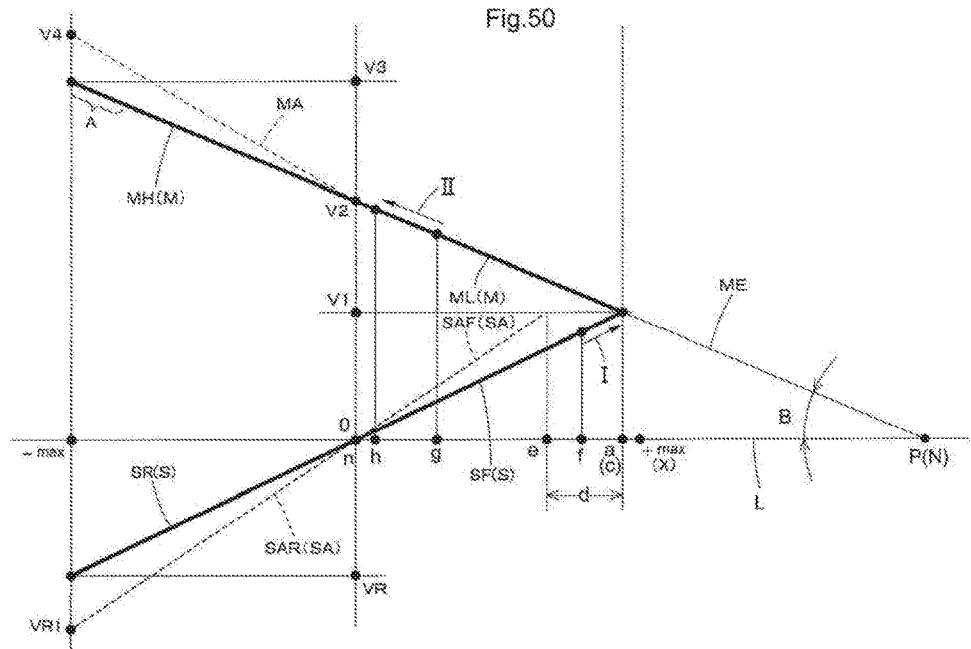
FIG. 50 is a graph showing output characteristics of the shift power transmission device.

FIG. 50 is a graph (speed line diagram) showing output characteristics of the shift power transmission device 320. A speed line indicating the rotational speed of the output rotary member 324 is shown on the vertical axis in this graph. An operation position line L that passes through the position at which the rotational speed plotted on the vertical axis is zero "0", and that indicates the position of the swash plate of the hydraulic pump 332 configuring the continuously variable shift section 330 is shown on the horizontal axis. Here, "n" on the operation position line L indicates the neutral position of the swash plate 332b at which the continuously variable shift section 330 is put into the neutral state. Also, "a" on the operation position line L is the set forward high-speed position, which is set as the maximum speed position on the forward side of the swash plate 332b, which is for switching between the HST power transmission setting and the HMT power transmission setting during no-load driving. Also, "+max" on the operation position line L is the actual forward maximum speed position of the continuously variable shift section 330, which is the swash plate angular position that is actually achieved by the swash plate 332b of the hydraulic pump 332 when the continuously variable shift section 330 is shifted to the operation limit on the forward high speed side. In a simple configuration in which rotation of the motor shaft 333a is inputted to the planet terminal without being accelerated/decelerated, the set forward high-speed position "a" is set to a position in front of the actual forward maximum speed position "+max" in order to maintain speed continuity at the point where there is a switch between HST power transmission and HMT power transmission. Also, "−max" on the operation position line L is the set reverse high-speed position, which is set as the maximum speed position on the reverse side of the swash plate 332b, which is operated in accordance with shift control. The set reverse high-speed position "−max" is set to the same position as the swash plate angular position that is actually achieved by the swash plate 332b of the hydraulic pump 332 when the continuously variable shift section 330 is shifted to the operation limit on the reverse high speed side.

A shift line S shown in FIG. 50 is an HST shift line (referred to hereinafter as the HST shift line S) that indicates change in the rotational speed of the output rotary member 324 when the shift power transmission device 320 is shifted during HST power transmission in the state in which the accelerator of the engine 308 is set such that a set constant speed of drive force is output, and a shift line M is an HMT shift line (referred to hereinafter as the HMT shift line M) that indicates change in the rotational speed of the output rotary member 324 when the shift power transmission device 320 is shifted during HMT power transmission in the state in which the accelerator of the engine 308 is set such that a set constant speed of drive force is output.

As shown in FIG. 50, when the HMT clutch 355 is controlled so as to be switched to the off state and the HST clutch 360 is controlled so as to be switched to the on state, HST power transmission is set, and in the state in which the HST power transmission setting is maintained, if the continuously variable shift section 330 is shifted from the neutral position "n" toward the set forward high-speed position "a", the rotational speed of the output rotary member 324 steplessly increases from zero "0" to the forward side along a forward range SF of the HST shift line S, and when the continuously variable shift section 330 reaches the set forward high-speed position "a", the rotational speed of the output rotary member 324 reaches a first forward intermediate speed "V1".

When the continuously variable shift section 330 reaches the set forward high-speed position "a", the HMT clutch 355 is controlled so as to be switched from the off state to the on state, and the HST clutch 360 is controlled so as to be switched from the on state to the off state, thus setting HMT power transmission instead of HST power transmission, and in the state in which the HMT power transmission setting is maintained, if the continuously variable shift section 330 is shifted from the set forward high-speed position "a" toward the neutral position "n", the rotational speed of the output rotary member 324 steplessly increases from the first forward intermediate speed "V1" along a low speed range ML of the HMT shift line M, and when the continuously variable shift section 330 reaches the neutral position "n", the rotational speed of the output rotary member 324 reaches a second forward intermediate speed "V2". In the state in which the HMT power transmission setting is maintained, if the continuously variable shift section 330 is shifted from the neutral position "n" toward the set reverse high-speed position "−max", the rotational speed of the output rotary member 324 steplessly increases from the second forward intermediate speed "V2" along a high speed range ML of the HMT shift line M, and when the continuously variable shift section 330 reaches the set reverse high-speed position "−max", the rotational speed of the output rotary member 324 reaches a forward maximum speed "V3"

In the state in which the HST power transmission setting is maintained, if the continuously variable shift section 330 is shifted from the neutral position "n" toward the set reverse high-speed position "−max", the rotational speed of the output rotary member 324 steplessly increases from zero "0" to the reverse side along a reverse range SR of the HST shift line S, and when the continuously variable shift section 330 reaches the set reverse high-speed position "−max", the rotational speed of the output rotary member 324 reaches a reverse maximum speed "VR".

The angle of inclination B of the HMT shift line M relative to the operation position line L is set as follows in order for the drive force that is to be output in the shift state corresponding to the high speed range MH of the HMT shift line M to be drive force with a rotational speed that is appropriate for location change traveling, in order for the drive force that is to be output in the shift state corresponding to the low speed range ML of the HMT shift line M to be drive force with a rotational speed that is appropriate for task traveling, and in order to obtain speed-changed drive force with minimal loss that accompanies the speed change of drive force input from the engine 308 when employing a continuously variable shift section 330 whose hydraulic pump 332 has the smallest possible discharge capacity.

A shift line extension line ME shown in FIG. 50 is an extension of the HMT shift line M toward the operation position line L, and a position "P" on the operation position line L is the intersection position where the shift line extension line ME and the operation position line L intersect. Assuming that the swash plate 332b of the hydraulic pump 332 of the continuously variable shift section 330 can be tilted beyond the actual forward maximum speed position "+max", which is the farthest tilt position on the forward side that can actually be reached, to the intersection position "P", letting "N" be the value of the virtual angle of inclination achieved by the swash plate 332b when tilted to the intersection position "P", and letting "X" be the value of the actual highest swash plate angle that is actually achieved in the hydraulic pump 332 of the continuously variable shift section 330 when it is shifted to the actual forward maximum speed position "+max", the angle of inclination B of the HMT shift line M relative to the operation position line L is set to the angle of inclination that corresponds to the case where N is two times the value of X (N/X=2.0). The setting corresponding to N/X=2.0 depends on the setting of the discharge capacity of the hydraulic pump 332 and the setting of the gear power transmission ratio in the planetary power transmission section 340 and mechanical power transmission portions other than the planetary power transmission section 340.

The angle of inclination B of the HMT shift line M relative to the operation position line L is set to the angle of inclination at which the rotational speed of the output rotary member 324 at the forward maximum speed "V3" is greater than or equal to two times the rotational speed of the output rotary member 324 at the first forward intermediate speed "V1".

The setting corresponding to N/X=2.0 is based on the evidence described below.

When the output rotation of the continuously variable shift section 330 is zero and the output rotational speed is V2, all of the drive force is outputted without passing through the continuously variable shift section 330. At the virtual swash plate angle position (P), at which the output rotation is zero, the drive force at the output rotational speed V2 passes through the continuously variable shift section 330 and is returned to the drive side, and output becomes zero. In other words, mechanical transmission power that does not pass through the continuously variable shift section 330 and power from the continuously variable shift section 330 (referred to hereinafter as HST power) cancel each other out. In actuality, the virtual swash plate angle position (P) is a virtual position, and therefore giving consideration to the fact that the actual maximum angle of inclination X=1 when the continuously variable shift section 330 is at the actual forward maximum speed position "+max", since the rotational speed is 1/N, the HST power is 1/N times the mechanical transmission power that does not pass through the continuously variable shift section 330.

Letting KM be the mechanical efficiency of mechanical transmission power, and letting KH be the power that passes through the continuously variable shift section 330, the output power is a constant mechanical power ±HST power, and the overall efficiency achieved by the shift power transmission device 320 is calculated as shown below.

When the continuously variable shift section 330 is at the neutral position "n":

(1+0×1/N)/(1/KM+0×1/N/KH)=KM

When the continuously variable shift section 330 is at the set reverse high-speed position "−max":

(1+1/N)/(1/KM+1/N/KH)=KM?KH(N+1)/(KM+KH?N)

When the continuously variable shift section 330 is at the actual forward maximum speed position "+max":

(1?1/N)/(1/KM?1/N?KH)=KM(N?1)/(N?KM?KH)

According to these calculations, the higher N is, the greater the efficiency can be improved.

Figure 51:
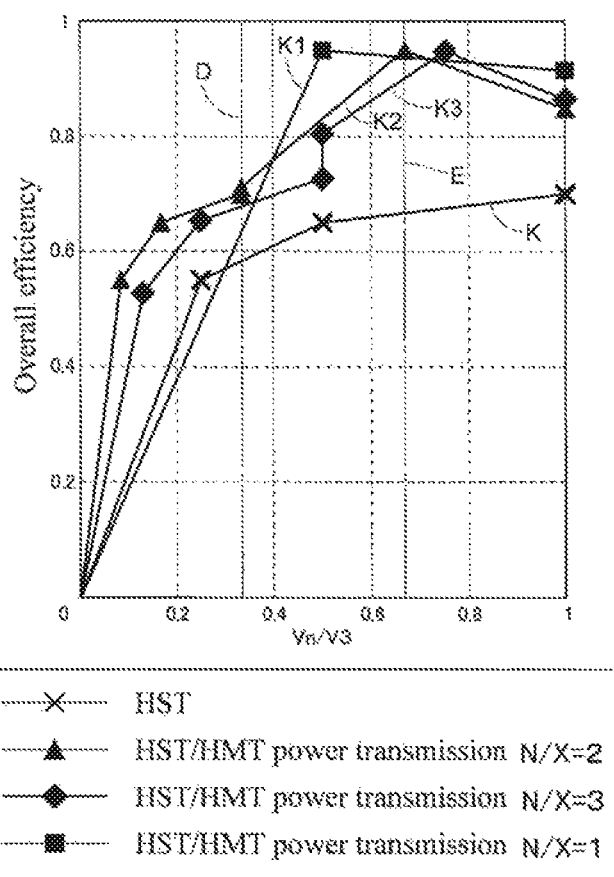
FIG. 51 is an illustrative diagram showing the relationship between N/X values and overall efficiency.

FIG. 51 is an illustrative diagram showing the relationship between overall efficiency and shift positions when varying the value N/X. The overall efficiency shown here was approximated as described above, assuming that KM=0.95 and KH=0.7, and using N/X=1.0, N/X=2.0, and N/X=3.0.

The horizontal axis shown in FIG. 51 indicates the shift position, and the shift position on the horizontal axis is the ratio of the output rotational speed when the continuously variable shift section 330 is shifted to an arbitrary shift position during forward-side HST power transmission and HMT power transmission to the output rotational speed when the continuously variable shift section 330 is shifted to the set reverse high-speed position "−max". In other words, letting Vn be the rotational speed of drive force that is outputted when the continuously variable shift section 330 is shifted to an arbitrary shift position during forward-side HST power transmission and HMT power transmission, Vn/V3 is the shift position on the horizontal axis. A vertical line D shown in FIG. 51 is a line indicating the maximum speed during HST power transmission when N/X=2.0, which is Vn/V3=0.33 (between 0.2 and 0.4). A vertical line E shown in FIG. 51 is a line indicating, the speed when the swash plate of the hydraulic pump 332 is at the neutral position during HMT power transmission when N/X=2.0, which is Vn/V3=0.67 (between 0.6 and 0.8). Accordingly, the set forward high-speed position "a" of the continuously variable shift section 330 is a position between 0.2 and 0.4 on the horizontal axis, and the neutral position "n" of the shift 330 is a position between 0.6 and 0.8 on the horizontal axis.

An efficiency line K shown in FIG. 51 indicates the overall efficiency of the continuously variable shift section 330. An efficiency line K1 shown in FIG. 51 indicates the overall efficiency approximated using N/X=1.0, an efficiency line K2 indicates the overall efficiency approximated using N/X=2.0, and an efficiency line K3 indicates the overall efficiency approximated using N/X=3.0.

Between the vertical line D and the vertical line E, the overall efficiency is favorable when N/X=1.0, but since the output is also high on the high speed side, the amount of power loss increases, and even a small difference in efficiency cannot be ignored. In consideration of power loss obtained by multiplying output power by the rate of loss, approximately N/X=1.8 is the minimum value. Although the most appropriate value in terms of power loss has a wide range when the N/X value is low around N/X=1.8, N/X=2.0 is the most appropriate value for reducing the size of the continuously variable shift section 330. If N/X is approximately 1.5 to 2.5 in order to achieve balance, it is possible to both realize higher efficiency in the high speed range and achieve a 38% reduction in the size of the continuously variable shift section 330. The output rotation of the planetary power transmission section 340 during HMT power transmission at this time can also be designed so as to be in a realistic range that does not exceed 10000 rpm. When the shift power transmission device 320 is an independent unit, lowering the extent of rotational speed from the drive source enables reducing the influence of torque loss caused by output portion sealing and the like, and therefore deceleration of 2.5 to 3 is performed by the planetary power transmission section 340, which also makes the configuration realistically more readily achievable. When employing the simple power transmission setting clutch mechanism 370 as described above, the setting of N/X=1.5 to 2.5 is advantageous in terms of high efficiency and reducing the size of the continuously variable shift section 330.

Figure 52:
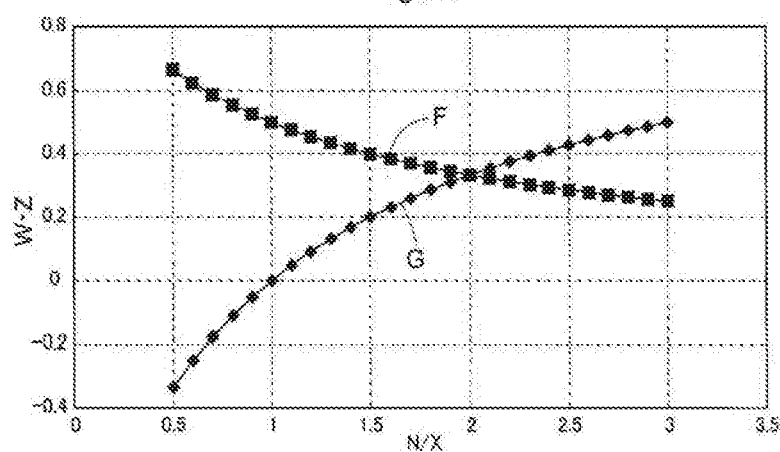
FIG. 52 is an illustrative diagram showing the relationship between N/X values and size reduction of a continuously variable shift section.

FIG. 52 is an illustrative diagram showing the relationship between the value of N/X and size reduction of the continuously variable shift section 330. The horizontal axis in FIG. 52 indicates the value of N/X. A line F shown in FIG. 52 indicates the ratio "W" of the HST power (1/N) to the total power (1+1/N). The higher this ratio "W" is, the larger the discharge capacity of the hydraulic pump 332 needs to be, and the larger the continuously variable shift section 330 needs to be.

The size of the continuously variable shift section 330 can be made smaller when drive force over a predetermined shift range is to be obtained by output from the planetary power transmission section 340 than when it is to be obtained by output from the continuously variable shift section 330, and a line G shown in FIG. 52 indicates the relationship between the value of N/X and the extent to which the size of the continuously variable shift section 330 can be reduced.

Specifically, assuming that the actual maximum tilt position "+max" is the point at which there is a switch between HST power transmission and HMT power transmission, the ratio of the maximum speed during HMT power transmission (forward maximum speed "V3") to the maximum speed during HST power transmission is similarly calculated as (N+1)/(N?1)=Z. Z is 5.0 when N/X=1.5, is 3.0 when N/X=2.0, is 2.3 when N/X=2.5, and is 2.0 when N/X=3.0. The values indicated on the vertical axis in FIG. 52 are the value of 1/Z.

The higher the value of Z is, the greater the shift range that can be obtained by HMT power transmission is, the smaller the shift range that needs to be obtained by HST power transmission is, and the greater the size of the continuously variable shift section 330 can be reduced, but if the discharge capacity of the hydraulic pump 332 is too small, drive problems will occur, such as the relief circuit opening and operating. Accordingly, by employing N/X=2.0, which achieves an intersection between the line F and the line G, it is possible to obtain a shift power transmission device 320 capable of shift power transmission that avoids the occurrence of drive problems in the continuously variable shift section 330, while also achieving a forward maximum speed "V3" and a second forward intermediate speed "V2" during HMT power transmission that are speeds necessary for location change and task, and also achieving a reduction in the size of the continuously variable shift section 330.

Figure 53:
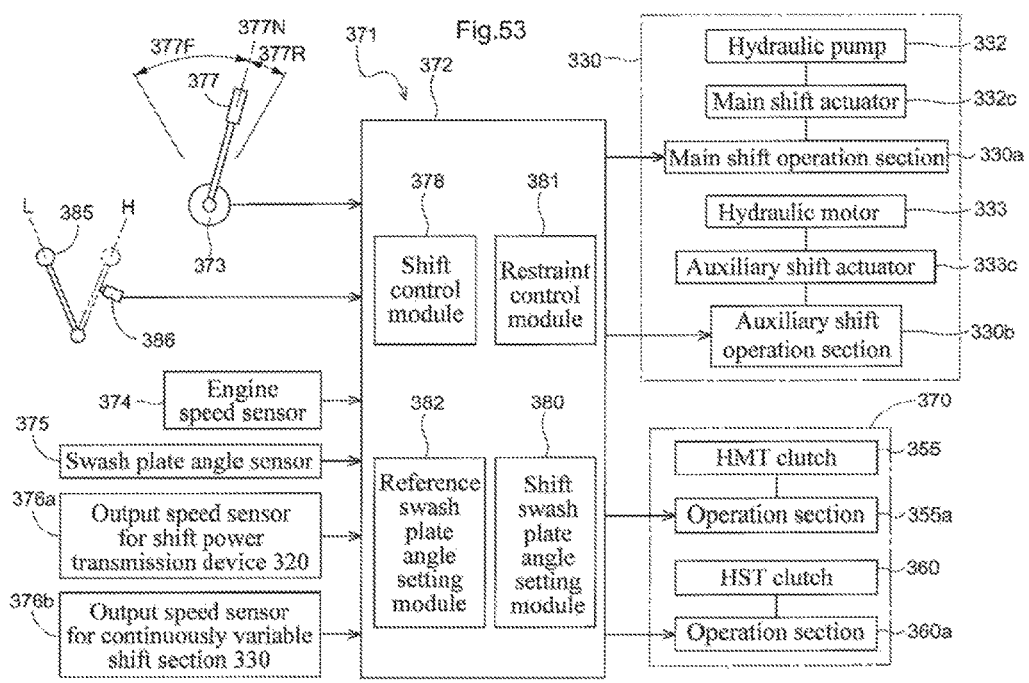
FIG. 53 is a block diagram showing a shift operation apparatus.

FIG. 53 is a block diagram showing a shift operation apparatus 371 that performs shift operations on the shift power transmission device 320. As shown in this figure, the shift operation apparatus 371 includes a control apparatus 372 that is linked to a main shift operation section 330a and an auxiliary shift operation section 330b of the continuously variable shift section 330 and operation sections 355a and 360a of the HMT clutch 355 and the HST clutch 360, as well as a main shift operation device 377, an auxiliary shift operation device 385, an engine speed sensor 374, a swash plate angle sensor 375, an output speed sensor 376a, and an output speed sensor 376b that are linked to the control apparatus 372.

The main shift operation section 330a performs shift operations on the hydraulic pump 332 by operating a main shift actuator 332c for changing the angle of the swash plate 332b of the hydraulic pump 332 in the continuously variable shift section 330. The auxiliary shift operation section 330b performs shift operations on the hydraulic motor 333 by operating an auxiliary shift actuator 333c for changing the angle of the swash plate 333b of the hydraulic motor 333 in the continuously variable shift section 330. The main shift actuator 332c and the auxiliary shift actuator 333c are configured by a hydraulic cylinder, and the main shift operation section 330a and the auxiliary shift operation section 330b are configured by a hydraulic cylinder operation valve. The operation section 355a of the HMT clutch 355 is configured by an operation valve that is connected to the hydraulic piston 358 via an operation oil path formed inside the input shaft 322, and by operating the hydraulic piston 358 so as to cause the clutch member 356 to slide, the operation section 355a switches the HMT clutch 355. The operation section 360a of the HST clutch 360 is configured by an operation valve that is connected to the oil chamber of the clutch member 361 via an operation oil path formed inside the power transmission shaft 323, and by supplying/discharging operation oil to/from the oil chamber of the clutch member 361, the operation section 360a causes the clutch member 361 to slide so as to switch the HST clutch 360.

Figure 54:
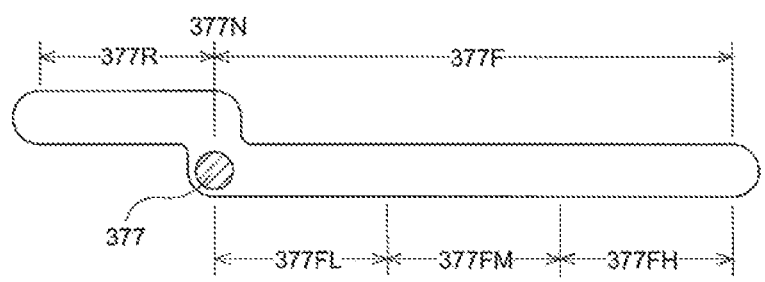
FIG. 54 is a plan view of operation positions of a main shift operation device.

FIG. 54 is a plan view of operation positions of the main shift operation device 377. As shown in FIGS. 53 and 54, the main shift operation device 377 is configured by a shift lever provided in the driving section 302 so as to be capable of being swung in the front/rear direction of the traveling body, and is swung to a neutral position "377N", in a forward operation range "377F" that extends from the neutral position "377N" toward the front of the device body, and in a reverse operation range "377R" that extends from the neutral position "377N" toward the rear of the device body. The shift operation device 377 is linked to the control apparatus 372 via a shift detection sensor 373 that detects the operation position of the shift operation device 377. The shift detection sensor 373 is configured by a rotation potential meter that is interlocked to the rotation operation shaft of the shift operation device 377, and when the shift operation device 377 is swung, the shift detection sensor 373 operates, and a main shift instruction is outputted from the shift detection sensor 373 to the control apparatus 372 in the form of an electrical signal.

The auxiliary shift operation device 385 is configured by a shift lever provided in the driving section 302 so as to be capable of being swung in the front/rear direction of the traveling body, and is swung to a low speed position "L" and a high speed position "H". The auxiliary shift operation device 385 is linked to the control apparatus 372 via an operation position detection switch 386 that detects the operation position of the auxiliary shift operation device 385. When the auxiliary shift operation device 385 is moved to the low speed position "L", the operation position detection switch 386 is moved to the off side, and a low-speed auxiliary shift instruction is outputted from the operation position detection switch 386 to the control apparatus 372 in the form of an electrical signal. When the auxiliary shift operation device 385 is moved to the high speed position "H", the operation position detection switch 386 is moved to the on side, and a high-speed auxiliary shift instruction is outputted from the operation position detection switch 386 to the control apparatus 372 in the form of an electrical signal.

The engine speed sensor 374 detects the rotational speed of the engine 308, and outputs this detection result to the control apparatus 372. The swash plate angle sensor 375 detects the angle of the swash plate of the hydraulic pump 332 of the continuously variable shift section 330, and outputs this detection result to the control apparatus 372. The output speed sensor 376a detects the rotational speed of the output rotary member 324 as the output rotational speed of the shift power transmission device 320, and outputs this detection result to the control apparatus 372. The output speed sensor 376b detects the rotational speed of the motor shaft 333a as the output rotational speed of the continuously variable shift section 330, and outputs this detection result to the control apparatus 372.

The control apparatus 372 is configured using a microcomputer, and includes a shift control module 378, a restraint control module 381, a shift swash plate angle setting module 380, and a reference swash plate angle setting module 382.

The shift swash plate angle setting module 380 is configured by a storage section provided in the control apparatus 372. As shown in FIG. 50, the shift swash plate angle setting module 380 receives a swash plate angle for performing control for switching the setting from HST power transmission to HMT power transmission, as a pre-set set shift swash plate angle "c". The set forward high-speed position "a" is set as the set shift swash plate angle "c".

The reference swash plate angle setting module 382 is configured by a storage section of the control apparatus 372. As shown in FIG. 50, a swash plate angle of the hydraulic pump 332 that is located a set angle "d" toward the low speed side from the set shift swash plate angle "c" is inputted in advance and set as a reference swash plate angle "e" in the reference swash plate angle setting module 382.

Based on detection information from the engine speed sensor 374, the shift control module 378 detects the speed of the engine 308 whose accelerator has been set, performs shift control on the hydraulic pump 332 and the hydraulic motor 333 based on this detection result, a main shift instruction from the main shift operation device 377, an auxiliary shift instruction from the auxiliary shift operation device 385, detection information from the swash plate angle sensor 375, and detection information from the output speed sensor 376a and the output speed sensor 376b, and also controls the switching of the HST clutch 360 and the HMT clutch 355 of the clutch mechanism 370.

The shift control module 378 compares the detected swash plate angle from the swash plate angle sensor 375 and the set shift swash plate angle "c" from the shift swash plate angle setting module 380, and determines whether or not the detected swash plate angle is equal to the set shift swash plate angle "c", thus determining whether or not the swash plate angle sensor 375 detected a swash plate angle that is equal to the set shift swash plate angle "c". In the case of determining that the swash plate angle sensor 375 detected a swash plate angle that is equal to the set shift swash plate angle "c", the shift control module 378 performs control for switching the HST clutch 360 of the clutch mechanism 370 to the off state, and performs control for switching the HMT clutch 355 to the on state, thus switching the setting from HST power transmission to HMT power transmission.

Upon receiving a low-speed auxiliary shift instruction from the auxiliary shift operation device 385, the shift control module 378 performs a shift operation on the hydraulic pump 332 based on the main shift instruction from the main shift operation device 377 and the auxiliary shift instruction from the auxiliary shift operation device 385 such that the output speed of the output rotary member 324 of the shift power transmission device 320 is an output speed that corresponds to the main shift instruction from the main shift operation device 377, that is to say, such that the output speed of the output rotary member 324 of the shift power transmission device 320 changes along the HST shift line S and the HMT shift line M in accordance with the operation of the main shift operation device 377.

Upon receiving a high-speed auxiliary shift instruction from the auxiliary shift operation device 385, the shift control module 378 performs a shift operation on the hydraulic pump 332 based on the main shift instruction from the main shift operation device 377 and the auxiliary shift instruction from the auxiliary shift operation device 385 such that the output speed of the output rotary member 324 of the shift power transmission device 320 is an output speed that is higher than the output speed that corresponds to the main shift instruction from the main shift operation device 377.

The restraint control module 381 detects the power transmission state of the shift power transmission device 320 based on detection information from the swash plate angle sensor 375, setting information regarding HST power transmission and HMT power transmission from the shift control module 378, setting information from the reference swash plate angle setting module 382, and setting information from the shift swash plate angle setting module 380, and switches between a restraint active state and a restraint canceled state with respect to the shift control module 378 based on the detection result.

When the shift power transmission device 320 is set to HST power transmission, and the power transmission state is detected to be a reverse power transmission state in which the combined drive force to be output is increased through a speed-increase shift operation in the reverse shift range of the continuously variable shift section 330 and in which the combined drive force to be output is decreased through a speed-decrease shift operation in the reverse shift range of the continuously variable shift section 330, the restraint control module 381 switches to the restraint canceled state with respect to the shift control module 378, and permits the shift control module 378 to perform control so as to move the auxiliary shift actuator 333c to the high speed side.

When the shift power transmission device 320 is set to HST power transmission, and the power transmission state is detected to be a first forward power transmission state in which the combined drive force to be output is increased through a speed-increase shift operation between the neutral position "n" and the reference swash plate angle "e" in the forward shift range of the continuously variable shift section 330 and in which the combined drive force to be output is decreased through a speed-decrease shift operation between the neutral position "n" and the reference swash plate angle "e" in the forward shift range of the continuously variable shift section 330, the restraint control module 381 switches to the restraint canceled state with respect to the shift control module 378, and permits the shift control module 378 to perform control so as to move the auxiliary shift actuator 333c to the high speed side.

When the shift power transmission device 320 is set to HST power transmission, and the power transmission state is detected to be a second forward power transmission state in which the combined drive force to be output is increased through a speed-increase shift operation between the reference swash plate angle "e" and the set shift swash plate angle "c" in the forward shift range of the continuously variable shift section 330 and in which the combined drive force to be output is decreased through a speed-decrease shift operation between the reference swash plate angle "e" and the set shift swash plate angle "c" in the forward shift range of the continuously variable shift section 330, the restraint control module 381 switches to the restraint active state with respect to the shift control module 378, and prohibits the shift control module 378 from performing control so as to move the auxiliary shift actuator 333c to the high speed side.

When the shift power transmission device 320 is set to HMT power transmission, and the power transmission state is detected to be a third forward power transmission state in which the combined drive force to be output is decreased through a speed-increase shift operation in the forward shift range of the continuously variable shift section 330 and in which the combined drive force to be output is increased through a speed-decrease shift operation in the forward shift range of the continuously variable shift section 330, the restraint control module 381 switches to the restraint active state with respect to the shift control module 378, and prohibits the shift control module 378 from performing control so as to move the auxiliary shift actuator 333c to the high speed side.

When the shift power transmission device 320 is set to HMT power transmission, and the power transmission state is detected to be a fourth forward power transmission state in which the combined drive force to be output is increased through a speed-increase shift operation in the reverse shift range of the continuously variable shift section 330 and in which the combined drive force to be output is decreased through a speed-decrease shift operation in the reverse shift range of the continuously variable shift section 330, the restraint control module 381 switches to the restraint canceled state with respect to the shift control module 378, and allows the shift control module 378 to perform control so as to move the auxiliary shift actuator 333c to the high speed side.

In other words, when the output of the continuously variable shift section 330 and output of the planetary power transmission section 340 are to be in the same rotation direction, the restraint control module 381 causes auxiliary shifting to be performed by the hydraulic motor 333. When the HMT power transmission speed range has multiple stages, the restraint control module 381 and the shift control module 378 are configured to function as described below. Specifically, after the auxiliary shift operation device 385 is switched from the low speed position "L" to the high speed position "H", if in the processing of acceleration with the main shift operation device 377, there is a switch from a low-speed stage in the HMT power transmission speed range (n-th stage) to a high-speed stage in the HMT power transmission speed range ((n+1)-th stage), the swash plate position that is to be switched to is in the vicinity of the intersection between the speed lines of the n-th auxiliary shift high speed range and the (n+1)-th auxiliary shift high speed range. If the auxiliary shifting is switched at a pump swash plate position that is tilted deeper than the intersection between the aforementioned speed lines, the motor swash plate is not tilted, and the pump swash plate is tilted by an amount that corresponds to the acceleration of the motor. When the output of the continuously variable shift section 330 and output of the planetary power transmission section 340 are to be in opposite rotation directions, the restraint control module 381 causes auxiliary shifting to be performed by the hydraulic pump 332, without auxiliary shifting being performed by the hydraulic motor 333. If the swash plate neutral position of the continuously variable shift section 330 will be exceeded as a result of tilting the pump swash plate, the motor auxiliary shifting is switched in the vicinity of the pump swash plate neutral position.

Upon receiving a high-speed auxiliary shift instruction from the auxiliary shift operation device 385 while the restraint control module 381 is in the restraint active state, the shift control module 378 performs control for shifting the hydraulic pump 332 to a higher speed based on the main shift instruction and the high-speed auxiliary shift instruction such that the output speed of the shift power transmission device 320 that corresponds to the main shift instruction increases in accordance with the auxiliary shift instruction. Specifically, as indicated by arrow "I" in FIG. 50, the shift control module 378 performs auxiliary shift control for shifting the hydraulic pump 332 to a higher speed such that the swash plate 332b of the hydraulic pump 332 is tilted to the swash plate angle position "a" that is displaced a set angle higher than the swash plate angle position "f" that corresponds to the main shift instruction. Alternatively, as indicated by arrow "II" in FIG. 50, the shift control module 378 performs auxiliary shift control for shifting the hydraulic pump 332 to a lower speed such that the swash plate 332b of the hydraulic pump 332 is tilted to the s wash plate angle position "h" that is displaced a set angle lower than the swash plate angle position "g" that corresponds to the main shift instruction. The set angles in these cases are set as swash plate angles that correspond to the case where the shift power transmission device 320 is caused to output acceleration of the same or substantially same amount as the amount of acceleration of the output of the shift power transmission device 320 that is achieved by auxiliary shift control for shifting the hydraulic motor 333 to a higher speed in accordance with a high-speed auxiliary shift instruction.

Accordingly, in the state in which the accelerator of the engine 308 is set such that drive force with a constant rotational speed is output, when the main shift operation device 377 is operated in the reverse operation range "377R", to the neutral position "377N", and in the forward operation range "377F", and the auxiliary shift operation device 385 is switched to the low speed position "L" and the high speed position "H", the shift control module 378 performs control for switching the setting of the shift power transmission device 320 between HST power transmission and HMT power transmission and performs shift control on the hydraulic pump 332 and the hydraulic motor 333, thus causing the traveling body to travel in forward and reverse, as well as traveling while changing speed in forward and reverse, and stopping.

Specifically, if the main shift operation device 377 is moved to the neutral position "377N", in the reverse operation range "377R", or in the low speed range portion "377FL" in the forward operation range "377F", the shift power transmission device 320 is set to HST power transmission due to the shift control module 378 performing control for switching the HMT clutch 355 and the HST clutch 360 based on the main shift instruction from the main shift operation device 377 and setting information from the shift swash plate angle setting module 380. If the main shift operation device 377 is moved to a mid-speed range portion "377FM" or a high speed range portion "377FH" in the forward operation range "377F", the shift power transmission device 320 is set to HMT power transmission due to the shift control module 378 performing control for switching the HMT clutch 355 and the HST clutch 360 based on the main shift instruction from the main shift operation device 377 and setting information from the shift swash plate angle setting module 380.

If the main shift operation device 377 is operated to the neutral position "377N", the shift control module 378 moves the swash plate 332b of the hydraulic pump 332 to the neutral position "n" based on the main shift instruction from the main shift operation device 377, the continuously variable shift section 330 enters the neutral state, and output from the shift power transmission device 320 is stopped.

If the main shift operation device 377 is moved in the low speed range portion "377FL" of the forward operation range "377F" while the auxiliary shift operation device 385 is at the low speed position "L", the shift control module 378 tilts the swash plate 332b of the hydraulic pump 332 on the forward side of the neutral position "n" based on the main shift instruction from the main shift operation device 377, the low-speed auxiliary shift instruction from the auxiliary shift operation device 385, and detection information from the output speed sensor 376a, and the speed of the drive force outputted by the shift power transmission device 320 changes along the forward range SF of the HST shift line S.

If the main shift operation device 377 is moved in the mid-speed range portion "377FM" and the high speed range portion "377FH" of the forward operation range "377F" while the auxiliary shift operation device 385 is at the low speed position "L", the shift control module 378 tilts the swash plate 332b of the hydraulic pump 332 over the forward side and the reverse side based on the main shift instruction from the main shift operation device 377, the low-speed auxiliary shift instruction from the auxiliary shift operation device 385, and detection information from the output speed sensor 376a, and the speed of the drive force outputted by the shift power transmission device 320 changes along the low speed range ML and the high speed range MH of the HMT shift line M.

When the main shift operation device 377 is moved in the low speed range portion "377FL" of the forward operation range "377F", and when the auxiliary shift operation device 385 is at the high speed position "H", if furthermore the shift control module 378 shifts the hydraulic pump 332 between the neutral position "n" and the reference swash plate angle "e", the restraint control module 381 enters the restraint canceled state, the shift control module 378 performs an auxiliary shift operation for shifting the hydraulic motor 333 to a higher speed, and the speed of the drive force outputted by the shift power transmission device 320 changes along the forward range SAF of the auxiliary shifting HST shift line SA.

When the main shift operation device 377 is moved in the low speed range portion "377FL" of the forward operation range "377F", even when the auxiliary shift operation device 385 is at the high speed position "H", if the shift control module 378 shifts the hydraulic pump 332 between the neutral position "n" and the reference swash plate angle "e", the restraint control module 381 is switched to the restraint active state, and the shift control module 378 does not perform auxiliary shift control for shifting the hydraulic motor 333 to a higher speed. In this case, as indicated by arrow "I" in FIG. 50, the shift control module 378 performs shift control for shifting the hydraulic pump 332 to a higher speed, the speed of the drive force outputted by the shift power transmission device 320 changes along the forward range SF of the HST shift line S so as to be drive force with a speed higher than the speed that corresponds to the operation position of the main shift operation device 377 when the auxiliary shift operation device 385 is at the low speed position "L".

When the main shift operation device 377 is moved to an operation position in the low speed range portion "377FL" of the forward operation range "377F", and when the auxiliary shift operation device 385 is switched from the low speed position "L" to the high speed position "H", if the swash plate 332b of the hydraulic pump 332 is positioned at a swash plate angle position between the neutral position "n" and the reference swash plate angle "e", the restraint control module 381 is in the restraint canceled state, the shift control module 378 performs auxiliary shift control for shifting the hydraulic motor 333 to a higher speed, and the drive force output by the shift power transmission device 320 becomes drive force at a speed that is on the line in the forward range SAF of the HST shift line SA for auxiliary shifting.

When the main shift operation device 377 is moved in the mid-speed range portion "377FM" of the forward operation range "377F", even when the auxiliary shift operation device 385 is at the high speed position "H", the restraint control module 381 is switched to the restraint active state, and the shift control module 378 does not perform auxiliary shift control for shifting the hydraulic motor 333 to a higher speed. In this case, as indicated by arrow "II" in FIG. 50 for example, the shift control module 378 performs auxiliary shift control for shifting the hydraulic pump 332 to a higher speed, and the speed of the drive force outputted by the shift power transmission device 320 changes along the low speed range ML of the HMT shift line M so as to be drive force at a speed higher than the speed that corresponds to the operation position of the main shift operation device 377 when the auxiliary shift operation device 385 is at the low speed position "L".

When the main shift operation device 377 is moved to an operation position in the mid-speed range portion "377FM" of the forward operation range "377F", even when the auxiliary shift operation device 385 is switched from the low speed position "L" to the high speed position "H", the restraint control module 381 is in the restraint active state, and the shift control module 378 does not perform auxiliary shift control for shifting the hydraulic motor 333 to a higher speed. In this case, as indicated by arrow "II" in FIG. 50 for example, the shift control module 378 performs auxiliary shift control for shifting the hydraulic pump 332 to a higher speed, and the speed of the drive force outputted by the shift power transmission device 320 changes along the low speed range ML of the HMT shift line M an as to be drive force at a speed higher than the speed that corresponds to the operation position of the main shift operation device 377 when the auxiliary shift operation device 385 is at the low speed position "L".

When the main shift operation device 377 is moved in the high speed range portion "377FH" of the forward operation range "377F", and when the auxiliary shift operation device 385 is at the high speed position "H", the restraint control module 381 enters the restraint canceled state, the shift control module 378 performs an auxiliary shift operation for shifting the hydraulic motor 333 to a higher speed, and the speed of the drive force outputted by the shift power transmission device 320 changes along the HMT shift line MA for auxiliary shifting.

When the main shift operation device 377 is moved to an operation position in the high speed range portion "377FH" of the forward operation range "377F", and when the auxiliary shift operation device 385 is switched from the low speed position "L" to the high speed position "H", the restraint control module 381 is in the restraint canceled state, the shift control module 378 performs auxiliary shift control for shifting the hydraulic motor 333 to a higher speed, and the drive force outputted by the shift power transmission device 320 becomes drive force at a speed that is on the HMT shift line MA for auxiliary shifting.

If the main shift operation device 277 is moved in the reverse operation range "377R" while the auxiliary shift operation device 385 is at the low speed position "L", the shift control module 378 tilts the swash plate 332b of the hydraulic pump 332 on the reverse side of the neutral position "n" based on the main shift instruction from the main shift operation device 377, the low-speed auxiliary shift instruction from the auxiliary shift operation device 385, and detection information from the output speed sensor 376a, and the speed of the drive force outputted by the shift power transmission device 320 changes along the reverse range SR of the HST shift line S.

When the main shift operation device 377 is moved in the reverse operation range "377R", and when the auxiliary shift operation device 385 is at the high speed position "H", the restraint control module 381 enters the restraint canceled state, the shift control module 378 performs an auxiliary shift operation for shifting the hydraulic motor 333 to a higher speed, and the speed of the drive force outputted by the shift power transmission device 320 changes along the reverse range SAR of the HST shift line SA for auxiliary shifting.

When the main shift operation device 377 is moved to an operation position in the reverse operation range "377R", and when the auxiliary shift operation device 385 is switched from the low speed position "L" to the high speed position "H", the restraint control module 381 is in the restraint canceled state, the shift control module 378 performs auxiliary shift control for shifting the hydraulic motor 333 to a higher speed, and the drive force outputted by the shift power transmission device 320 becomes drive force at a speed that is on the line in the reverse range SAR of the HST shift line SA for auxiliary shifting.

When a control target speed can be achieved by merely performing shift control on the hydraulic pump 332 in the shift range A shown in FIG. 50, even if a high-speed auxiliary shift instruction is received, only shift control of the hydraulic pump 332 is necessary, and the shift control module 378 does not perform control for acceleration by performing auxiliary shift control on the hydraulic motor 333.

Alternative Embodiment (1) Although the above-described embodiment gives the example where the HMT power transmission speed range has only one stage, an implementation is possible in which the HMT power transmission speed range has two or more stages.

(2) Although the above-described embodiment gives the example where the clutch mechanism 370 is configured by a meshing type HMT clutch 355 and HST clutch 360, an implementation is possible in which the clutch mechanism 370 is configured by a friction HMT clutch 355 and HST clutch 360.

INDUSTRIAL APPLICABILITY

The present invention is applicable to a combine, as well as an agricultural apparatus such as a rice planter, and various types of vehicles such as a transport vehicle.

DESCRIPTION OF REFERENCE SIGNS

First Embodiment

1 Travel apparatus
22 Input shaft
24 Output rotary member
30 Hydraulic continuously variable transmission
32a Pump shaft
33a Motor shaft
40 Planetary power transmission section
42 Sun gear
55 Input-side clutch mechanism
60 Output-side clutch mechanism
90 Charge pump Second Embodiment

101 Travel apparatus
122 Input shaft
124 Output rotary member
130 Hydraulic continuously variable transmission
133a Motor shaft
140 Planetary power transmission section
141c Input gear
142 Sun gear
143 Planet gear
144 Ring gear
150 Forward/reverse switching mechanism
151 Forward power transmission gear
152a Forward clutch member
153 Reverse power transmission shaft
154 Power transmission gear
155 Input gear
156a Reverse clutch member
157 Reverse power transmission gear
160 Clutch mechanism Third Embodiment

201 Travel apparatus
208 Engine
220 Shift power transmission device
230 Continuously variable shift section
232 Hydraulic pump
240 Planetary power transmission section
241 Carrier
242 Sun gear
244 Ring gear
270 Clutch mechanism
275 Swash plate angle sensor
277 Shift operation device
278 Shift control module
280 Shift swash plate angle setting module
a No-load swash plate angle
b Load swash plate angle
c Set shift swash plate angle
S HST shift line
HMT shift line
SA1 Calculated HST shift line
MA1 Calculated HMT shift line
V In-unison rotation achievement speed
W Intersection Fourth Embodiment

301 Travel apparatus
308 Engine
320 Shift power transmission device
330 Continuously variable shift section
332 Hydraulic pump
333 Hydraulic motor
340 Planetary power transmission section
370 Clutch mechanism
375 Swash plate angle sensor
377 Main shift operation device
378 Shift control module
381 Restraint control module
382 Reference swash plate angle setting module
c Set shift swash plate angle
e Reference swash plate angle
S HST shift line

What is claimed is:
1. A shift power transmission apparatus comprising:
an input shaft receiving engine drive force;
a hydraulic continuously variable transmission driven by the input shaft;

a planetary power transmission section combining the drive force from the input shaft and an output from the hydraulic continuously variable transmission for outputting the combined drive force therefrom; and an output rotary member outputting power to a travel apparatus, wherein a forward/reverse switching mechanism is provided to be switchable between a forward power transmission state for converting the drive force from the input shaft into forward drive force to be transmitted to the planetary power transmission section, and a reverse power transmission state for converting the drive force from the input shaft into reverse drive force to be transmitted to the planetary power transmission section, and the forward/reverse switching mechanism is further switchable to a neutral state in which power transmission between the input shaft and the planetary power transmission section is cut off; and wherein a clutch mechanism is provided for switching an interlocking state of a motor shaft of the hydraulic continuously variable transmission to the output rotary member between an on-state and an off-state.

2. The shift power transmission apparatus according to claim 1, wherein in the on-state of the clutch mechanism, a sun gear, a planet gear and a ring gear of the planetary power transmission section are interlocked with the motor shaft of the hydraulic continuously variable transmission to be rotatable with the motor shaft.

3. The shift power transmission apparatus according to claim 1, wherein the forward/reverse switching mechanism includes:

a forward power transmission gear supported on the input shaft to be rotatable relative thereto, the forward power transmission gear being interlocked with the planetary power transmission section;

a forward clutch member supported on the input shaft to be rotatable in unison therewith and slidable relative thereto for switching the forward power transmission gear and the input shaft between an interlocking-on state and an interlocking-off state in association with engagement with and disengagement from the forward power transmission gear;

a reverse power transmission shaft supporting one of an input gear interlocked with the input shaft and a reverse power transmission gear interlocked with the planetary power transmission section to be rotatable relative thereto, and the reverse power transmission shaft supporting thereon the other of the input gear and the reverse power transmission gear to be rotatable in unison therewith; and a reverse clutch member supported on the reverse power transmission shaft to be rotatable in unison therewith and slidable relative thereto, wherein when the reverse clutch member is engaged with and disengaged from the one of the input gear and the reverse power transmission gear, which one gear is supported on the reverse power transmission shaft to be rotatable relative thereto to be clutched by the reverse clutch member, the reverse clutch member switches the one gear and the reverse power transmission shaft between an interlocking-on state and an interlocking-off state.

4. The shift power transmission apparatus according to claim 3, wherein the input gear, and a power transmission gear supported on the input shaft to be rotatable in unison and mesh therewith, are arranged on a side of the planetary power transmission section opposite from the forward power transmission gear and the reverse power transmission gear, and wherein the forward power transmission gear and the reverse power transmission gear are meshed with a second input gear provided at a portion of the sun gear of the planetary power transmission section opposite from the input gear and the power transmission gear.

* * * * *